United States Patent
Schieke

(10) Patent No.: US 10,776,963 B2
(45) Date of Patent: Sep. 15, 2020

(54) SYSTEM AND METHOD FOR FORMING A SUPER-RESOLUTION BIOMARKER MAP IMAGE

(71) Applicant: Cubisme, Inc., Milwaukee, WI (US)

(72) Inventor: Moira F. Schieke, Milwaukee, WI (US)

(73) Assignee: CUBISMI, INC., Madison, WI (US)

(*) Notice: Subject to any disclaimer, the term of this patent is extended or adjusted under 35 U.S.C. 154(b) by 0 days.

(21) Appl. No.: 15/640,107

(22) Filed: Jun. 30, 2017

(65) Prior Publication Data

US 2018/0005417 A1    Jan. 4, 2018

Related U.S. Application Data

(60) Provisional application No. 62/357,768, filed on Jul. 1, 2016.

(51) Int. Cl.
| | |
|---|---|
| *G06K 9/00* | (2006.01) |
| *G06T 11/00* | (2006.01) |
| *G06T 7/30* | (2017.01) |
| *G06T 7/00* | (2017.01) |

(52) U.S. Cl.
CPC .......... *G06T 11/008* (2013.01); *G06T 7/0016* (2013.01); *G06T 7/30* (2017.01); *G06T 11/006* (2013.01); *G06T 2207/10016* (2013.01); *G06T 2207/10072* (2013.01); *G06T 2207/10084* (2013.01); *G06T 2207/10096* (2013.01); *G06T 2207/10104* (2013.01); *G06T 2207/30096* (2013.01); *G06T 2211/424* (2013.01)

(58) Field of Classification Search
CPC ................ G06T 7/0012; G06T 11/008; G06T 2207/10088; G06T 2207/10104; G06T 15/08; G06T 19/00; G06T 2207/20084; G06T 7/0016; G06T 7/30; G06T 7/73

See application file for complete search history.

(56) References Cited

U.S. PATENT DOCUMENTS

| | | | |
|---|---|---|---|
| 6,123,647 | A | 9/2000 | Mitchell |
| 6,567,684 | B1 | 5/2003 | Chenevert et al. |
| 6,956,373 | B1 | 10/2005 | Brown et al. |

(Continued)

FOREIGN PATENT DOCUMENTS

| | | |
|---|---|---|
| EP | 3 117 771 A2 | 1/2017 |
| WO | WO-2015/175746 A1 | 11/2015 |
| WO | WO-2016/206942 A1 | 12/2016 |

OTHER PUBLICATIONS

Antipolis, Sophia, "MEDIAN Technologies strengthens IP portfolio with US patent," Median Technologies (ALMDT), Sep. 10, 2015.

(Continued)

*Primary Examiner* — Li Liu
(74) *Attorney, Agent, or Firm* — Foley & Lardner LLP

(57) ABSTRACT

A method includes obtaining image data, selecting image datasets from the image data, creating three-dimensional (3D) matrices based on the selected image dataset, refining the 3D matrices, applying one or more matrix operations to the refined 3D matrices, selecting corresponding matrix columns from the 3D matrices, applying big data convolution algorithm to the selected corresponding matrix columns to create a two-dimensional (2D) matrix, and applying a reconstruction algorithm to create a super-resolution biomarker map image.

13 Claims, 55 Drawing Sheets

(56) References Cited

U.S. PATENT DOCUMENTS

| | | | |
|---|---|---|---|
| 8,509,570 | B2 | 8/2013 | Degani et al. |
| 8,605,980 | B2 | 12/2013 | Li et al. |
| 8,768,431 | B2 | 7/2014 | Ross et al. |
| 8,781,214 | B2* | 7/2014 | Davis ............... G01N 21/4795 382/128 |
| 8,805,619 | B2 | 8/2014 | Sorensen et al. |
| 8,818,484 | B2 | 8/2014 | Liew et al. |
| 8,873,836 | B1 | 10/2014 | Dietrich et al. |
| 9,092,691 | B1 | 7/2015 | Beaumont et al. |
| 9,165,362 | B2 | 10/2015 | Siewerdsen et al. |
| 9,424,639 | B2 | 8/2016 | Jacob |
| 9,615,028 | B2 | 4/2017 | Mizutani et al. |
| 2002/0186818 | A1 | 12/2002 | Arnaud et al. |
| 2002/0193677 | A1* | 12/2002 | Thornton ............... A61B 6/12 600/407 |
| 2003/0072479 | A1 | 4/2003 | Sofia Totterman et al. |
| 2006/0269476 | A1 | 11/2006 | Kuo |
| 2008/0097186 | A1 | 4/2008 | Biglieri et al. |
| 2009/0161928 | A1 | 6/2009 | Khamene et al. |
| 2009/0208075 | A1 | 8/2009 | Fischer et al. |
| 2010/0158332 | A1 | 6/2010 | Rico et al. |
| 2010/0284927 | A1 | 11/2010 | Lu et al. |
| 2011/0243417 | A1 | 10/2011 | Madabhushi et al. |
| 2011/0312520 | A1 | 12/2011 | Kennedy et al. |
| 2013/0197349 | A1 | 8/2013 | Blumhagen et al. |
| 2013/0329973 | A1 | 12/2013 | Cao et al. |
| 2014/0003697 | A1 | 1/2014 | Qian et al. |
| 2014/0010429 | A1 | 1/2014 | Highnam et al. |
| 2014/0010430 | A1 | 1/2014 | Chandelier et al. |
| 2014/0037172 | A1 | 2/2014 | Madabhushi et al. |
| 2014/0064580 | A1 | 3/2014 | Madabhushi et al. |
| 2014/0079302 | A1 | 3/2014 | Sato et al. |
| 2014/0086836 | A1 | 3/2014 | Burnham et al. |
| 2014/0101080 | A1 | 4/2014 | Lee et al. |
| 2014/0126794 | A1 | 5/2014 | Ahn et al. |
| 2014/0153795 | A1 | 6/2014 | Lenox |
| 2014/0185888 | A1 | 7/2014 | Kelm et al. |
| 2014/0185900 | A1 | 7/2014 | Lee et al. |
| 2014/0195472 | A1 | 7/2014 | Kawagishi |
| 2014/0205163 | A1 | 7/2014 | Stark et al. |
| 2014/0219535 | A1 | 8/2014 | Chen et al. |
| 2014/0228667 | A1 | 8/2014 | Dankerl et al. |
| 2014/0233826 | A1 | 8/2014 | Agaian et al. |
| 2014/0241606 | A1 | 8/2014 | Park et al. |
| 2014/0309511 | A1 | 10/2014 | Stal |
| 2015/0003706 | A1 | 1/2015 | Eftestol et al. |
| 2015/0093007 | A1 | 4/2015 | Beaumont et al. |
| 2015/0198688 | A1* | 7/2015 | Cetingul ........... G01R 33/56341 324/309 |
| 2016/0019693 | A1 | 1/2016 | Silbersweig et al. |
| 2016/0038095 | A1 | 2/2016 | Schieke |
| 2016/0086326 | A1 | 3/2016 | Raschke et al. |
| 2016/0117816 | A1 | 4/2016 | Taylor |
| 2016/0217576 | A1 | 7/2016 | Kabus et al. |
| 2016/0292194 | A1 | 10/2016 | Farkash |
| 2016/0350933 | A1 | 12/2016 | Schieke |
| 2016/0350946 | A1 | 12/2016 | Schieke et al. |
| 2017/0261584 | A1* | 9/2017 | James ................ G01R 33/5601 |
| 2017/0263023 | A1* | 9/2017 | Zhou .................... G06T 11/008 |
| 2018/0114312 | A1* | 4/2018 | Palma .................. G06T 7/0012 |

OTHER PUBLICATIONS

Ashraf, B. Ahmed et al., "Identification of Intrinsic Imaging Phenotypes for Breast Cancer Tumors: Preliminary Associations with Gene Expression Profiles," Radiology: vol. 272:No. 2, 2014.

Baselga, et al., "Everolimus in Postmenopausal Hormone-Receptor 2013 Positive Advanced Breast Cancer," New England Journal of Medicine, 2012, 366, pp. 520-529.

Boes, et at., "Image Registration for Quantitative Parametric Response Mapping of Cancer Treatment Response," Feb. 2014, Translational Oncology, vol. 7, No. 1, pp. 101-110.

Bornn, Luke et al, "Herded Gibbs Sampling," Mar. 16, 2013, arXiv:1301.4168v2 [cs.LG].

Buckley, David, "Uncertainty in the Analysis of Tracer Kinetics Using Dynamic Contrast-Enhanced T1-Weighted MRI," Magnetic Resonance in Medicine, Feb. 20, 2002,47, pp. 601-606.

Chan, et al., "Detection of Prostate Cancer by Integration of Line-Scan Diffusion, T2-Mapping and T2-Weighted Magnetic Resonance Imagine; a Multichannel Statistical Classifier," Medical Physics, Sep. 2003, vol. 30, No. 9, 2390-2398.

Colen, et al., "NCI Workshop Report: Clinical and Computational Requirements for Correlating Imaging Phenotypes with Genomics Signatures," Translational Oncology, Oct. 2014, vol. 7, No. 5, pp. 565-569.

Determining Single Voxel Value from Larger Region of Interest (ROI), Dec. 18, 2014.

Ellingson, et al, "Graded Functional Diffusion Map 2013 Defined Characteristics of Apparent Diffusion Coefficients Predict Overall Survival in Recurrent Glioblastoma Treated with Bevacizumab," Neuro-Oncology, 2011, 13, pp. 1151-1161.

Ellingson, et al., "Volumetric Analysis of Functional Diffusion Maps is a Predictive Imaging Biomarker for Cytotoxic and Anti-Angiogenic Treatments in Malignant Gliomas," Journal of Neuro-Oncology, 2011, 102, 95-103.

Galavis, et al., "Variability of Textural Features in FDG PET Images Due to Different Acquisition Modes and Reconstruction Parameters," Acta Oncologica, 2010, 49, pp. 1012-1016.

Galban J. Craig, "The Parametric Response Map: An Imaging Biomarker for Early Cancer Treatment Outcome," National Institute of Health, 2009, 15(5): 572-576. doi:10.1038/nm.1919.

Galbraith, et al., Reproducibility of Dynamic Contrast-Enhanced MRI in Human Muscle and Tumours: Comparison of Quantitative and Semi-Quantitative Analysis, NMR in Biomedicine, Feb. 20, 2002, 15, pp. 132-142.

Gillies, et al., "MRI of the Tumor Microenvironment," Journal of Magnetic Resonance Imaging, 2002, 16, pp. 430-450.

Haq, et al, "A Data-Driven Approach to Prostate Cancer Detection From Dynamic Contrast Enhanced MRI," PubMed Central Canada, 2017 pp. 1-27.

Haq, et al., "A Data-Driven Approach to Prostate Cancer Detection From Dynamic Contrast Enhanced MRI," Computerized Medical Imaging and Graphics, 2014, pp. 1-9.

Heidbreder, G.R.; Maximum Entropy and Bayesian Methods; Kluwer Academic Publishers; ISBN 0-7923-2851-5; 1993.

International Search Report and Written Opinion for PCT/US2017/040456 dated Oct. 19, 2017 (14 pages).

Irani, M. et al.; Motion Analysis for Image Enhancement: Resolution, Occlusion, and Transparency; Journal of Visual Communication and Image Representation; vol. 4; No. 4; Dec. 1993; pp. 325-335.

Irani, Michal et al., "Motion Analysis for Image Enhancement: Resolution Occlusion, and Transparency," Journal of Visual Communication and Image Representation, Institute of Computer Science, The Hebrew University of Jerusalem, Aug. 23, 1993, vol. 4, No. 4, December, pp. 324-335.

Kamal, Nasrollahi et al., "Super-Resolution: A Comprehensive Survey," Machine Vision & Applications, 2014, 25(6), 1423-1468. 10.1007/s00138-014 0623-4.

Kwak, et al., "Automated Prostate Cancer Detection Using T2-Weighted and High-B-Value Diffusion-Weighted Magnetic Resonance Imaging," Medical Physics, May 2015, vol. 42, No. 5, pp. 2368-2378.

Kwak, et al., "Correlation of Magnetic Resonance Imaging With Digital Histopathology in Prostate," Int J CARS, 2016, 11, pp. 657-666.

Langer, et al., "Prostate Cancer Detection With Multi-parametric MRI: Logistic Regression Analysis of Quantitative T2, Diffusion-Weighted Imaging, and Dynamic Contrast-Enhanced MRI," Journal of Magnetic Resonance Imaging, 2009, 30, pp. 327-334.

Li, et al., "Cell Membrane Water Exchange Effects in Prostate DCE-MRI," Journal of Magnetic Resonance, vol. 218, 2012, pp. 77-85.

Maani, et al., "Voxel-Based Texture Analysis of the Brain," PLOS ONE, Mar. 10, 2015, pp. 1-19.

(56) References Cited

OTHER PUBLICATIONS

Maenpaa, et al., "Texture Analysis With Local Binary Patterns," WSPC, May 13, 2004, 8:19, pp. 1-20.

Method for Determining In Vivo Tissue Biomarker Characteristics Using Multiparameter MRI Matrix Creation and Big Data Analytics Draft application.

Moffat, et al., "Functional Diffusion Map: A Noninvasive MRI Biomarker for Early Stratification of Clinical Brain Tumor Response," Proceedings of the National Academy of Sciences, 2005, 102, pp. 5524-5529.

Moradi, et al., "Multiparametric MRI Maps for Detection and Grading of Dominant Prostate Tumors," Journal of Magnetic Resonance Imaging, 2012, 35, pp. 1403-1413.

Nasrollahi, K. et al.; Super-resolution: A comprehensive survey. Machine Vision & Applications, 25(6), 1423-1468, 2014. 10.1007/s00138-014-0623-4.

Niaf, et al., "Computer-Aided Diagnosis of Prostate Cancer in the Peripheral Zone Using Multiparametric MRI," Phys. Med. Biol. 2012, 57, pp. 3833-3851.

Oto, et. al, "Diffusion-Weighted and Dynamic Contrast-Enhanced MRI of Prostate Cancer: Correlation of Quantitative MR Parameters With Gleason Score and Tumor Angiogenesis," American Journal of Roentgenology, 2011, 197, pp. 1382-1390.

Padhani, et al., "Reproducibility of Quantitative Dynamic MRI of Normal Human Tissues" NMR in Biomedicine,2002, 15, pp. 143-153.

Peng, et al., "Quantitative Analysis of Multiparametric Prostate MR Images: Differentiation Between Prostate Cancer and Normal Tissue and Correlation with Gleason Score—A Computer-aided Diagnosis Developmental Study," Radiology, Jun. 2013, vol. 267: No. 3, pp. 787-796.

Purysko, et al., "LI-RADS: A Case-based Review of the New Categorization of Liver Findings in Patients With End-Stage Liver Disease," RadioGraphics, Nov.-Dec. 2012, vol. 32, No. 7, pp. 1977-2012.

Rijpkema, et al., "Method for Quantitative Mapping of Dynamic MRI Contrast Agent Uptake in Human Tumors," Journal of Magnetic Resonance Imaging, 2001, 14, pp. 457-463.

Roberts, et al., "The Effect of Blood Inflow and B1-Field Inhomogeneity on Measurement of the Arterial Input Function in Axial3D Spoiled Gradient Echo Dynamic Contrast-Enhanced MRI," Magnetic Resonance in Medicine, 2010, 65, 108-119.

Senseney, et al., "Tumor Treatment Response Identification Using Combination Post-Treatment Mapping to Quantify Voxel-Wise Multiparameter MRI Biomarker Changes: A Simulation Study," Dana-Farber Cancer Institute.

Senseney, et al., "Tumor Treatment Response Identification Using Combination Post-Treatment Mapping to Quantify Voxel-Wise Multiparameter MRI Biomarker Changes: A Simulation Study. International Symposium on Biomedical Imaging," Barcelona, Spain, May 2012.

Senseney, Justin et al., "Tumor Treatment Response Identification Using Combination Post-Treatment Mapping to Quantify Voxel-Wise Multiparameter MRI Biomarker Changes: A Simulation Study," Imaging Sciences Lab, Center for Information Technology, National Institute of Health, Besthesda, MD.

Shah et al., "Decision Support System for Localizing Prostate Cancer based on Multiparametric Magnetic Resonance Imaging," Medical Physics, Jul. 2012, vol. 39, No. 7, 11 pages.

Tae Kwak, Jin, "Prostate Cancer: A Correlative Study of Multiparametric MR Imaging and Digital Histopathology," Radiology, Orginal Research Genitourinary Imaging, vol. 000: No. 0, 2017.

U.S. Non-Final Office Action on U.S. Appl. No. 14/821,703 dated Mar. 22, 2017 (57 pages).

U.S. Office Action on U.S. Appl. No. 15/165,644 dated Nov. 30, 2017.

Wang, et al., "Computer Aided-Diagnosis of Prostate Cancer on Multiparametric MRI: A Technical Review of Current Research," BioMed Research International, Aug. 2014, pp. 1-11.

Wang, Shijun et al., "Computer Aided-Diagnosis of Prostate Cancer on Multiparametric MRI: A Technical Review of Current Research," Hindawi Publishing Corporation, Aug. 28, 2014, 12 pages.

Yang, et al., "Comparison of Quantitative Parameters in Cervix Cancer Measured by Dynamic Contrast 2013 Enhanced MRI and CT," Magnetic Resonance in Medicine, 2010, 63, pp. 1601-1609.

Yang, et al., "Reproducibility Assessment of a Multiple Reference Tissue Method for Quantitative Dynamic Contrast Enhanced 2013 MRI Analysis," Magnetic Resonance in Medicine, 2009, 61, pp. 851-859.

Final Office Action on U.S. Appl. No. 14/821,700 dated Mar. 18, 2019.

International Search Report and Written Opinion in PCT/US2018/028679 dated Jan. 29, 2019 (14 pages).

U.S. Office Action on U.S. Appl. No. 14/821,700 dated May 31, 2018.

Non-Final Office Action on U.S. Appl. No. 14/821,700 dated Apr. 28, 2020.

* cited by examiner

BREAST & PROSTATE CANCER TISSUE BIOMARKERS & TISSUE CHARACTERISTICS
EXAMPLES & OVERVIEW

| EXAMPLE | BREAST CANCER TISSUE BIOMARKERS |
|---|---|
| LUMINAL A | IMMUNOHISTOCHEMICAL SUBTYPE OF BREAST CANCER WITH ER+ AND OR PR+ EXPRESSION WITH HER2- |
| LUMINAL B | IMMUNOHISTOCHEMICAL SUBTYPE OF BREAST CANCER WITH ER+ AND OR PR+ EXPRESSION WITH HER2+ |
| TRIPLE NEGATIVE / BASAL-LIKE | IMMUNOHISTOCHEMICAL SUBTYPE OF BREAST CANCER WITH ER, PR, HER2 ALL NEGATIVE |
| HER2 SUBTYPE | IMMUNOHISTOCHEMICAL SUBTYPE OF BREAST CANCER WITH ER-, PR- EXPRESSION WITH HER2+ |
| ONCOTYPE DX SCORE | SCORE OBTAINED FROM ANALYSIS OF EXPRESSION PROFILES OF mRNA OF REMOVED OR BIOPSIED TUMOR TISSUE THAT DETERMINES BIOMARKER RISK OF TUMOR RECURRENCE AND RESPONSE TO CHEMOTHERAPY. |
| LONG RNA HOTAIR | NEXT GENERATION SEQUENCING (NGS) IS USED TO IDENTIFY TISSUE SAMPLES WITH LONG RNA HOTAIR, WHICH IS ASSOCIATED WITH HIGHER RISK FOR METASTASIS. NGS ENABLES RAPID SEQUENCING OF LARGE STRETCHES OF DNA BASE PAIRS SPANNING ENTIRE GENOMES, WITH INSTRUMENTS CAPABLE OF PRODUCING HUNDREDS OF GIGABASES OF DATA IN A SINGLE SEQUENCING RUN. SPECIFIC GENE MARKERS AND NGS MAY BE USED TO RAPIDLY SCAN ALL THE DNA DATA FROM TISSUE SAMPLES TO IDENTIFY UP REGULATION OF CERTAIN GENES. LONG RNA HOTAIR IS JUST ONE OF MANY POTENTIAL BIOMARKERS THAT WILL BE POTENTIALLY IDENTIFIED WITH NGS. |

| EXAMPLE | PROSTATE CANCER TISSUE CHARACTERISTICS |
|---|---|
| MACROSCOPIC ANATOMY | INCREASED IDENTIFICATION OF BOUNDARIES AND ANATOMY IMPROVES DELINEATION OF TUMOR BOUNDARIES. AS ONE EXAMPLE, DELINEATION OF THE PROSTATE INTO ZONAL ANATOMY OF PERIPHERAL, CENTRAL, AND TRANSITION ZONES CAN BE IMPORTANT FOR LOCAL TUMOR STAGING. |
| MICROSCOPIC ANATOMY | HISTOLOGY AND CYTOLOGY STUDY MICROSCOPIC ANATOMY AND INCLUDED INNUMERABLE MARKERS AND TECHNIQUES USED BY PATHOLOGIST TO CHARACTERIZE TUMORS AND OTHER TISSUES. FOR EXAMPLE, DIGITIZED HISTOPATHOLOGY TECHNIQUES USING CLASSIFIERS CAN BE USED TO SEGMENT EX-VIVO PROSTATE TISSUE INTO LUMEN, NUCLEUS, EPITHELIUM, AND STROMA. NEWER CYTOLOGY TECHNIQUES OFFER UNPRECEDENTED NEW INFORMATION TO CHARACTERIZE CELLS IN TISSUES. |

FIG. 1C

VARIABLES THAT DEFINE A MW: SHAPE, DIMENSIONS SUCH AS RADIUS OR WIDTH, 2D VERSUS 3D, STEP SIZE, DIRECTION OF MOVEMENT-NO EXACT MW LOCATIONS IS REPEATED

VOXELS WITHIN THE MW IN THESE DIAGRAMS REPRESENT THE VOXELS IN THE ORIGINAL SOURCE IMAGES

VOXELS WITHIN THE MW IN THIS DIAGRAM REPRESENT THE VOXELS IN THE ORIGINAL SOURCE IMAGES

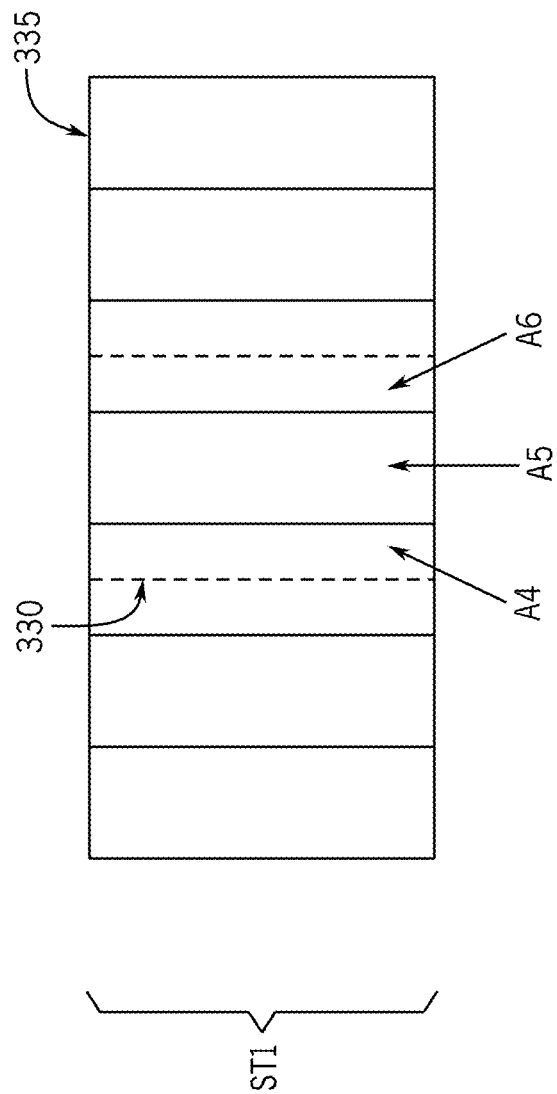

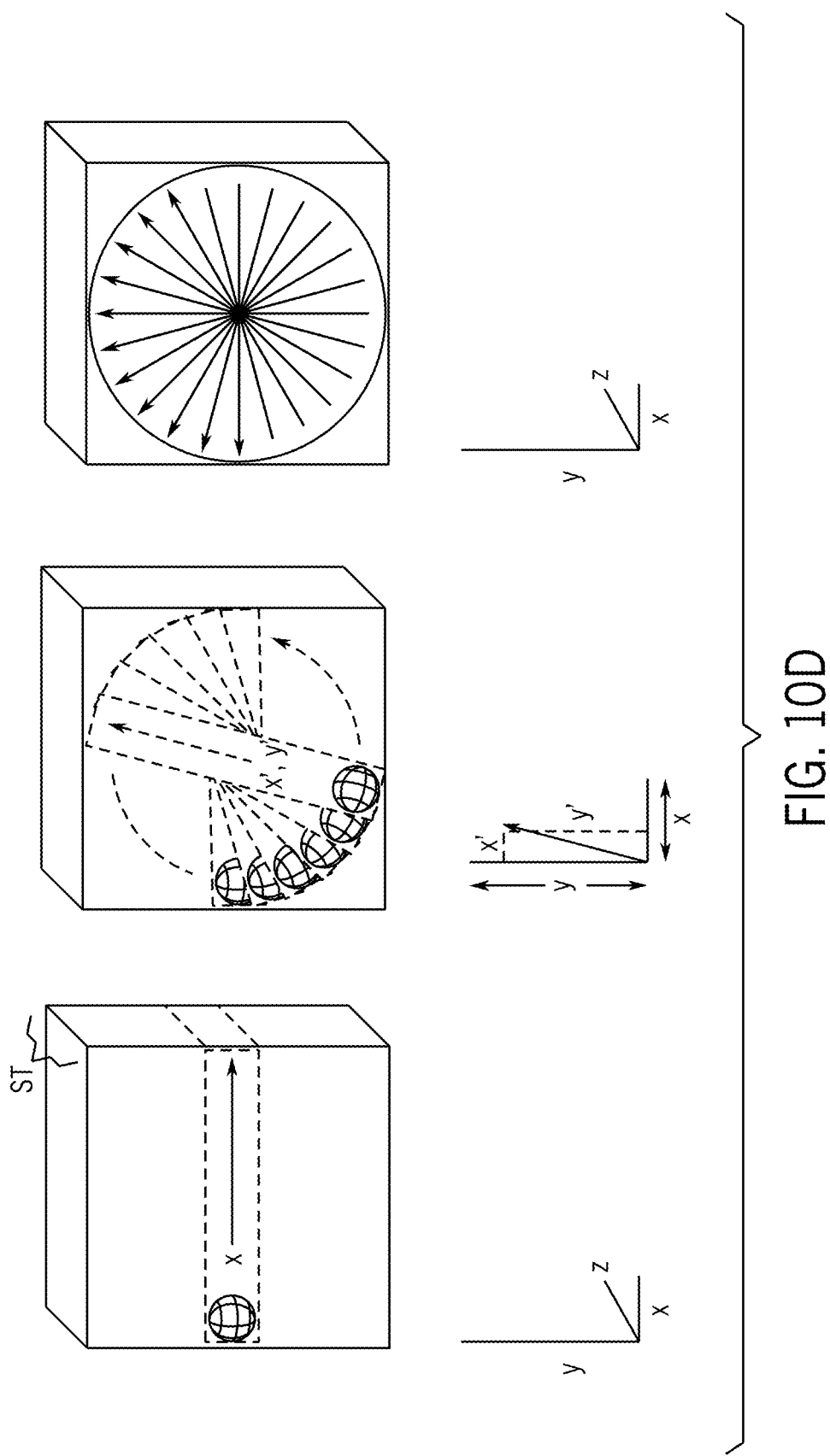

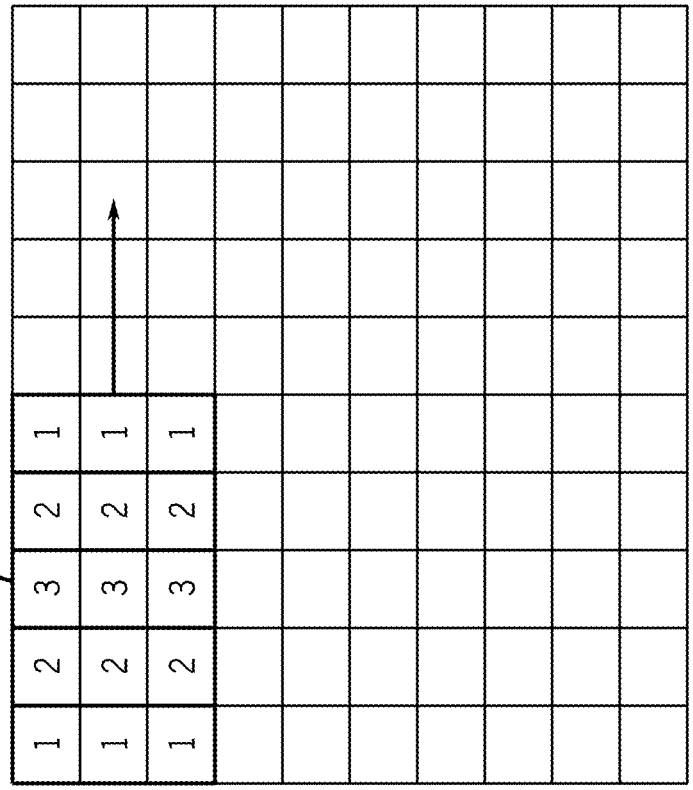
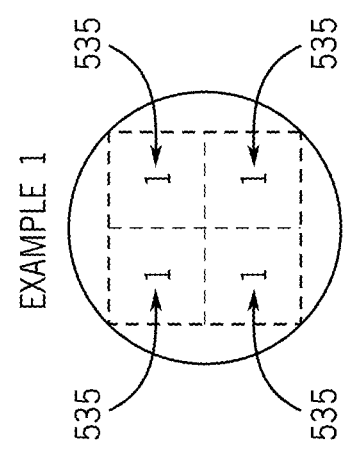
FIG. 18A

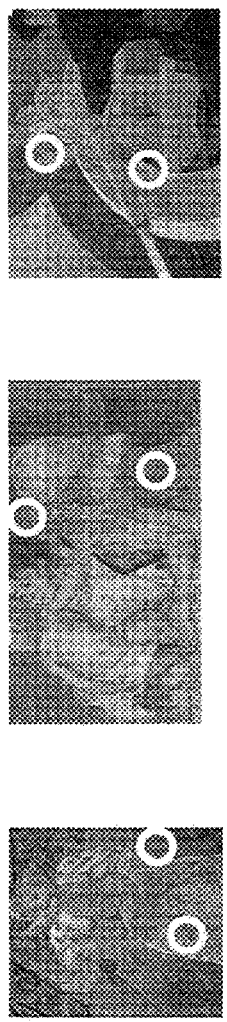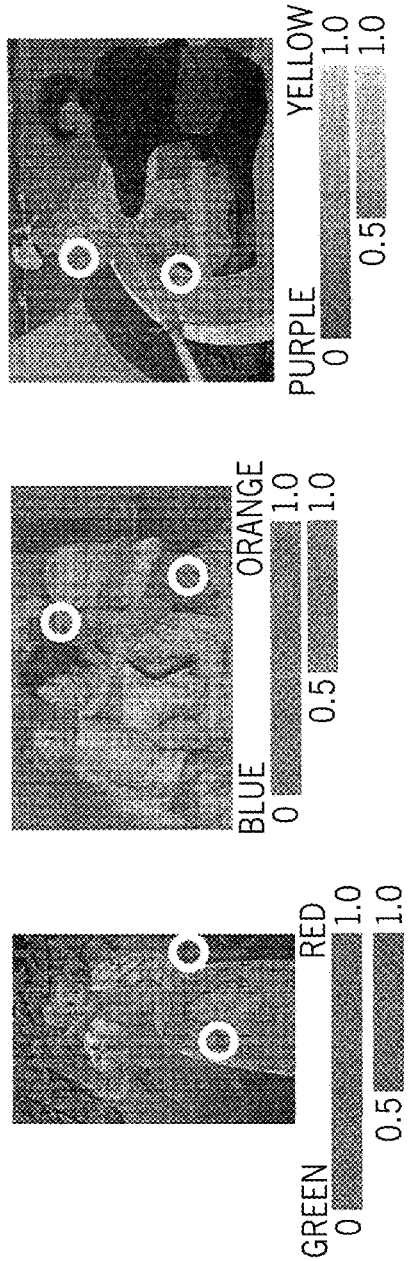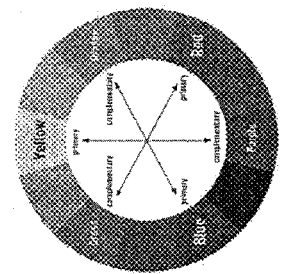
FIG. 22

PARAMETER DESCRIPTIONS

| "PARENT PARAMETER" | SUBSET PARAMETER | BRIEF DESCRIPTION | WHY USEFUL? | MRI ACQUISITION | BRIEF DESCRIPTION OF IMAGING ACQUISITION TECHNIQUE | BRIEF DESCRIPTION OF DATA PROCESSING | HOW DO PARAMETER MEASURES COMPARE TO NORMAL TISSUE? |
|---|---|---|---|---|---|---|---|
| T1 | NON-CONTRAST | SPIN-LATTICE RELAXATION TIME=STANDARD MRI "WEIGHTING" FOR T1, REPRESENTING TIME CONSTANT FOR LONGITUDINAL RELAXATION | DECREASED IN TUMORS COMPARED TO NORMAL TISSUE, BUT NONSPECIFIC | VARIOUS METHODS, SPIN ECHO METHODS PROVIDE EXCELLENT SNR AND RESOLUTION | STANDARD MRI METHOD WITH VARIOUS METHODS INCLUDING SPIN ECHO, GRADIENT RECALL ECHO, ETC. | | T1 TUMOR < T1 NORMAL |
| | T1-STANDARD | | | | | DIRECT MEASURES OF SIGNAL AT A GIVEN ECHO TIME (TE). SIGNAL STRENGTH IS A FUNCTION OF SHAPE OF SIGNAL RECOVERY (LOGARITHMIC) AND TE | |
| | T1 MAPPING | | | VARIOUS TECHNIQUES EXIST. DEON IS A MORE KNOWN METHOD | VARIES | PROVIDES A DIRECT MEASURE OF THE T1 VALUE OF THE TISSUE=A PARAMETER WHICH DETERMINES THE SHAPE OF THE T1 SIGNAL VERSUS TE CURVE | |
| T1 POST | | SIGNAL ON T1 IMAGES AFTER INTRAVENOUS CONTRAST INJECTION IS INCREASED | ALLOWS GREAT VISUALIZATION OF VESSELS CONTAINING CONTRAST AND TISSUES WITH CONTRAST LEAKAGE | VARIOUS METHODS, SPIN ECHO METHODS PROVIDE EXCELLENT SNR AND RESOLUTION | STANDARD MRI METHOD WITH VARIOUS METHODS INCLUDING SPIN ECHO, GRADIENT ECHO, ETC. | | T1 POST TUMOR > T1 POST NORMAL |
| | T1-POST SUBTRACTION | DETERMINED BY SUBTRACTING T1 PRE CONTRAST IMAGES FROM T1 POST CONTRAST | | | | MEASURE OF SIGNAL POST CONTRAST INJECTION AT A GIVEN TE | T1 POST SUBTRACTION TUMOR > T1 POST SUBTRACTION NORMAL |
| | T1-POST [C] | CONCENTRATION OF CONTRAST IS DIRECTLY DETERMINED AS A FUNCTIONAL OF SIGNAL | ALLOWS DIRECT MEASURES OF MRI CONTRAST CONCENTRATION, USED IN DCE-MRI | MOST OFTEN GRADIENT RECALL ECHO (RE) | STANDARD T1 METHODS | MATHEMATICAL MODELING IS USED TO DETERMINE [C] FROM KNOWN VARIABLES, INCLUDING SIGNAL VALUE | T1 POST [C] > T1 POST [C] NORMAL |
| [C] | | | | | | | |
| FLAIR | | "TAKE OUT" FLUID SIGNAL | MOSTLY USED IN BRAIN TUMORS AND HELPS BETTER DELINEATE REGION OF TUMOR | INVERSION RECOVERY TECHNIQUE THAT ELIMINATES SIGNAL FROM FREE FLUID SUCH AS CSF | | | |
| FLOW | | VARIOUS US AND MRI TECHNIQUES CAN QUANTIFY DIRECTION OF VESSEL FLOW | | TECHNIQUES SUCH AS ASL TAGGED FLOWING BLOOD | | | |

PARAMETER DESCRIPTIONS

| "PARENT PARAMETER" | SUBSET PARAMETER | BRIEF DESCRIPTION | WHY USEFUL? | MRI ACQUISITION | BRIEF DESCRIPTION OF IMAGING ACQUISITION TECHNIQUE | BRIEF DESCRIPTION OF DATA PROCESSING | HOW DO PARAMETER MEASURES COMPARE TO NORMAL TISSUE? |
|---|---|---|---|---|---|---|---|
| T2 | | SPIN-SPIN RELAXATION TIME = STANDARD MRI "WEIGHTING" FOR T2, REPRESENTING TIME CONSTANT FOR TRANSVERSE RELAXATION | INCREASED IN TUMORS COMPARED TO NORMAL TISSUE, BUT NONSPECIFIC | VARIOUS METHODS, SPIN ECHO METHODS PROVIDE EXCELLENT SNR AND RESOLUTION | STANDARD MRI METHOD WITH VARIOUS METHODS INCLUDING SPIN ECHO, STIR, ETC | | T2 TUMOR > T2 NORMAL |
| | T2-STANDARD | | | | | DIRECT MEASURES OF SIGNAL AT A GIVEN ECHO TIME TE. SIGNAL STRENGTH IS A FUNCTION OF SHAPE OF SIGNAL RECOVERY (EXPONENTIAL) AND TE | |
| | T2 MAPPING | | | | | PROVIDES A DIRECT MEASURE OF THE T2 VALUE OF THE TISSUE = A PARAMETER WHICH DETERMINES THE SHAPE OF THE T2 SIGNAL VERSUS TE CURVE | |
| KTRANS | | FORWARD EXHCHANGE CONSTANT = INDEX OF VESSEL LEAKINESS | TUMOR VESSELS ARE MORE LEAKY THAN NORMAL VESSELS | DYNAMIC CONTRAST-ENHANCED MRI (DCE-MRI) | CONTRAST IS INJECTED INTO PATIENT AND SERIAL T1 MRI IMAGES ARE OBTAINED AS CONTRAST ENTERS THE TISSUE | PHARMACOKINETIC MODELS ARE USED THAT MODEL MOTION OF CONTRAST MOLECULES BETWEEN VESSEL AND THE EXTRACELLULAR SPACE | KTRANS TUMOR > KTRANS NORMAL |
| | KTRANS "TOFTS MODEL" (TM) | | | | | DIFFERENT DCE-MRI SOFTWARE PACKAGES USING TM INCLUDE OHSU, VU, UP, ISM, BWH-3D SLICER | |
| | KTRANS "EXTENDED TOFTS MODEL" (TM) | | | | | DIFFERENT DCE-MRI SOFTWARE PACKAGES USING ETM INCLUDE VU, UM, UW, BWH-GE | |
| | KTRANS "SHUTTERSPEED MODEL" (SSM) | | | | | DIFFERENT DCE-MRI SOFTWARE PACKAGES USING SSM INCLUDE OSHU, VU | |
| DELTA KTRANS (Δ KTRANS) | DELTA KTRANS "SHUTTERSPEED MODEL" (SSM) | TAKES DIFFERENCE OF KTRANS MEASURED USING SSM AND TM | RESEARCH SHOWS THAT THIS MEASURE CAN BE HIGHLY SPECIFIC FOR CANCER | DCE-MRI | CONTRAST IS INJECTED INTO PATIENT AND SERIAL MRI IMAGES ARE OBTAINED AS CONTRAST ENTERS THE TISSUE | DIFFERENT DCE-MRI SOFTWARE PACKAGES USING SSM INCLUDE OSHU, VU | Δ KTRANS TUMOR > Δ KTRANS NORMAL |

PARAMETER DESCRIPTIONS

| "PARENT PARAMETER" | SUBSET PARAMETER | BRIEF DESCRIPTION | WHY USEFUL? | MRI ACQUISITION | BRIEF DESCRIPTION OF IMAGING ACQUISITION TECHNIQUE | BRIEF DESCRIPTION OF DATA PROCESSING | HOW DO PARAMETER MEASURES COMPARE TO NORMAL TISSUE? |
|---|---|---|---|---|---|---|---|
| Ve | | VOLUME OF EXCHANGE = VOLUME OF THE EXTRACELLULAR EXTRAVASCULAR SPACE | CONTRAST LEAK FROM VESSELS INTO THE Ve AND THE SIZE OF THIS SPACE CAN VARY | DCE-MRI | CONTRAST IS INJECTED INTO PATIENT AND SERIAL MRI IMAGES ARE OBTAINED AS CONTRAST ENTERS THE TISSUE | PHARMACOKINETIC MODELS ARE USED THAT MODEL MOTION OF CONTRAST MOLECULES BETWEEN VESSEL AND THE EXTRACELLULAR SPACE | VARIES |
| | Ve "TOFTS MODEL" (TM) | | | | | DIFFERENT DCE-MRI SOFTWARE PACKAGES USING TM INCLUDE OSHU, VU, UP, USM, BWH-GE, BWH-3D SLICER | |
| | Ve "EXTENDED TOFTS MODEL" (ETM) | | | | | DIFFERENT DCE-MRI SOFTWARE PACKAGES USING ETM INCLUDE VU, UM, UW, BWH-GE | |
| | Ve "SHUTTERSPEED MODEL" (SSM) | | | | | DIFFERENT DCE-MRI SOFTWARE PACKAGES USING SSM INCLUDE OHSU, VU | |
| Vb | | VOLUME OF BLOOD IN EXCHANGE WITH TISSUE | VASCULARITY VARIES WITH DIFFERENT TUMORS AND CAN VARY AFTER TREATMENT | DCE-MRI | CONTRAST IS INJECTED INTO PATIENT AND SERIAL MRI IMAGES ARE OBTAINED AS CONTRAST ENTERS THE TISSUE | PHARMACOKINETIC MODELS ARE USED THAT MODEL MOTION OF CONTRAST MOLECULES BETWEEN VESSEL AND THE EXTRACELLULAR SPACE | VARIES |
| | Vb "EXTENDED TOFTS MODEL" (ETM) | PARAMETER ONLY DERIVED FROM THE "EXTENDED TOFTS MODEL" (ETM) | | | | DIFFERENT DCE-MRI SOFTWARE PACKAGES USING ETM INCLUDE VU, UM, UW, BWH-GE | |
| Dt | Dt IVIM | MEASURE OF "TRUE" DIFFUSION WITHOUT EFFECTS OF "PSEUDODIFFUSION" AND SIGNAL FROM MOVING BLOOD | CANCERS HAVE HIGHER WATER RESTRICTION THAN NORMAL TISSUES | IVIM FROM DIFFUSION-WEIGHTED IMAGING (DWI) MRI | GRADIENTS AT VARIOUS "B VALUES" OF WEIGHTED ARE APPLIED AND THE SIGNAL IN TISSUE IS MEASURED AT EACH B VALUE | SIMPLE IVIM MATHEMATICAL MODEL IS USED TO DETERMINE Dt FROM SIGNAL DECAY AT VARIOUS B VALUES. B=0 AND OTHER LOW B VALUES ARE USED FOR CALCULATION | Dt TUMOR < Dt NORMAL |

FIG. 29C

PARAMETER DESCRIPTIONS

| "PARENT PARAMETER" | SUBSET PARAMETER | BRIEF DESCRIPTION | WHY USEFUL? | MRI ACQUISITION | BRIEF DESCRIPTION OF IMAGING ACQUISITION TECHNIQUE | BRIEF DESCRIPTION OF DATA PROCESSING | HOW DO PARAMETER MEASURES COMPARE TO NORMAL TISSUE? |
|---|---|---|---|---|---|---|---|
| Dp | Dp IVIM | MEASURE OF PSEUDODIFFUSION | | IVIM FROM DWI MRI | GRADIENTS AT VARIOUS "B VALUES" OF WEIGHTING ARE APPLIED AND THE SIGNAL IN TISSUE IS MEASURED AT EACH B VALUE | SIMPLE IVIM MATHEMATICAL MODEL IS USED TO DETERMINE fp FROM SIGNAL DECAY AT VARIOUS B VALUE, B=0 AND OTHER LOW B VALUES ARE USED FOR CALCULATION | VARIES |
| fp | fp IVIM | FRACTIONAL PLASMA VOLUME | VASCULARITY VARIES WITH DIFFERENT TUMORS AND CAN VARY AFTER TREATMENT | IVIM FROM DWI MRI | GRADIENTS AT VARIOUS "B VALUES" OF WEIGHTING ARE APPLIED AND THE SIGNAL IN TISSUE IS MEASURED AT EACH B VALUE | SIMPLE IVIM MATHEMATICAL MODEL IS USED TO DETERMINE fp FROM SIGNAL DECAY AT VARIOUS B VALUE, B=0 AND OTHER LOW B VALUES ARE USED FOR CALCULATION | VARIES |
| tau | tau "SHUTTERSPEED MODEL" (SSM) | TAU IS AN EXTRA PARAMETER ADDED TO THE SSM TO MODEL TIME FOR PROTONS TO COMPLEX WITH MRI CONTRAST | RESEARCH SHOWS THAT THIS MEASURE CAN BE HIGHLY SPECIFIC FOR CANCERS, LIKELY RELATED TO SODIUM LEVELS | DCE-MRI | CONTRAST IS INJECTED INTO PATIENT AND SERIAL MRI IMAGES ARE OBTAINED AS CONTRAST ENTERS THE TISSUE | DIFFERENT DCE-MRI SOFTWARE PACKAGES USING SSM INCLUDE CHSU, VU | tau TUMOR > tau NORMAL |
| HYPERPOLARIZED MRI | VARIOUS TYPES OF HY MRI PARAMETERS | HYPERPOLARIZED C13 SUBSTRATES INJECTED AND IMAGED | CAN IMAGE MANY METABOLITES, AS WELL AS QUANTIFY pH | | | | |
| ADC | | MEASURE OF RESTRICTION OF RANDOM WATER MOTION | CANCERS HAVE HIGHER WATER RESTRICTION THAN NORMAL TISSUES | DWI MRI | GRADIENTS AT VARIOUS "B VALUES" OF WEIGHTING ARE APPLIED AND THE SIGNAL IN TISSUE IS MEASURED AT EACH B VALUE | | ADC TUMOR < ADC NORMAL |
| | ADC STANDARD | | | | | B VALUE OF "ZERO" IS FIRST MEASURE=NO GRADIENT SIGNAL AT VARIOUS OTHER B VALUES ARE THEN ALSO MEASURED ADC IS THE SLOPE OF THE LOG OF THE SIGNAL DECAY. SIGNAL DOES NOT DECAY AS QUICKLY IN TUMORS | |
| | ADC HIGH B-VALUES | | | | | ADC IS MEASURED ONLY FOR HIGH B VALUES EXCLUDING B=0, TYPICALLY HIGH B VALUES RANGE UP TO 110 | |

PARAMETER DESCRIPTIONS

| "PARENT PARAMETER" | SUBSET PARAMETER | BRIEF DESCRIPTION | WHY USEFUL? | MRI ACQUISITION | BRIEF DESCRIPTION OF IMAGING ACQUISITION TECHNIQUE | BRIEF DESCRIPTION OF DATA PROCESSING | HOW DO PARAMETER MEASURES COMPARE TO NORMAL TISSUE? |
|---|---|---|---|---|---|---|---|
| ADCo | ADCo OSCILLATING GRADIENT SPIN ECHO (OGSE) | BETTER ABLE TO PROBE INTRACELLULAR SIGNAL | CANCERS HAVE HIGHER WATER RESTRICTION THAN NORMAL TISSUES | OSCILLATING GRADIENTS WITH DWI MRI | OGSE AT VARIOUS "B VALUES" OF WEIGHTING, BUT THE GRADIENTS ARE OSCILLATED | ADC IS MEASURED IN A SIMILAR MANNER OF STANDARD ADC | ADC TUMOR < ADC NORMAL |
| KEP | | REVERSE EXCHANGE CONSTANT=INDEX OF VESSEL LEAKINESS | TUMOR VESSELS ARE MORE LEAKY THAN NORMAL VESSELS | DCE-MRI | CONTRAST IS INJECTED INTO PATIENT AND SERIAL MRI IMAGES ARE OBTAINED AS CONTRAST ENTERS THE TISSUE | PHARMACOKINETIC MODELS ARE USED THAT MODEL MOTION OF CONTRAST MOLECULES BETWEEN VESSELS AND THE EXTRACELLULAR SPACE | KEP TUMOR > KEP NORMAL |
| | KEP "TOFTS MODEL" (TM) | | | | | DIFFERENT DCE-MRI SOFTWARE PACKAGES USING TM INCLUDE OHSU, VU, UP, ISM, BWHGE, BWH-3D SLICER | |
| | KEP "EXTENDED TOFTS MODEL" (ETM) | | | | | DIFFERENT DCE-MRI SOFTWARE PACKAGES USING ETM INCLUDE VU, UW, UW, BWH-GE | |
| | KEP "SHUTTERSPEED MODEL" (SSM) | | | | | DIFFERENT DCE-MRI SOFTWARE PACKAGES USING SSM INCLUDE OHSU, VU | |
| AUC | | AREA UNDER THE CURVE OF SIGNAL FROM CONTRAST ENTERING TUMOR OVER TIME | PROVIDES A "SEMI-QUANTITATIVE" MEASURE OF TUMOR VESSEL LEAKAGE | DCE-MRI | CONTRAST IS INJECTED INTO PATIENT AND SERIAL MRI IMAGES ARE OBTAINED AS CONTRAST ENTERS THE TISSUE | GRAPHS ARE CREATED OF SIGNAL FROM CONTRAST ENTERING TUMOR OVER TIME FOR EACH VOXEL AND AUC IS CALCULATED | AUC TUMOR > AUC NORMAL |
| TTP | | TIME TO PEAK=MEASURE OF POINT OF MAXIMUM CONTRAST ON TUMOR CURVE | PROVIDES A "SEMI-QUANTITATIVE" MEASURE, MOSTLY INDICATIVE OF VASCULARITY | DCE-MRI | CONTRAST IS INJECTED INTO PATIENT AND SERIAL MRI IMAGES ARE OBTAINED AS CONTRAST ENTERS THE TISSUE | GRAPHS ARE CREATED OF SIGNAL FROM CONTRAST ENTERING TUMOR OVER TIME FOR EACH VOXEL AND TTP IS CALCULATED | TTP TUMOR > TTP NORMAL |
| MPE | | MAXIMAL PEAK ENHANCEMENT=MAXIMAL CONCENTRATION IN TUMOR DURING TUMOR TIME CURVE | PROVIDES A "SEMI-QUANTITATIVE" MEASURE, MOSTLY INDICATIVE OF VASCULARITY | DCE-MRI | CONTRAST IS INJECTED INTO PATIENT AND SERIAL MRI IMAGES ARE OBTAINED AS CONTRAST ENTERS THE TISSUE | GRAPHS ARE CREATED OF SIGNAL FROM CONTRAST ENTERING TUMOR OVER TIME FOR EACH VOXEL AND MPE IS CALCULATED | MPE TUMOR > MPE NORMAL |

PARAMETER DESCRIPTIONS

| "PARENT" PARAMETER | SUBSET PARAMETER | BRIEF DESCRIPTION | WHY USEFUL? | MRI ACQUISITION | BRIEF DESCRIPTION OF IMAGING ACQUISITION TECHNIQUE | BRIEF DESCRIPTION OF DATA PROCESSING | HOW DO PARAMETER MEASURES COMPARE TO NORMAL TISSUE? |
|---|---|---|---|---|---|---|---|
| Df | Df BIEXPONENTIAL | FAST DIFFUSION COMPONENT | INDEX OF "FAST" DIFFUSION AT LOW B VALUES | DWI MRI | GRADIENTS AT VARIOUS "B VALUES" OF WEIGHTING ARE APPLIED AND THE SIGNAL IN TISSUE IS MEASURED AT EACH B VALUE | A BIEXPONENTIAL FIT MODEL IS APPLIED TO THE GRAPH OF SIGNAL DECAY | VARIES |
| D | Ds BIEXPONENTIAL | SLOW DIFFUSION COMPONENT | INDEX OF "SLOW" DIFFUSION AT HIGH B VALUES | | | | Ds TUMOR > Ds NORMAL |
| | | DIFFUSION PARAMETER "FIT" FROM MODELING OF THE SIGNAL DECAY | CANCERS HAVE HIGHER WATER RESTRICTION THAN NORMAL TISSUES | DWI MRI | GRADIENTS AT VARIOUS "B VALUES" OF WEIGHTING ARE APPLIED AND THE SIGNAL IN TISSUE IS MEASURED AT EACH B VALUE | | |
| | D STRETCHED BIEXPONENTIAL | | | | | A "STRETCHED" BIEXPONENTIAL FIT MODEL IS APPLIED TO THE GRAPH OF SIGNAL DECAY | D TUMOR > D NORMAL |
| | D KURTOSIS | | | | | A KURTOSIS FIT MODEL IS APPLIED TO THE GRAPH OF SINGAL DECAY | D TUMOR > D NORMAL |
| CBF | | MEASURES OS SIGNAL FROM MOVING BLOOD | TUMORS OFTEN HAVE INCREASED BLOOD FLOW | DIFFERENT MRI ACQUISITIONS ARE USED FOR CBF MEASURES | | | |
| | CBF-ASL | | | VARIOUS ASL PULSE SEQUENCES EXIST | ARTERIAL SPIN LABELING (ASL) "TAGS" MOVING BLOOD AND MEASURES SIGNAL IN A VOLUME OF INTEREST | SIGNAL IS DIRECTLY MEASURED | |
| | CBF-DSC | ONLY USED FOR BRAIN TUMORS; DOES NOT WORK IN BODY IMAGING | | VARIOUS DSC, BUT USUALLY A ECHO PLANAR SEQUENCE IS USED | T2* EFFECTS MEASURE SIGNAL DROP AFTER A BOLUS INJECTION OF CONTRAST; DEGREE OF DROP CORRELATES WITH AMOUNT OF SIGNAL FROM BLOOD | MODELS OF SIGNAL CHANGES ARE USED TO EXTRACT PARAMETERS, MOST INTERESTING OF WHICH ARE CBF AND CBV | CBF TUMOR > CBF NORMAL |

PARAMETER DESCRIPTIONS

| "PARENT PARAMETER" | SUBSET PARAMETER | BRIEF DESCRIPTION | WHY USEFUL? | MRI ACQUISITION | BRIEF DESCRIPTION OF IMAGING ACQUISITION TECHNIQUE | BRIEF DESCRIPTION OF DATA PROCESSING | HOW DO PARAMETER MEASURES COMPARE TO NORMAL TISSUE? |
|---|---|---|---|---|---|---|---|
| R* | | INDEX OF OXYGENATION, BOLD IMAGING | HYPOXIC REGIONS OF CANCERS ARE MOST RESISTANT TO VARIOUS TREATMENTS | INTRINSIC SUSCEPTIBILITY IMAGING (ISI) USING VARIOUS PULSE SEQUENCES SENSITIVE TO T2* EFFECTS | T2* EFFECTS MEASURES SIGNAL IN REGIONS OF RELATIVE DECREASED OXYGENATION | | R* TUMOR < R* NORMAL |
| RSI-CM | | MEASURE OF RESTRICTION OF INTRACELLULAR RANDOM WATER MOTION | BETTER DIFFERENTIATES TUMOR FROM NORMAL AND EDEMA | RESONANCE SPECTRAL IMAGING (RSI) FROM DWI MRI | GRADIENTS AT VARIOUS "B VALUES" UP TO 4000 ARE APPLIED AND THE SIGNAL IN TISSUE IS MEASURED AT EACH B VALUE | A LINEAR MIXTURE MODEL IS USED TO MODEL SIGNAL ACROSS B VALUES, DOES NOT ASSUME GAUSSIAN LIKE DTI (BELOW) | RSI-CM TUMOR > RSI-CM NORMAL |
| VARIOUS DTI TENSOR PARAMETERS | TENSOR MEASURES | VARIOUS TENSOR PARAMETER PROVIDE INFO ON DIRECTION OF WATER DIFFUSION | SOME GOOD RECENT APPLICATIONS FOR TUMORS, BUT MAINLY USED FOR TRACTOGRAPHY | DIFFUSION TENSOR IMAGING (DTI) FROM DWI MRI | GRADIENTS ARE APPLIED IN MANY DIRECTIONS USING A FEW B VALUES | MODELS ARE APPLIED TO DETERMINE DIRECTION OF WATER MOTION BASED AN ASSUMPTION OF A GAUSSIAN DISTRIBUTION | VARIES |
| Na | | MEASURES SODIUM (Na) CONTENT IN TISSUES BY EXCITING Na INSTEAD OF H (PROTONS) | ELEVATED SODIUM IS VERY SPECIFIC FOR CANCER | SPECIAL COILS ETC FOR SODIUM IMAGING. Na IMAGING WILL IMPROVE WITH INCREASING FIELD STRENGTH AND NEW 7 TESLA MRI MACHINES | Na IS EXCITED INSTEAD OF H, AND SIGNAL IS DETECTED | SIGNAL IS MEASURED AT EACH VOXEL AND CORRELATES TO Na LEVELS | Na TUMOR > Na NORMAL |
| SPECTROSCOPY MRI | | IMAGING OF VARIOUS PEAKS FOLLOWING EXCITATION. FOR EXAMPLE CAN QUANTIFY INCREASE LACTATE IN TUMORS | | | | | |
| CEST | VARIOUS TYPES OF CEST PARAMETERS | ALLOWS INDIRECT DETECTION OF METABOLITES WITH EXCHANGEABLE PROTONS USING SPECIAL CONTRAST AGENTS | | T1 POST CONTRAST METHOD | | | |
| MRI FINGER-PRINTING | | NEW METHOD THAT ALLOWS FOR SIMULTANEOUS QUANTIFICATION OF MULTIPLE MR PROPERTIES IN TISSUE DURING A SINGLE ACQUISITION | POTENTIALLY FASTER AS WELL AS MORE SENSITIVE AND SPECIFIC MR METHOD | | | | |

PARAMETER DESCRIPTIONS

| "PARENT PARAMETER" | SUBSET PARAMETER | BRIEF DESCRIPTION | WHY USEFUL? | MRI ACQUISITION | BRIEF DESCRIPTION OF IMAGING ACQUISITION TECHNIQUE | BRIEF DESCRIPTION OF DATA PROCESSING | HOW DO PARAMETER MEASURES COMPARE TO NORMAL TISSUE? |
|---|---|---|---|---|---|---|---|
| MRI CONTRAST AGENTS | | VARIOUS CONTRAST AGENTS AVAILABLE OR BEING DEVELOPED TO COMPLEX WITH GADOLINIUM (THE STANDARD MRI CONTRAST AGENT) | THESE DEVELOPING TECHNIQUES OFFER THE POTENTIAL FOR ENORMOUS VARIETY IN SPECIFIC CHARACTERIZATION OF CANCER RECEPTORS, METABOLITES, STEM CELL TRACKING ETC. | USUALLY STANDARD T1 SEQUENCES | CONTRAST AGENT INJECTED AND MRI IMAGES OBTAINED | | |
| | GADOXETATE (EVOIST) | SPECIFIC FOR UPTAKE BY LIVER HEPATIC CELLS | GREAT FOR SENSITIVE IDENTIFICATION OF LIVER METS | CURRENTLY FDA APPROVED AND CLINICALLY USED | | | E TUMOR<E NORMAL |
| | RECEPTOR IMAGING | VARIOUS PROBES TO TARGET RECEPTORS OVEREXPOSED IN CANCERS | EXAMPLES INCLUDE HORMONE RECEPTORS IN BREAST CANCER, EGFR IMPORTANT FOR METS, ETC. | | | | |
| | USPIO | VERY SENSITIVE IRON OXIDE AGENTS, SIGNAL LOSS WITH UPTAKE IN NORMAL LYMPH NODES | GREAT FOR IDENTIFYING LYMPH NODES METASTASIS IN VIVO | | T2* EFFECTS | | |
| | F19 MRI | USED TO LABEL AND TRACK STEM CELLS | | | | | |
| | NANOPARTICLES / THERNOSTICS | AREA OF RESEARCH AIMED AT CREATING NANOPARTICLES TO ENTER CANCER CELLS AND DELIVER TREATMENT | USUALLY COMPLEXED WITH MRI CONTRAST AGENT FOR VISUALIZATION | | | | |

FIG. 29H

PARAMETER DESCRIPTIONS

| "PARENT PARAMETER" | SUBSET PARAMETER | BRIEF DESCRIPTION | WHY USEFUL? | BRIEF DESCRIPTION OF DATA PROCESSING |
|---|---|---|---|---|
| SUVmax FROM PET | | STANDARD PET/CT MEASURES UPTAKE OF F18, A MEASURE OF GLYCOLYSIS | IN GENERAL, NUCLEAR MEDICINE TECHNIQUES OFFER MORE SIGNAL FROM A "SMALLER" EVENT-THE DISADVANTAGES IS POOR RESOLUTION | CT OR MRI AND PET ARE REGISTERED AND SUVmax IS DETERMINED AFTER CALIBRATION FOR CT ATTENUATION ETC |
| | SUVmax F18 FDG | | SOME TUMOR TYPES AND ADVANCED TUMORS HAVE INCREASED UPTAKE, BUT ONLY FOR SELECT CANCERS | |
| | SUVmax F18-CHOLINE | | HAS SHOWN INCREASED SPECIFICITY FOR PROSTATE CANCER METASTASIS | |
| | SUVmax F18-FLT | | MORE SENSITIVE FOR CANCERS | |
| PET TRACERS | VARIOUS PET TRACERS ARE UNDER INVESTIGATION FOR TARGETED SPECIFIC RECEPTORS ETC. | | | |

FIG. 29I

PARAMETER DESCRIPTIONS

| "PARENT PARAMETER" | SUBSET PARAMETER | BRIEF DESCRIPTION | WHY USEFUL? | BRIEF DESCRIPTION OF ACQUISITION TECHNIQUE | HOW DO PARAMETER MEASURES COMPARE TO NORMAL TISSUE? |
|---|---|---|---|---|---|
| HETEROGENEITY FEATURES | | MEASURE OF HETEROGENEITY HAVE SHOWN STRONG CORRELATION WITH TUMOR GENETICS=RADIOGENOMICS | MODELS CAN BE APPLIED TO CT OR MRI OR PET | | HETEROGENEITY TUMOR > HETEROGENEITY NORMAL |
| | HOT SPOT MEASURES | REGIONS OF INTEREST (ROIs) ARE PLACED ONLY IN MAPPING AREAS SHOWING LARGEST OR SMALLEST VALUES | BETTER CORRELATION TO TUMOR GRADING, STAGING, ETC. | | |
| | HISTOGRAM METHODS | PROVIDES INFO ON HISTOGRAMS, FOR EXAMPLE VALUE FOR PEAK HEIGHT, STANDARD DEVIATION, SKEW, KURTOSIS, ETC. | SOME STUDIES SHOW THIS ANALYSIS CORRELATES BETTER TO TUMOR CHARACTERISTICS THAN HOT SPOT ANALYSIS | | |
| | Xf | MEASURES OF FRACTION OF A CERTAIN PARAMETER, FOR EXAMPLE FRACTION OF ENHANCING VOXELS | BETTER CORRELATION TO TUMOR GRADING, STAGING, ETC. | | |
| | TEXTURAL ANALYSIS | HARALICK METHOD MOST OFTEN USED | | | |
| | FRACTAL TECHNIQUES | IMPOSING REGULAR GRIDS OF A RANGE OF SCALES ON A BINARY OBJECT IN QUESTION AND THEN COUNTING THE NUMBER OF GRID ELEMENTS (BOXES) THAT ARE OCCUPIED BY THE OBJECT AT EACH SCALE | | | |
| | MINKOWSKI FUNCTIONALS | ANALYSE BINARIZED IMAGES OVER A RANGE OF THRESHOLDS AND ALSO QUANTIFY SPACE-FILLING PROPERTIES OF TUMORS | | | |
| CLUSTER TECHNIQUES | | MULTI-SPECTRAL ANALYSES USE PATTERN RECOGNITION TECHNIQUES THAT SIMULTANEOUSLY ANALYZE IMAGES TO IDENTIFY VOXEL CLUSTERS IN A MULTI-DIMENSIONAL FEATURE SPACE. A CLASSIFIER THEN GROUPS INDIVIDUAL VOXELS TOGETHER BASED ON THEIR SIMILARITIES AND DIFFERENCES. | STARTS TO APPROACH OF TECHNIQUES. LIMITATIONS WITH THESE TECHNIQUES IS FOR DEMONSTRATING CHANGES AFTER TREATMENT DUE TO CHANGING SIZES OF SUBREGIONS. OTHER RESEARCH (i.e. FDM) INDICATES THAT ROI BEFORE AND AFTER TREATMENT SHOULD BE HELD CONSTANT | GROUP MULTIPARAMETER DATA WITH CLUSTERING SEARCHES FOR VOXELS DEMONSTRATING CERTAIN PATTERNS | |

FIG. 29J

PARAMETER DESCRIPTIONS

| "PARENT PARAMETER" | BRIEF DESCRIPTION |
|---|---|
| RAMAN IMAGING | IMAGES BASED ON RAMAN SPECTRUM, RESOLUTION TO 25NM, HUMAN SCALE RAMAN SPECTROSCOPY AND CONTRAST AGENTS ARE BEING DEVELOPED |
| MICRO_PET | ANIMAL IMAGING ONLY, WITH MULTIPLE PROBES WITH PET |
| BIOLUMINESCENCE OPTICAL IMAGING | ANIMAL IMAGING ONLY, FLUESCENT TAGS TO MARKERS IN VIVO |
| ULTRASOUND | US IS GENERALLY ONLY USED FOR CLINICAL IDENTIFICATION. SOME RESEARCH WITH ULTRASOUND "MOLECULAR IMAGING" TRACERS WHICH COULD BE MARRIED WITH TREATMENT OPTIONS SUCH AS HIGH INTENSITY FOCUSED ULTRASOUND US IS ALSO USED TO IDENTIFY BIOPSY LOCATION AND TO FUSE IMAGES WITH OTHER MODALITIES SUCH AS MRI. US HAS A LIMIT ROLE FOR QUANTIFICATION OF PARAMETER MEASURES |
| NANO-MRI | EVOLVING TECHNOLOGY USING MRI FOR NANOSCALE IMAGING |

FIG. 29K

ITERATIVE BACK PROJECTION FINAL SR VOXEL SOLUTION

COMPILED M, R, W VALUES FOR EACH SR VOXEL

|    | M | R | W | M | R | W | M | R | W | M | R | W | M | R | W | M | R | W | M | R | W |
|----|---|---|---|---|---|---|---|---|---|---|---|---|---|---|---|---|---|---|---|---|---|
| v1 | 0.2 | 0.3 | 5 | 0.5 | 0.2 | 10 | | | | | | | | | | | | | | | |
| v2 | 0.3 | 0.6 | 30 | 0.5 | 0.5 | 20 | 0.2 | 0.3 | | | | | | | | | | | | | |
| v3 | 0.8 | 0.8 | 70 | 0.7 | 0.4 | 40 | 0.1 | 0.1 | 80 | | | | | | | | | | | | |
| v4 | 0.9 | 0.7 | 60 | 0.8 | 0.5 | 40 | 0.6 | 0.2 | 50 | | | | | | | | | | | | |
| v5 | 0.9 | 0.9 | 100 | | | | | | | | | | | | | | | | | | |
| v6 | 0.6 | 0.5 | 20 | 0.8 | 0.4 | 10 | 0.6 | 0.3 | 5 | 0.5 | 0.2 | 20 | 0.2 | 0.2 | 20 | 0.2 | 0.2 | 30 | 0.4 | 0.1 | 10 |

← HIGHEST RANKED MAP VALUES

← LOWEST RANKED MAP VALUES

EACH MAP VALUE (M) IN EACH VOXEL (V1, V2, V3, V4, V5, V6,) IS ASSIGNED A RANK (R) AND A WEIGHT (W)

FIG. 33

SYSTEM AND METHOD FOR FORMING A SUPER-RESOLUTION BIOMARKER MAP IMAGE

CROSS-REFERENCES TO RELATED PATENT APPLICATIONS

This application claims priority to U.S. Provisional Patent Application No. 62/357,768, filed on Jul. 1, 2016, the entirety of which is incorporated by reference herein. This application also incorporates by reference U.S. patent application Ser. No. 14/821,703, filed Aug. 8, 2015, U.S. patent application Ser. No. 14/821,700, filed Aug. 8, 2015, and U.S. patent application Ser. No. 15/165,644, filed May 26, 2016, in each of their respective entireties.

BACKGROUND

The following description is provided to assist the understanding of the reader. None of the information provided or references cited is admitted to be prior art.

Tumor heterogeneity refers to the propensity of different tumor cells to exhibit distinct morphological and phenotypical profiles. Such profiles may include cellular morphology, gene expression, metabolism, motility, proliferation, and metastatic potential. Recent advancements show that tumor heterogeneity is a major culprit in treatment failure for cancer. To date, no clinical imaging method exists to reliably characterize inter-tumor and intra-tumor heterogeneity. Accordingly, better techniques for understanding tumor heterogeneity would represent a major advance in the treatment of cancer.

SUMMARY

The foregoing summary is illustrative only and is not intended to be in any way limiting. In addition to the illustrative aspects, embodiments, and features described above, further aspects, embodiments, and features will become apparent by reference to the following drawings and the detailed description.

In accordance with one aspect of the present disclosure, a method is disclosed. The method includes receiving, by an image computing unit, image data from a sample, such that the image data corresponds to one or more image datasets, and each of the image datasets comprises a plurality of images, receiving selection, by the image computing unit, of at least two image datasets from the one or more image datasets having the image data, and creating, by the image computing unit, three-dimensional (3D) matrices from each of the at least two image datasets that are selected. The method also includes refining, by the image computing unit, the 3D matrices, applying, by the image computing unit, one or more matrix operations to the refined 3D matrices, and receiving, by the image computing unit, selection of matrix column from the 3D matrices. The method further includes applying, by the image computing unit, a convolution algorithm to the selected matrix column for creating a two-dimensional (2D) matrix, and applying, by the image computing unit, a reconstruction algorithm to create a super-resolution biomarker map (SRBM) image.

In accordance with another aspect of the present disclosure, a reconstruction method is disclosed. The reconstruction method includes generating, by an image computing unit, a two-dimensional (2D) matrix that corresponds to probability density functions for a biomarker, identifying, by the image computing unit, a first color scale for a first moving window, and computing, by the image computing unit, a mixture probability density function for each voxel of a super resolution biomarker map (SRBM) image based on first moving window readings of the first moving window from the 2D matrix. The reconstruction method also includes determining, by the image computing unit, a first complementary color scale for the mixture probability density function of each voxel, identifying, by the image computing unit, a maximum a posteriori (MAP) value based on the mixture probability density function, and generating, by the image computing unit, the SRBM image based on the MAP value of each voxel using the first complementary color scale.

In accordance with yet another aspect of the present disclosure, an image computing system is disclosed. The image computing system includes a database configured to store image data and an image computing unit. The image computing unit is configured to retrieve the image data from the database, such that the image data corresponds to one or more image datasets, and each of the image datasets comprises a plurality of images. The image computing unit is further configured to receive selection of at least two image datasets from the one or more image datasets having the image data, create three-dimensional (3D) matrices from each of the at least two image datasets that are selected, and refine the 3D matrices. The image computing unit is additionally configured to apply one or more matrix operations to the refined 3D matrices, receive selection of matrix column from the 3D matrices, and apply a convolution algorithm to the selected matrix column for creating a two-dimensional (2D) matrix. The image computing unit is additionally configured to apply a reconstruction algorithm to create a super-resolution biomarker map (SRBM) image.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

FIG. 1C depicts a table of example biomarkers and/or tissue characteristics, in accordance with an illustrative breast and prostate cancer embodiment.

FIG. 8B depicts a cross-sectional view of the image from FIG. 7A in which the moving window has a cylindrical shape.

FIG. 10D depicts an example in which the image slices the sample are taken at additional multiple different angles in a radial pattern, in accordance with an illustrative embodiment.

FIG. 18A depicts an example "read count kernel" for determining a number of moving window reads per voxel, in accordance with an illustrative embodiment.

FIG. 22 depicts an example of determining color scales for various moving window shapes to be used in the image reconstruction method of FIG. 21, in accordance with an illustrative embodiment.

FIGS. 29A-29K depict charts of example matching parameters for use in analyzing image datasets, in accordance with an illustrative embodiment.

FIG. 33 depicts another example of ranking the MAP values using the iterative back projection, in accordance with an illustrative embodiment.

DETAILED DESCRIPTION

Figure 1A:
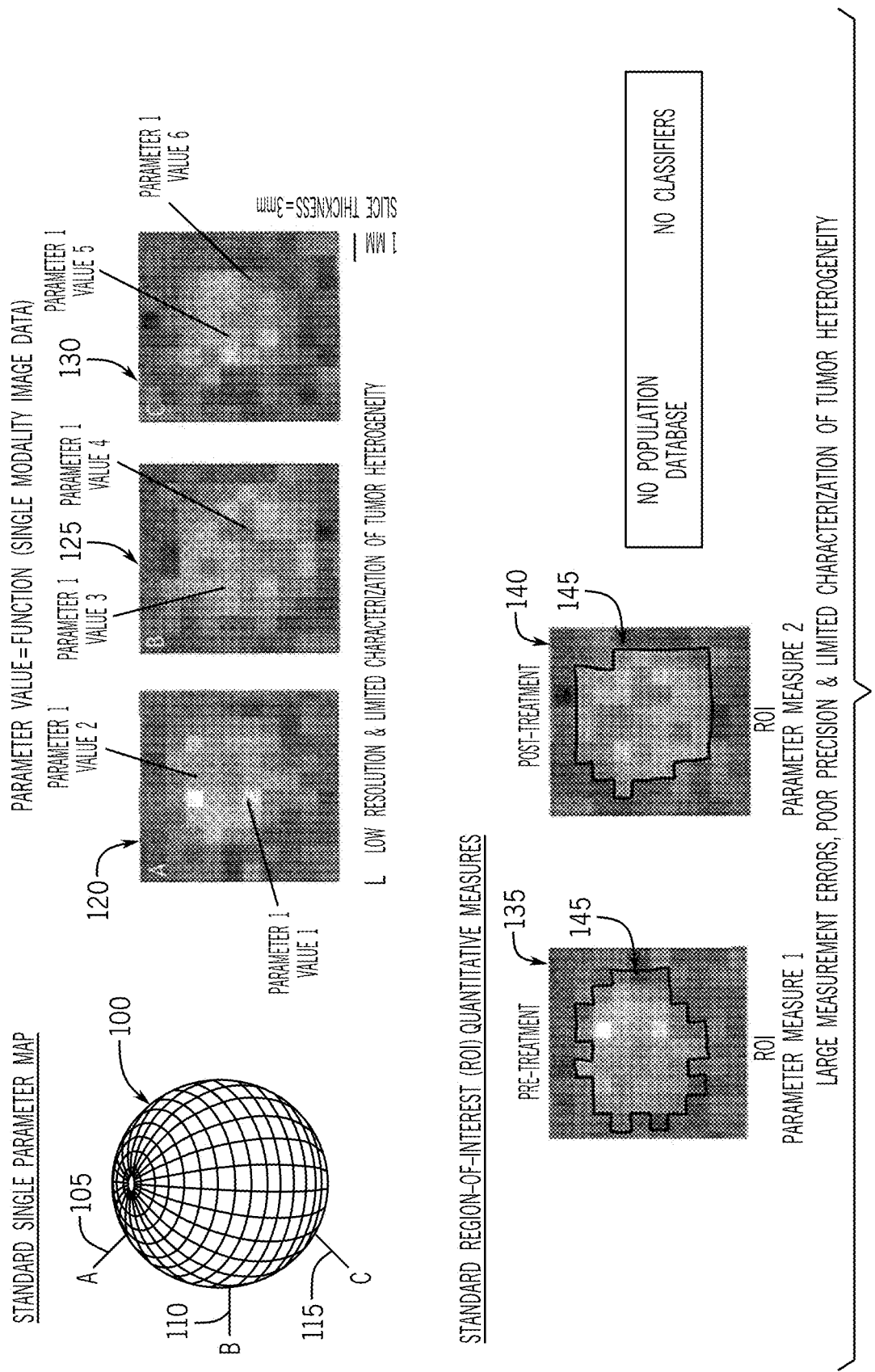
FIG. 1A depicts images and parameter maps obtained from a sample.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Precision medicine is a medical model that proposes the customization of healthcare practices by creating advancements in disease treatments and prevention. The precision medicine model takes into account individual variability in genes, environment, and lifestyle for each person. Additionally, precision model often uses diagnostic testing for selecting appropriate and optimal therapies based on a patient's genetic content or other molecular or cellular analysis. Advances in precision medicine using medical images identification of new imaging biomarkers, which may be obtained through collection and analysis of big data.

A biomarker (also referred to herein as an image biomarker or imaging biomarker) measures a biological state or process, providing scientific and clinical information about a disease to guide treatment and management decisions. For example, biomarkers may answer medical questions such as: Will a tumor likely respond to a given treatment? Is the tumor an aggressive subtype? Is a tumor responding to a drug? Thus, a biomarker is a characteristic that is objectively measured and evaluated as an indicator of normal biological processes, pathogenic processes, or pharmacologic responses to a treatment. The biomarkers are typically identified and/or measured from medical images obtained from a subject, and by comparing and analyzing the images of the subject with similar images of other subjects stored within a database.

Examples of imaging tumor biomarkers may include, but are not limited to, multi-parameter magnetic resonance imaging (MRI) for detection of prostate tumors using a PI-RADS system (e.g., using scoring with T2, DWI, and DCE-MRI sequences), liver tumor detection with an LI-RADS system (e.g., using scoring with T1 post contrast, T2, and DWI sequences), PET uptake changes after GIST treatment with Gleevac, etc. Such biomarkers are particularly useful in cancer diagnosis and treatment as well as radiogenomics.

Radiogenomics is an emerging field of research where cancer imaging features are correlated with gene expression, such as tissue-based biomarkers, which may be used to identify new cancer imaging biomarkers. New cancer imaging biomarkers are likely to lead to earlier detection of cancer, earlier detection of treatment failure, new treatment selection, and earlier identification of favorable treatment responses, and demonstration of tumor heterogeneity. Such new cancer imaging biomarkers may also be used to obtain improved non-invasive imaging to decrease complications from biopsies, and provide optimized and personalized treatment.

Further, big data may be leveraged to create valuable new applications for a new era of precision medicine. Clinical advancement may be created through new informatics technologies that both improve efficiency in health record management and provide new insights. The volume of big data being generated from medical images and tissue pathology is growing at a rapid pace. Image volumes generated from an individual patient during a single scanning session continues to increase, seemingly exponentially. Multi-parameter MRI can generate a multitude of indices on tissue biology within a single scanning session lasting only a few minutes. Next-generation sequencing from tissue samples, as just one example, can generate a flood of genetics data from only a single biopsy. Concurrent with this data explosion is the emergence of new technologies, such as block-chain, that allow individual patients to retain proprietary and highly secure copies of complex medical records generated from a vast array of healthcare delivery systems.

These new powerful systems using big data form the basis for identification and deployment of a multitude of new biomarkers which are the cornerstones for advancing patient care in a new era of precision medicine. New and evolving precision and big data datasets of cancer thus hold great promise for identifying new imaging biomarkers, which are likely to advance disease treatments and prevention efforts that take into account individual variability in genes, environment, and lifestyle for each person.

Specifically, big data offers tools that may facilitate identification of the new imaging biomarkers. Big data represents information assets characterized by such a high volume, velocity, and variety to require specific technology and analytical methods for its transformation into value. Big data is used to describe a wide range of concepts: from the technological ability to store, aggregate, and process data, to the cultural shift that is pervasively invading business and society, both drowning in information overload.

Big data coupled with machine learning methods may be used to obtain super resolution images that facilitate identification of the new imaging biomarkers. In particular, machine learning methods, such as classifiers, may be applied to the images of the subject to output probabilities for specific imaging biomarkers and/or other tissue characteristics, such as normal anatomy and correlation to pathology tissue data (herein also defined as image biomarkers) based on comparisons of features in sets of the images of the subject and population-based datasets and big data that provide similar information, but for other subjects. By applying the machine learning methods, high or super resolution images may be obtained that may then be used for identifying and/or measuring the biomarkers.

Classifiers of events for tissue, such as biopsy-diagnosed tissue characteristics for specific cancerous cells or occurrence of prostate cancer, breast cancer, benign lesions, etc., are created based on subset data associated with the event from the big data database and stored therein. The subset data may be obtained from all data associated with the given event. A classifier or biomarker library can be constructed or obtained using statistical methods, correlation methods, big data methods, and/or learning and training methods. Neural networks may be applied to analyze the data and images.

Imaging biomarkers require classifiers in order to determine the relationship between image features and a given biomarker. Similarly, tissue characteristics identified in tissue pathology, for example with stains, require classifiers to determine the relationship between image features and corresponding tissue characteristics. Classifiers using imaging, pathology, and clinical data can be used to determine the relationship between tissue-based biomarkers and characteristics and imaging features in order to identify imaging biomarkers and predictors of tissue characteristics.

Thus, the present disclosure provides a system and method for obtaining high or super-resolution images using population-based or big data datasets. Such images facilitate identification of aggregates of features within tumor tissue for characterizing tumor sub-region biomarker heterogeneity. Accordingly, super-resolution techniques are applied to create a novel form of medical image, for example, a super-resolution biomarker map image, for displaying imaging biomarkers, and specifically for imaging tumor heterogeneity, for clinical and research purposes. Such super-resolution images may also be used to facilitate understanding, diagnosis, and treatment of many other diseases and problems.

The method includes obtaining medical image data of a subject, selecting image datasets from the image data, creating three-dimensional ("3D") matrices based on the selected image dataset, and refining the 3D matrices. The method further includes applying one or more matrix operations to the refined 3D matrices, selecting corresponding matrix columns from the 3D matrices, applying a machine learning convolution algorithm ("MLCA") to the selected corresponding matrix columns to create a 2D matrix (also referred to herein as a convoluted graph or a convoluted matrix), and applying a color theory (e.g., complementary color) reconstruction algorithm to create a super-resolution biomarker map ("SRBM") image.

The use of various matrix operations applied to the refined 3D matrices and the application of MLCA allows for increased statistical power that better leverages additional data and clinical studies to aid in the determination of whether or not a tissue sample is responding to treatment. In some embodiments, classifiers such as Bayesian belief networks may be used as the MLCA. In other embodiments, other MLCA techniques, such as decision trees, etc. may be used instead of or in addition to the Bayesian belief networks.

In addition to creating an SRBM image, the present disclosure describes techniques for creating a more intuitive and understandable SRBM image. One technique is the color theory (e.g., complementary color) reconstruction algorithm mentioned above. According to the color theory reconstruction algorithm, low probability features have the effect of being recessed in space by the use of overlapping complementary colors, while higher probability features have the effect of rising out of the image by the use of solid hues of colors. By having the raised and recessed aspects in the map image, the various features within the image may be enhanced.

Another technique that relates to creating a more intuitive and understandable map image involves a reconstruction method that includes obtaining a 2D matrix that corresponds to probability density functions for a specific biomarker within a moving window, determining a first color scale for a first moving window, determining a mixture probability density function for each voxel in the SRBM image based on first moving window readings of the first moving window, determining a mixture probability density function of each voxel, ranking maximum a posteriori ("MAP") estimate values based on the mixture probability density function, determining the corresponding color for each MAP value, determining the final MAP value and corresponding color for each super resolution voxel using an iterative back projection algorithm, and determining the SRBM image based on the final MAP value and corresponding color for each voxel. Thus, one or more super-resolution techniques may be applied to create a novel form of medical image, e.g., a super-resolution biomarker map (SRBM) image.

The SRBM images may have several uses including, but not limited to, identifying and imaging tumor heterogeneity for clinical and research purposes. For example, in addition to facilitating identification of new biomarkers, the SRBM images may be used by multiple types of image processors and output interfaces, such as query engines for data mining, database links for automatic uploads to pertinent big data databases, and output applications for output image and information viewing by radiologists, surgeons, interventionists, individual patients, and referring physicians. Furthermore, a simplified adaption of the SRBM image algorithms may be used to output original image values and parameter measures within each output super-resolution voxel. In addition, standard techniques can be used to provide a multitude of additional data for each output SRBM image. For example, annotations made by physicians may be organized such that data is tagged for each voxel.

Referring now to FIG. 1A, a conventional mode of obtaining images (or, specifically, parameter maps) from a sample 100 is shown. The sample 100 may be a body tissue, organ, or other portion of a subject, from which one or more parameter maps are to be obtained. The subject may be a human, animal, or any other living or non-living entity for which medical imaging is needed or desired. The sample 100 may be imaged at multiple slices, such as slices 105, 110, and 115 to obtain sample images 120, 125, and 130, respectively. As shown, the images 120, 125, and 130 are MM parameter maps, although in other embodiments, other types of images or parameter maps, as noted below, may be obtained.

Parameter maps are generated using mathematical functions with input values from source images, and do not use population databases or classifiers. The images 120, 125, and 130 have relatively low resolution, large slice thickness, and provide limited characterization of tumor heterogeneity. From the images 120, 125, and 130, example regions-of-interest (ROI) may be defined to obtain, for example, sample images 135 and 140. Each of the sample images 135 and 140 depict an ROI 145, which provides singular quantitative measures for various scenarios such as pre-treatment parameter values and post-treatment parameter values, respectively. These quantitative measures depicted by the ROI 145 suffer from large measurement errors, poor precision, and limited characterization of tumor heterogeneity, and thus, only provide limited or vague information. The images 120-140 are also low resolution. Thus, the images 120-140 correspond to traditional medical images (e.g., traditional Mill images) that depict only a single imaging parameter in relatively low resolution.

Figure 1B:
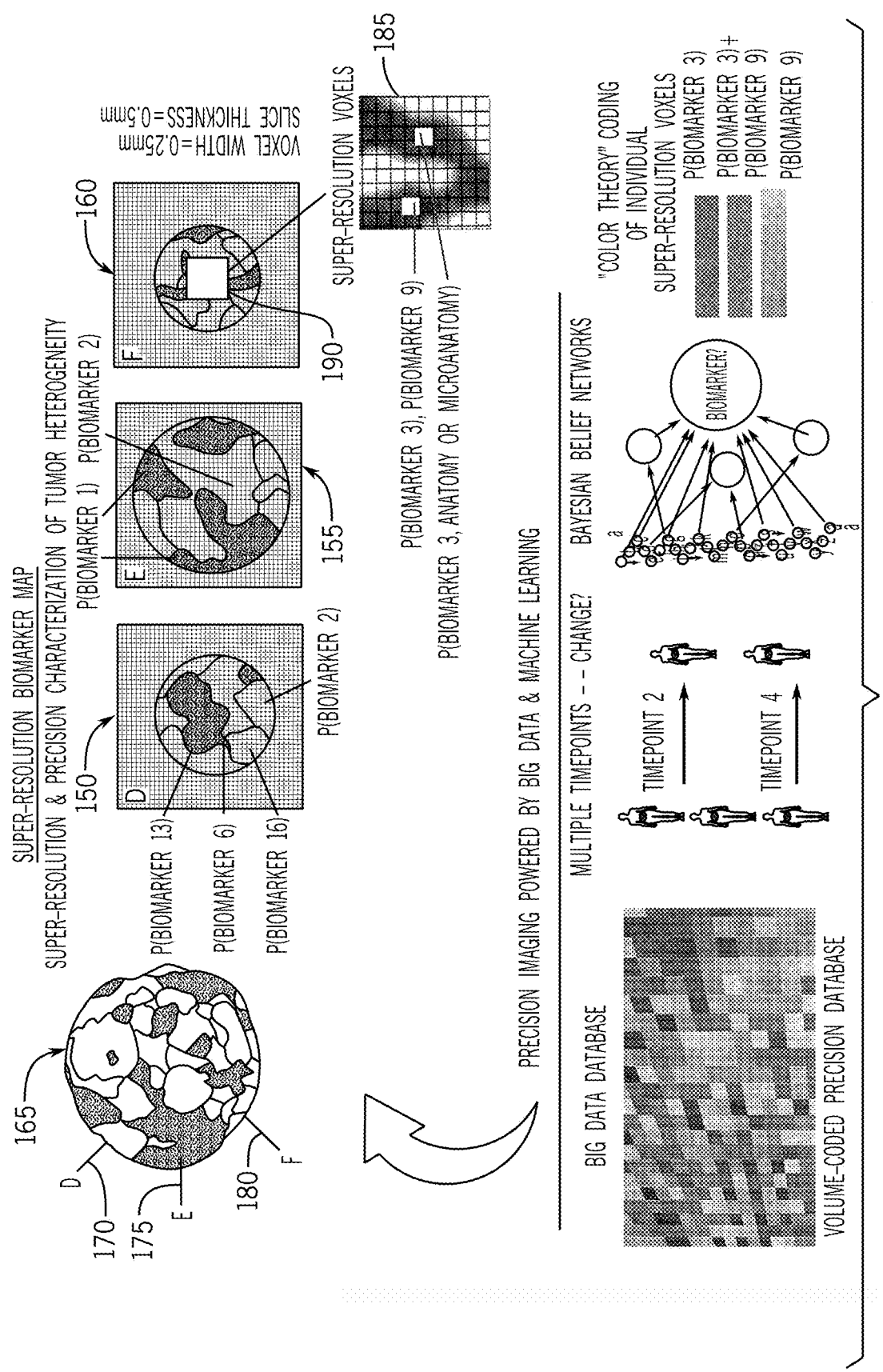
FIG. 1B depicts sample Super-Resolution Biomarker Map ("SRBM") images obtained from the images and parameter maps of FIG. 1A, in accordance with an illustrative embodiment.

FIG. 1B shows SRBM images 150, 155, and 160 obtained from a sample 165, which is similar to the sample 100. The SRBM images 150-160 correspond to slices 170, 175, and 180 of the sample 165, which may be same or similar to the slices 105, 110, and 115, respectively. The SRBM images 150-160 may be created from the images 120-130 of FIG. 1A. Specifically and as discussed further below, the SRBM images 150-160 may be created using a volume-coded precision database and/or a big data database in combination with a machine learning convolution algorithm. The SRBM images 150-160 have significantly enhanced resolution and provide additional biomarker detail not available in the images 120-130, which again represent traditional MRI parameter maps. The SRBM images 150-160 provide individual voxel-specific biomarker detail, as illustrated in voxel grid 185, which is an exaggerated view of a selected portion 190 of the image 160. A similar voxel grid may be obtained for other portions of the image 160, as well as for the SRBM images 150 and 155. The voxel grid 185 is a collection of individual voxels. A specific biomarker (or set of biomarkers) may be associated with each individual voxel of the SRBM images 150-160.

It is to be understood that the samples 100 and 165 are shown to be spherical or substantially spherical simply for illustration. Generally speaking, the shape and size of the samples 100 and 165 may vary from one embodiment to another. Further, the SRBM images 150-160 provide a multi-imaging modality approach in that images obtained from various medical imaging techniques may be combined together to generate the SRBM images 150-160. Images from different imaging modalities may show different biomarkers and the information pertaining to these biomarkers may be combined to obtain multiple biomarkers with high specificity, sensitivity, and significantly reduced noise.

For example, in some embodiments, imaging modalities such as positron emission tomography ("PET"), computed tomography ("CT") scan images, ultrasound imaging, magnetic resonance imaging ("MM"), X-ray, single-photon emission computed tomography (SPECT) imaging, micro-PET imaging, micro-SPECT imaging, Raman imaging, bioluminescence optical (BLO) imaging, or any other suitable medical imaging technique may be combined in various combinations to obtain super resolution images (e.g., the SRBM images 150-160) depicting multiple biomarkers. FIG. 1C illustrates an example table of biomarkers and tissue characteristics for breast and prostate cancer tissue that may be identified by combining images from multiple imaging modalities into one or more super resolution images.

Figure 2:
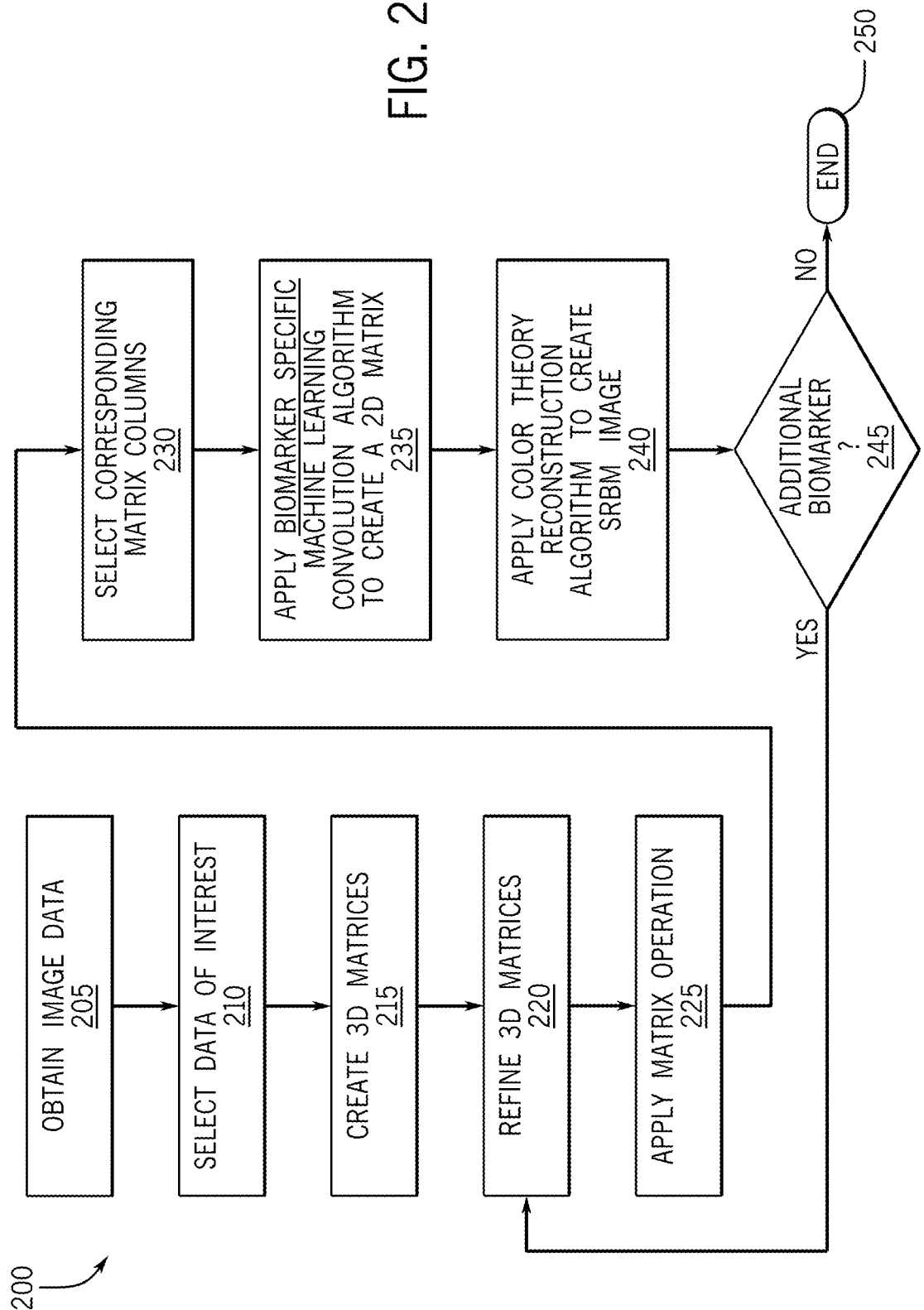
FIG. 2 depicts an example flow diagram outlining a method for obtaining an SRBM image, in accordance with an illustrative embodiment.

Turning now to FIG. 2, an example flow chart outlining a method 200 for obtaining an SRBM image is shown, in accordance with an illustrative embodiment. At operation 205, image data for a sample (e.g., the samples 100, 165) is obtained using one or more imaging techniques mentioned above. The sample may be an organ or tissue of a patient subject. For example, in some embodiments, the sample may be a prostate or breast tissue of a human patient. Image data that is obtained from the sample may include one or more images taken from one or more slices of the sample. A compilation of such images may be referred to as an image dataset.

Additionally, each image dataset may include images from a particular time point. For example, image data of the sample may be collected at various points of time, such as pre-treatment, during treatment, and post-treatment. Thus, each image dataset may include image data from a specific point of time. As an example, one image dataset may correspond to image data from pre-treatment, another image dataset may correspond to image data during treatment, and yet another image dataset may correspond to image data from post-treatment. It is to be understood that although pre-treatment, during treatment, and post-treatment parameters are described herein for distinguishing image datasets, in other embodiments, other parameters (e.g., image datasets associated with specific regions of interest of the sample (e.g., specific areas of a body being imaged)) may be used as the different time points.

Further, each image in the image data of every image dataset is composed of a plurality of voxels (e.g., pixels) that represent data discerned from the sample using the specific imaging technique(s) used to obtain the image data. The size of each voxel may vary based on the imaging technique used and the intended use of the image data. In some embodiments, parameter maps are created from the image data. Parameter maps provide output values across an image that indicate the extent of specific biological conditions within the sample being imaged. In an embodiment, the image data may include a greyscale image. Use of greyscale images may help improve output resolution. With a greyscale image, biomarker colors may be applied on top of the image in accordance with a determined super-resolution output voxel grid as discussed below.

The image data may be stored within one or more databases. For example, in some embodiments, the image data may be stored within a precision database (also referred to herein as a population database or big-data database). Data within the precision database includes image data for several samples. Thus, the precision database includes multiple data sets, with each data set corresponding to one specific sample. Further, each data set within the precision database may include a first set of information data and a second set of information data. The first set of information data corresponds to data that is obtained by a non-invasive or minimally-invasive method (e.g., the medical imaging techniques mentioned above). For example, the first set of information data may include measures of molecular and/or structural imaging parameters. Non-limiting examples of such measures include measures of MRI parameters, CT parameters, and/or other structural imaging parameters, such as from CT and/or ultrasound images, for a volume and location of the specific tissue to be biopsied from the organ.

Each of the data sets in the precision database may further include the second set of information data. The second set of information data may be obtained by an invasive method or a method that is more invasive compared to the method used to obtain the first set of information data. For example, the second set of information data may include a biopsy result, data or information (e.g., pathologist diagnosis such as cancer or no cancer) for the biopsied specific tissue. The second set of information data provides information data with decisive and conclusive results for a better judgment or decision making.

In addition to the first set of information data and the second set of information data, in some embodiments, the precision database may include additional information including, but not limited to: (1) dimensions related to molecular and/or structural imaging for the parameters, e.g., a thickness, T, of an MM slice and the size of an Mill voxel of the MRI slice, including the width of the MM voxel, and the thickness or height of the Mill voxel (which may be the same as the thickness, T, of the MM slice); (2) clinical data (e.g., age, gender, blood test results, other tumor blood markers, a Gleason score of a prostate cancer, etc.) associated with the biopsied specific tissue and/or the subject; (3) risk factors and family history for cancer associated with the subject (such as smoking history, sun exposure, premalignant lesions, genetic information, etc.); and (4) molecular profiling of tumor tissue using recent advancements such as next generation sequencing. Thus, the precision database may include both imaging data as well as clinical data. In other embodiments, additional, less, or different information may be stored as part of the first set of information data, the second set of information data, or the additional information that is stored within the precision database.

Further, as more and more number of datasets are added to the precision database, the size of the precision database increases, providing more information to be used in creating the SRBM images. Likewise, when the precision database is newly created, the size of the precision database may be small and thus less information may be available for creating the SRBM images.

Figure 5:
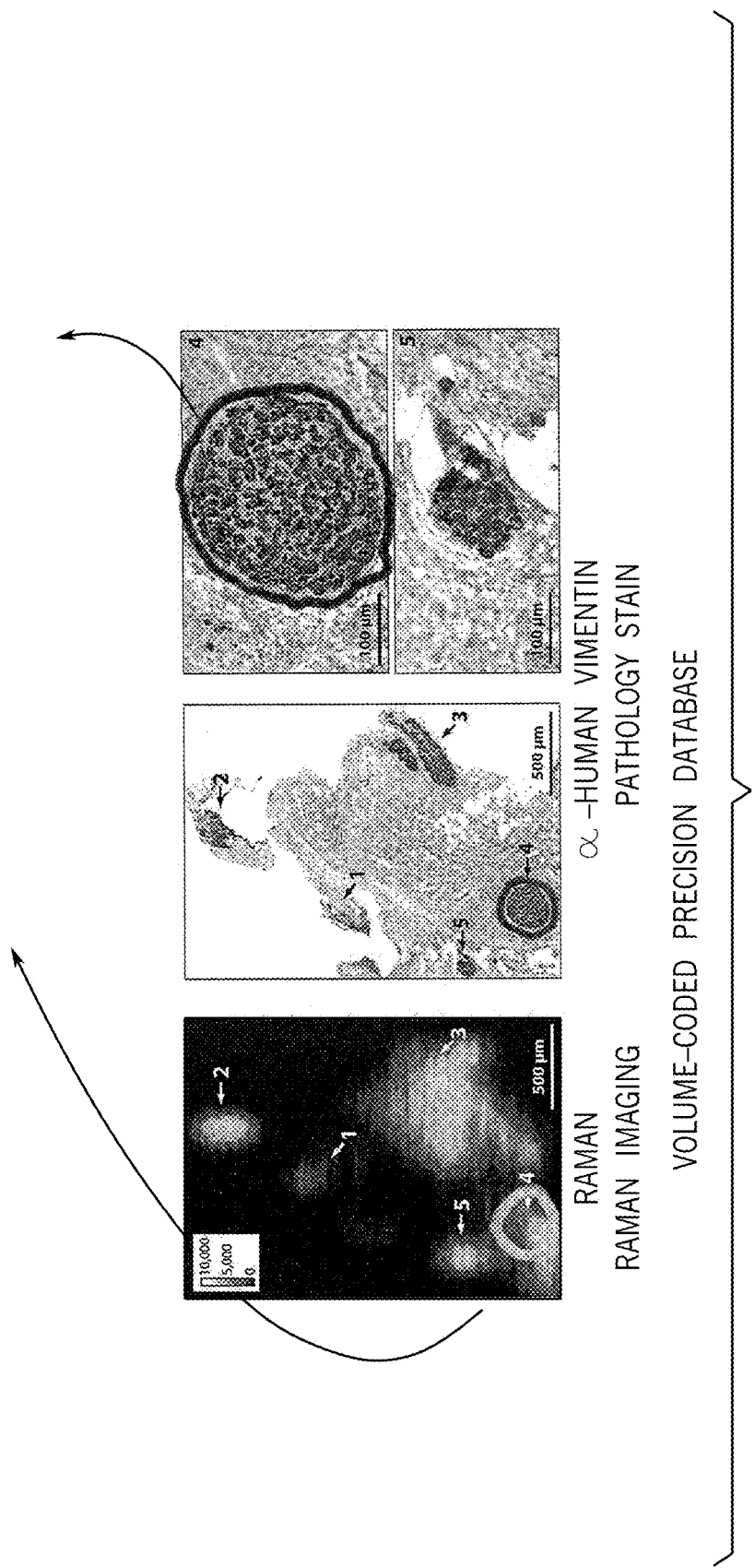
FIG. 5 depicts a portion of a volume-coded precision database that is used in obtaining the SRBM image, in accordance with an illustrative embodiment.

In addition to or instead of storing the image data obtained at the operation 205 within the precision database, the image data may be stored within a volume-coded precision database. In some embodiments, the volume-coded precision database may be a subset of the precision database. In other embodiments, the volume-coded precision database may be a stand-alone database. The volume-coded precision database includes a variety of information (e.g., imaging-to-tissue data) associated with the specific sample that is being imaged at the operation 205. Specifically, the imaging-to-tissue data within the volume-coded precision database may include imaging information (and other data) for the sample that corresponds to a specific volume of the tissue with which the imaging information is associated. For example, an entry into the volume-coded precision database may include a tumor type (e.g., sarcoma DOLS mouse model) included in the sample, a Raman signal value (e.g., 7,245) received from the sample, a region of interest (ROI) area of the sample (e.g., 70 mm$^2$), and an alpha-Human vimentin, a pathology stain information. In alternative embodiments, the region of interest may be a volume instead of an area. Additional, less, or different information may be stored within the volume-coded precision database for each sample. FIG. 5 shows an example entry within a volume-coded precision database, in accordance with an illustrative embodiment.

From the image data obtained at the operation 205, specific image datasets of interest are selected at an operation 210. The image datasets that are selected correspond to the image data of the sample that is imaged at the operation 205. As discussed above, the image data may include data from multiple time points. Such multiple time points for images of a patient (e.g., the subject to which the sample of the operation 205 belongs) are often made available over the course of treatment of the patient. For example, images of the patient may be taken at diagnosis, at various points throughout the treatment process, and after the treatment is over. As an example, FIG. 3 shows five different time points (e.g., time points 1-5) during which a sample from the patient may be imaged.

Figure 3:
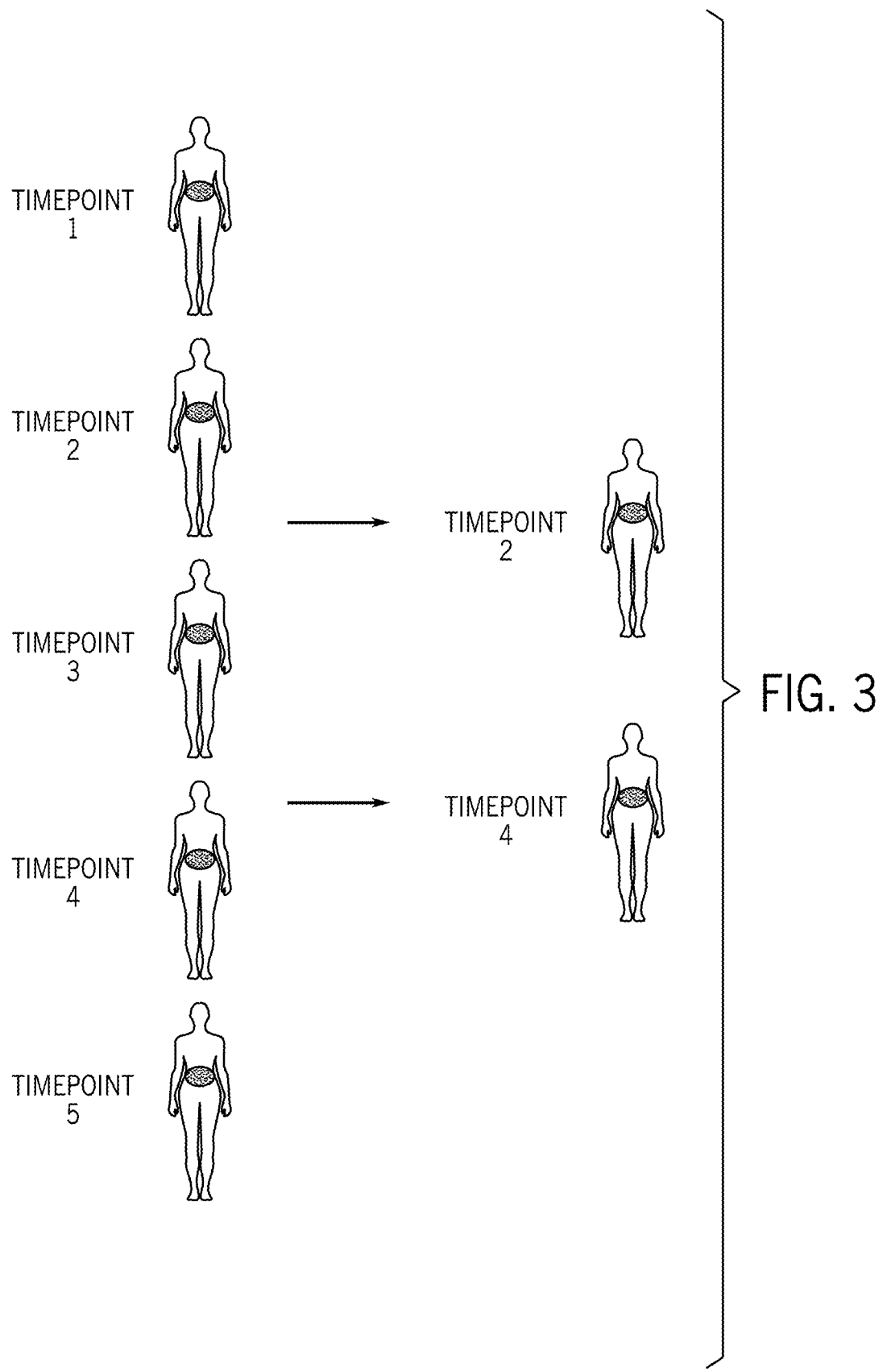
FIG. 3 depicts selection of time-points of interest from image datasets that are used for obtaining the SRBM image, in accordance with an illustrative embodiment.

It is to be understood that FIG. 3 is simply an example. In other embodiments, images for greater than or fewer than five time points may be available. From the various time points that are available, two or more time points may be selected. For example, FIG. 3 shows selection of time points 2 and 4 from possible time points 1-5 for generating the SRBM images. In alternative embodiments, any other number of time points may be selected. Image data corresponding to the selected time points are then used for creating the SRBM images.

Furthermore, in some embodiments, the number of images in each selected image dataset is desired to be same or substantially same. In other embodiments, the number of images in each selected image dataset may vary. Selection of multiple time points allows for the image data to be analyzed over a greater time spectrum, thereby allowing for better identification of trends in the analyzed image data.

Figure 4:
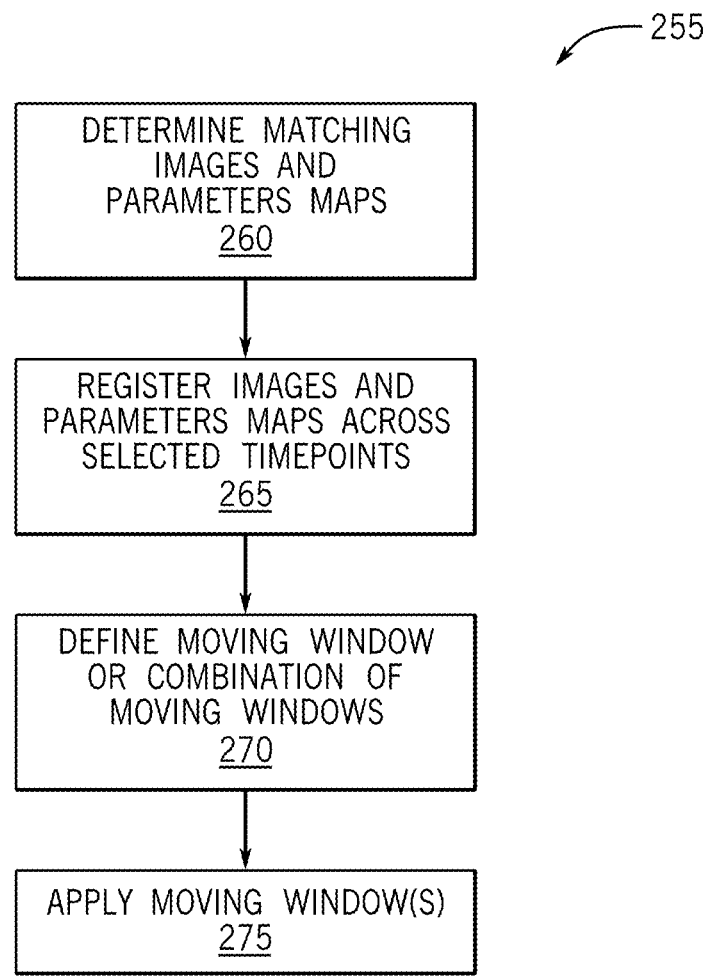
FIG. 4 depicts an example flow diagram outlining a method for creating a three-dimensional ("3D") matrix based on the image datasets selected in FIG. 3, in accordance with an illustrative embodiment.

The image data corresponding to each selected time point is converted into one or more three-dimensional ("3D") matrices at an operation 215. The 3D matrices facilitate defining a probability map, as discussed below. FIG. 4 outlines an example method for creating the 3D matrices.

Referring to FIG. 4 in conjunction with FIG. 2, an example method 255 outlining operations for creating the 3D matrices is shown, in accordance with an illustrative embodiment. At operation 260 of FIG. 4, matching images, parameters, and/or parameter maps are determined for use in analyzing the image datasets selected for each time point at the operation 210 of FIG. 2. The matching images, parameters, or parameters are determined using the image data stored within the precision database and particularly from established imaging biomarkers identified within the datasets (also referred to as training datasets) stored within the precision database. In some embodiments, only a single image, parameter, and/or parameter map may be selected at operation 260 to be matched from the precision database. In other embodiments, multiple images, parameters, and/or parameter maps may be selected for matching from the precision database. The image(s), parameter(s), and/or parameter map(s) that are selected for matching may depend upon the information that is desired to be analyzed within the sample being imaged at the operation 205 of FIG. 2.

As used herein, parameters are measurements made from images using mathematical equations, such as pharmacokinetics models, which do not use classifiers or population-based image datasets. Parameter measures provide indices of tissue features, which may then be used with machine learning classifiers discussed below and the information from the precision database and the volume-coded precision database to determine imaging biomarkers. Specifically, parameters with or without native image data and clinical data combined may be used to determine the imaging biomarkers. Several different types of parameters may be selected for obtaining the imaging biomarkers. For example, in some embodiments, dynamic contrast-enhanced MM ("DCE-MRI"), apparent diffusion coefficient ("ADC"), diffusion weighted imaging ("DWI"), time sequence parameters (e.g., T1, T2, and tau parameters), etc. may be selected. Some examples of parameters that may be selected are provided in the tables of FIGS. 29A-29K. Specifically, the parameters shown in FIGS. 29A-29K include various types of MRI parameters depicted in FIGS. 29A-29H, one or more types of PET parameters depicted in FIG. 29I, one or more types of heterogeneity features depicted in FIG. 29J, and other parameters depicted in FIG. 29K. In other embodiments, additional, fewer, or different parameters may be selected. Generally speaking, the parameters that are selected depend upon the sample being imaged, the biomarkers that are intended to be imaged, and other information that is desired to be obtained on the resulting SRBM images.

Furthermore, as evident from the parameters shown in FIGS. 29A-29K, the parameters that are selected may be from different imaging modalities, such as those discussed above. For example, the selected parameters may be from, but not limited to, MM, PET, SPECT, CT, fluoroscopy, ultrasound imaging, block ("BLO") imaging, micro-PET, nano-MRI, micro-SPECT, Raman imaging, etc.

Based upon the selected images, parameters, or parameter maps, similar images, parameters, or parameter maps may be identified within the precision database. As noted above, the precision database is a population database that includes data from multiple samples and multiple subjects. Thus, for example, if a specific parameter is selected from the sample imaged at the operation 205, image data from other samples and subjects corresponding to that selected parameter may be identified from the precision database to determine a parameter matching. Then, image data corresponding to the selected parameter and the image data corresponding to the matched parameter from the precision database may be used to obtain an SRBM image.

Specifically, at operation 265, the selected images from the operation 260 are registered for each time point selected at the operation 210, such that every image in every image dataset is aligned with matching anatomical locations. By registering the images, the same tissue or region of interest is analyzed in the image datasets of different time points. In some embodiments, image coordinates may be matched to facilitate the registration. In other embodiments, other registration techniques may be used. Further, registration may be performed using rigid marker based registration or any other suitable rigid or non-rigid registration technique known to those of skill in the art. Example registration techniques may include B-Spline automatic registration, optimized automatic registration, Landmark least squares registration, midsagittal line alignment, or any other suitable registration technique known to those of skill in the art.

Figure 6:
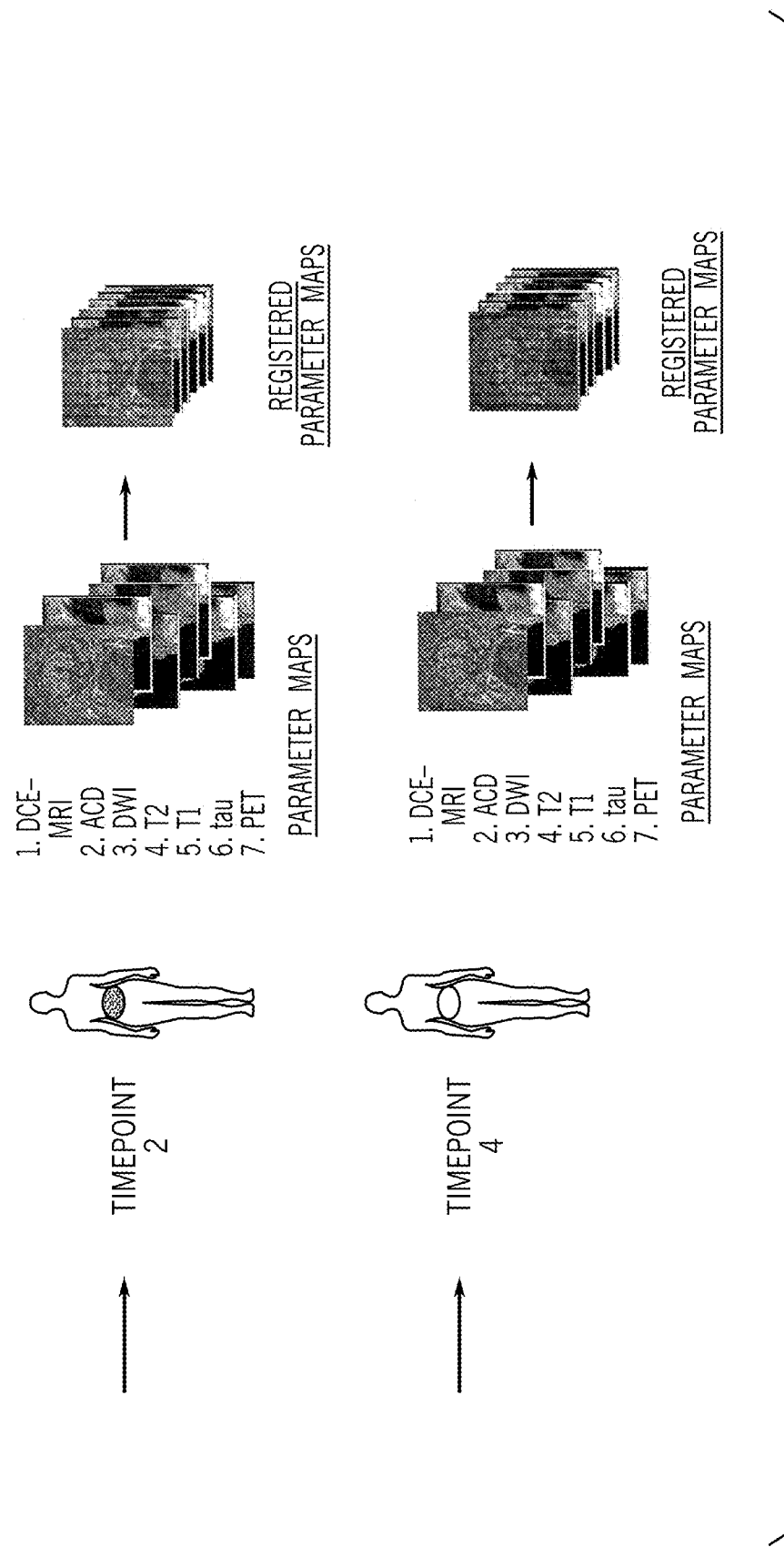
FIG. 6 depicts registration of image coordinates associated with the selected image datasets, in accordance with an illustrative embodiment.

Additionally, in some embodiments, as part of the registration, re-slicing of the images may be needed to obtain matching datasets with matching resolutions per modality across various time points. To facilitate more efficient image processing, such re-slicing may also be needed to align voxel boundaries when resolutions between modalities are different. As an example, FIG. 6 depicts registration of the image coordinates associated with the datasets of selected time points 2 and 4. Specifically, FIG. 6 illustrates a number of parameter maps for parameters associated with various imaging modalities (e.g., DCE-MRI, ADC, DWI, T2, T1, tau, and PET). The image coordinates for the various parameter maps are registered to enable the combined use of the various parameter maps in the creation of an SRBM image. Thus, registered images are obtained for each time point that was selected at operation 210.

Upon registration of the images, one or more moving windows are defined at operation 270 and the defined moving windows are applied at operation 275. The one or more moving windows are used for analyzing the registered images. As used herein, a "moving window" is a "window" or "box" of a specific shape and size that is moved over the registered images in a series of steps or stops, and data within the "window" or "box" at each step is statistically summarized. The step size of the moving window may also vary. In some embodiments, the step size may be equal to the width of the moving window. In other embodiments, other step sizes may be used. Further, a direction in which the moving window moves over the data may vary from one embodiment to another. These aspects of the moving window are described in greater detail below.

Thus, the moving window is used to successively analyze discrete portions of each image within the selected image datasets to measure aspects of the selected parameters. For example, in some embodiments, the moving window may be used to successively analyze one or more voxels in the image data. In other embodiments, other features may be analyzed using the moving window. Based upon the features that are desired to be analyzed, the shape, size, step-size, and direction of the moving window may be varied. By changing one or more attributes (e.g., the shape, size, step size, and direction), multiple moving windows may be defined, and the data collected by each of the defined moving windows may be varied. The data collected from each moving window may further be analyzed, compared, and/or aggregated to obtain one or more SRBM images.

As an example and in some embodiments, the moving window may be defined to encompass any number or configuration of voxels at one time. Based upon the number and configuration of voxels that are to be analyzed at one time, the size, shape, step size, and direction of the moving window may be defined. Moving window volume may be selected to match the volumes of corresponding biomarker data within the volume-coded population database. Further, in some embodiments, the moving window may be divided into a grid having two or more adjacent subsections. Upon application of the moving window to the image data, a moving window output value may be created for each subsection of the grid that is associated with a computation voxel for the SRBM image. Further, in some embodiments, a moving window output value is created for a subsection of the grid only when the moving window completely encompasses that subsection of the grid.

Figure 7C:
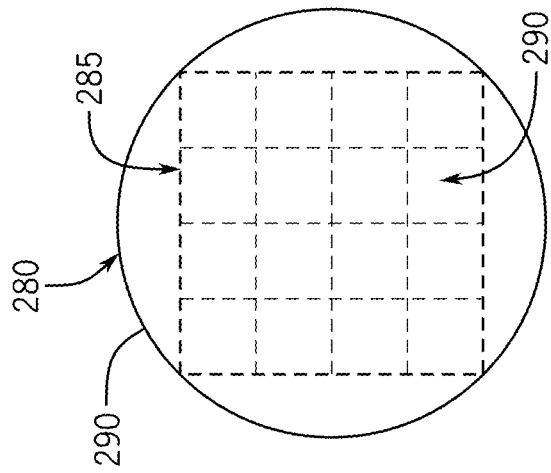
FIGS. 7A, 7B, and 7C depict example moving window configurations used for obtaining the SRBM image, in accordance with an illustrative embodiment.
Figure 7B:
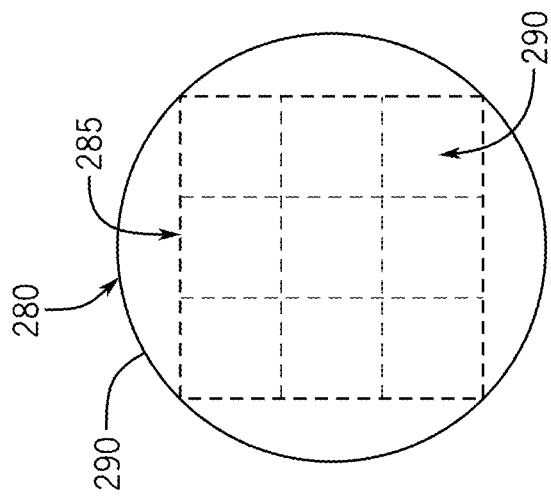
Figure 7A:
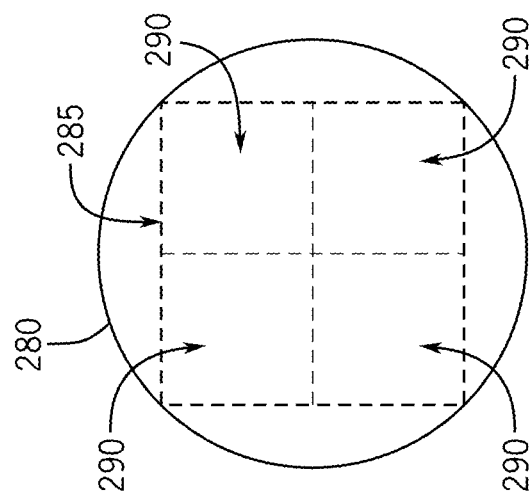

For example, in some embodiments, the moving window may have a circular shape with a grid disposed therein defining a plurality of smaller squares. FIGS. 7A, 7B, and 7C depict various example moving window configurations having a circular shape with a square grid, in accordance with some embodiments. FIGS. 7A, 7B, and 7C each include a moving window 280 having a grid 285 and a plurality of square subsections 290. For example, FIG. 7A has four of the subsections 290, FIG. 7B has nine of the subsections, and FIG. 7C has sixteen of the subsections. It is to be understood that the configurations shown in FIGS. 7A-7C are only an example. In other embodiments, the moving window 280 may assume other shapes and sizes such as square, rectangular, triangle, hexagon, or any other suitable shape. Likewise, in other embodiments, the grid 285 and the subsections 290 may assume other shapes and sizes.

Thus, FIGS. 7A-7C shows various possible configurations where the moving window encompasses 4, 9, or 16 full voxels within the source images and a single moving window read measures the mean and variance of the 4, 9, and 12 voxels respectively.

Further, the grid 285 and the subsections 290 need not always have the same shape. Additionally, while it may be desirable to have all the subsections 290 be of the same (or similar) size, in some embodiments, one or more of the subsections may be of different shapes and sizes. In some embodiments, each moving window may include multiple grids, with each grid having one or more subsections, which may be configured as discussed above.

Based on the size (e.g., a width, length, diameter, volume, area, etc.) and shape of the subsections 290, the size and shape of a super resolution output voxel that is used to compose the SRBM image may be defined. In other words, in the embodiments of FIGS. 7A-7C, the shape and size of each of the subsections 290 may correspond to the shape and size of one super resolution output voxel that is used to compose the SRBM image. The step size of the moving window in the x, y, and z directions determines the output super resolution voxel size in the x, y, and z directions, respectively. The specific shape(s), size(s), starting point(s), etc. of the applied moving windows determines the exact size of the super resolution output grid. Furthermore, the moving window may be either two-dimensional or three-dimensional. The moving window 280 shown in FIGS. 7A-7C is two-dimensional. When the moving window 280 is three-dimensional, the moving window may assume three-dimensional shapes, such as a sphere, cube, etc.

Similarly, the size of the moving window 280 may vary from one embodiment to another. Generally speaking, the moving window 280 is configured to be no smaller than the size of the largest single input image voxel in the image dataset, such that the edges of the moving window encompass at least one complete voxel within its borders. Further, the size of the moving window 280 may depend upon the shape of the moving window. For example, for a circular moving window, the size of the moving window 280 may be defined in terms of radius, diameter, area, etc. Likewise, if the moving window 280 has a square or rectangular shape, the size of the moving window may be defined in terms of length and width, area, volume, etc.

Furthermore, a step size of the moving window 280 may also be defined. The step size defines how far the moving window 280 is moved across an image between measurements. In addition, the step size may also determine a size of a super resolution output voxel, thus controlling an output resolution of the SRBM image. In general, each of the subsections 290 corresponds to one source image voxel. Thus, if the moving window 280 is defined as having a step size of a half voxel, the moving window 280 is moved by a distance of one half of each of the subsections 290 in each step. The resulting SRBM image from a half voxel step size has a resolution of a half voxel. Thus, based upon the desired specificity desired in the SRBM image, the step size of the moving window 280 and the size and shape of each output super resolution voxel may be varied.

Furthermore, in embodiments where multiple moving windows or different step sizes are used, a smallest moving window step size determines a length of the super resolution output voxel in the x, y, and z directions. In addition, the step size of the moving window 280 determines a size (e.g., the number of columns, rows) of intermediary matrices into which the moving window output values are placed, as described below. Thus, the size of the intermediary matrices may be determined before application of the moving window 280, and the moving window may be used to fill the intermediary matrices in any way based on any direction or random movement. Such a configuration allows for much greater flexibility in the application of the moving window 280.

Figure 9:
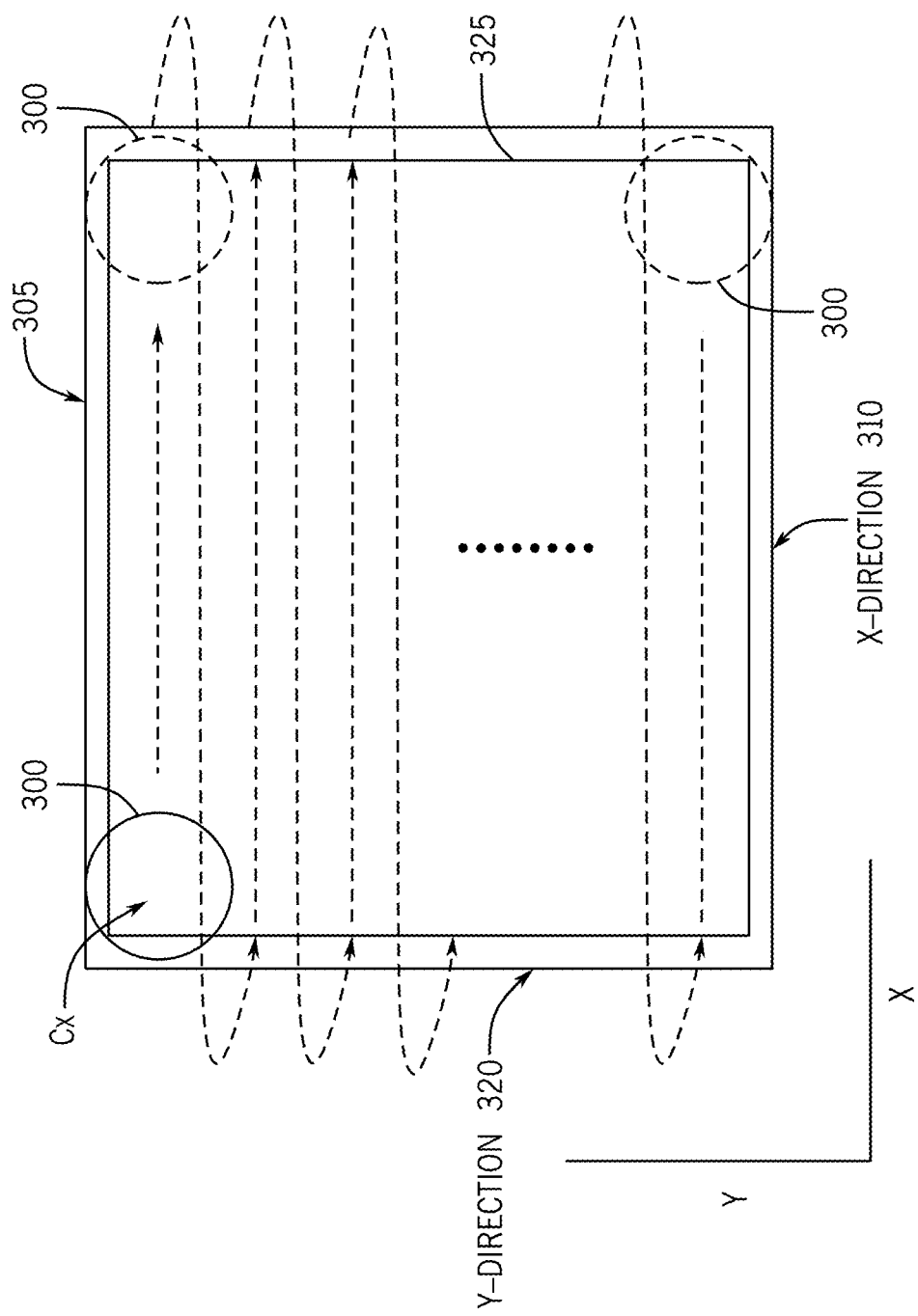
FIG. 9 depicts an example moving window and how the moving window is moved along x and y directions, in accordance with an illustrative embodiment.

In addition to defining the size, shape, and step size of the moving window 280, the direction of the moving window may be defined. The direction of the moving window 280 indicates how the moving window moves through the various voxels of the image data. FIG. 9 depicts an example direction of movement of a moving window 300 in an image 305 in an x direction 310 and a y direction 320, in accordance with an illustrative embodiment. As shown in FIG. 9, the movement direction of the moving window 300 is defined such that the moving window is configured to move across a computation region 325 of the image 305 at regular step sizes or intervals of a fixed distance in the x direction 310 and they direction 320. Specifically, the moving window 300 may be configured to move along a row in the x direction 310 until reaching an end of the row. Upon reaching the end of the row, the moving window 300 moves down a row in the y direction 320 and then proceeds across the row in the x direction 310 until again reaching the end of the row. This pattern is repeated until the moving window 300 reaches the end of the image 305. In other embodiments, the moving window 300 may be configured to move in different directions. For example, the moving window 300 may be configured to move first down a row the y direction 320 until reaching then end of the row and then proceed to a next row in the x direction 310 before repeating its movement down this next row in the y direction. In another alternative embodiment, the moving window 300 may be configured to move randomly throughout the computation region 325.

Further, as noted above, the step size of the moving window 300 may be a fixed (e.g., regular) distance. In some embodiments, the fixed distance in the x direction 310 and the y direction 320 may be substantially equal to a width of a subsection of the grid (not shown in FIG. 9) of the moving window 300. In other embodiments, the step size may vary in either or both the x direction 310 and the y direction 320.

Additionally, each movement of the moving window 300 by the step size corresponds to one step or stop. At each step, the moving window 300 measures certain data values (also referred to as output values). For example, in some embodiments, the moving window 300 may measure specific MM parameters at each step. The measured data values may be measured in any of variety of ways. For example, in some embodiments, the data values may be mean values, while in other embodiments, the data values may be a weighted mean value of the data within the moving window 300. In other embodiments, other statistical analysis methods may be used for the data within the moving window 300 at each step.

Figure 8A:
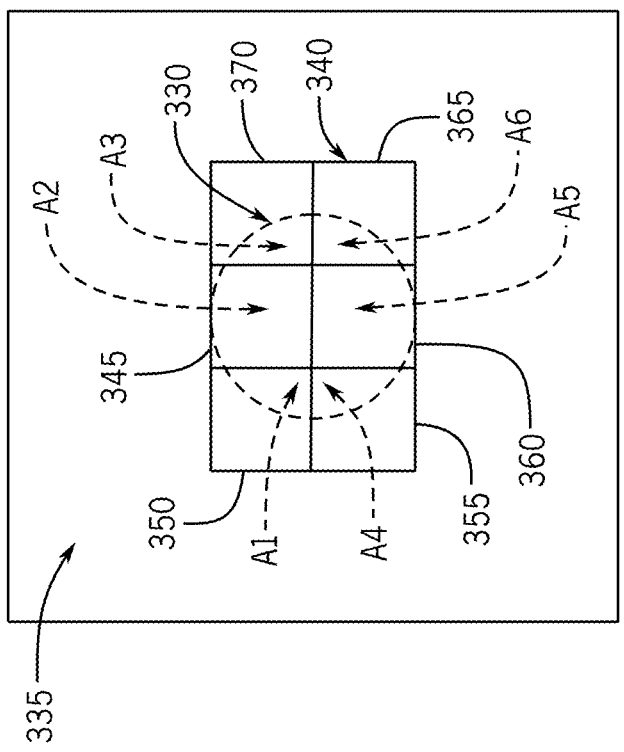
FIG. 8A depicts an example moving window and an output value defined within the moving window, in accordance with various illustrative embodiments.
Figure 8C:
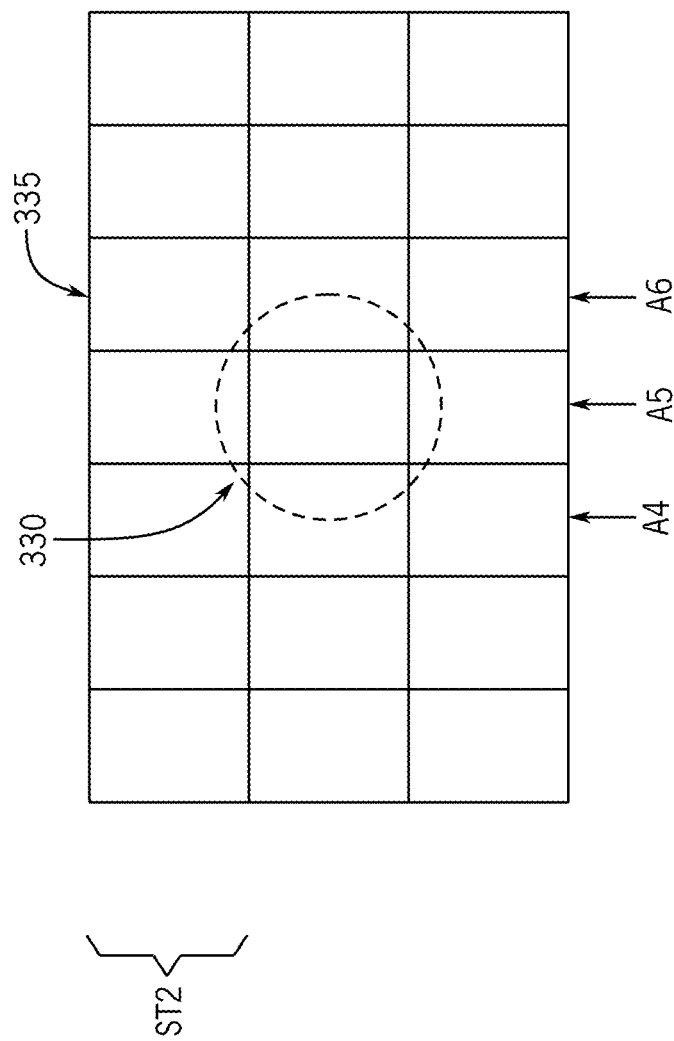
FIG. 8C depicts a cross-sectional view of the image of FIG. 7A in which the moving window has a spherical shape.

FIGS. 8A-8C show an example where the moving window read inputs all voxels fully or partially within the boundary of the moving window and calculates a read as the weighted average by volume with standard deviation. Specifically, FIG. 8A shows various examples of defining an output value within a moving window 330 in an image 335 at one step. As shown in FIG. 8, the moving window 330 defines a grid 340 covering source image voxels and divided into multiple subsections 345, 350, 355, 360, 365, and 370. Further, as discussed above, each of the subsections 345-370 corresponds to one voxel in the source image. In some embodiments, the output value of the moving window 330 may be an average (or some other function) of those subsections 345-370 (or voxels) of the grid 340 that are fully or substantially fully encompassed within the moving window. For example, in FIG. 8A, the moving window 330 cuts off the subsections 350, 355, 365, and 370 such that only a portion of these subsections are contained within the moving window. In contrast, the subsections 345 and 360 are substantially fully contained within the moving window 330. Thus, the output value of the moving window 330 at the shown step may be the average of values in the subsections 345 and 360.

In other embodiments, a weighted average may be used to determine the output value of the moving window 330 at each step. When the values are weighted, the weight may be for percent area or volume of the subsection contained within the moving window 330. For example, in FIG. 8A, if a weighted average is used, the output value of the moving window 330 at the given step may be an average of all subsections 345-370 weighted for their respective areas A1, A2, A3, A4, A5, and A6 within the moving window. In some embodiments, the weighted average may include a Gaussian weighted average. By taking a weighted average within the moving window 330, and by adjusting the step size of the moving window (e.g., moving the moving window at a step size that is less than a size of a voxel of the original image), an SRBM image may be created having a better resolution than the original image (e.g., the image 335).

In other embodiments, other statistical functions may be used to compute the output value at each step of the moving window 330. Further, in some embodiments, the output value at each step may be adjusted to account for various factors, such as noise. Thus, the output value at each step may be an average value+/−noise. Noise may be undesirable readings from adjacent voxels. In some embodiments, the output value from each step may be a binary output value. For example, in those embodiments where a binary output value is used, the output probability value at each step may be a probability value of either 0 or 1, where 0 corresponds to a "yes" and 1 corresponds to a "no," or vice-versa based upon features meeting certain characteristics of any established biomarker. In this case, once 0 and 1 moving window probability reads are collated, the same color theory super-resolution reconstruction algorithm may be applied. Similarly, in the case where the convolution algorithm uses a parameter map function, such as pharmacokinetic equations, to output parameter measures, the values within the moving windows may be collated instead of probability values, but the same color theory super-resolution reconstruction algorithm may otherwise be implemented.

It is to be understood that the output values of the moving window 330 at each step may vary based upon the size and shape of the moving window. For example, FIG. 8B shows a cross-sectional view of the image 335 from FIG. 8A in which the moving window 330 has a cylindrical shape. FIG. 8C shows another cross-sectional view of the image 335 in which the moving window 330 has a spherical shape. In addition, the image 335 shown in FIG. 8B has a slice thickness, ST1, that is larger than a slice thickness, ST2, of the image shown in FIG. 8C. Specifically, the image of FIG. 8B is depicted as having only a single slice, and the image of FIG. 8C is depicted as having three slices. In the embodiment of FIG. 8C, the diameter of the spherically-shaped moving window 330 is at least as large as a width (or thickness) of the slice. Thus, the shape and size of the moving window 330 may vary with slice thickness as well.

Furthermore, variations in how the moving window 330 is defined are contemplated and considered within the scope of the present disclosure. For example, in some embodiments, the moving window 330 may be a combination of multiple different shapes and sizes of moving windows to better identify particular features of the image 335. Competing interests may call for using different sizes/shapes of the moving window 330. For example, due to the general shape of a spiculated tumor, a star-shaped moving window may be preferred, but circular or square-shaped moving windows may offer simplified processing. Larger moving windows also provide improved contrast to noise ratios and thus better detect small changes in tissue over time. Smaller moving windows may allow for improved edge detection in regions of heterogeneity of tissue components. Accordingly, a larger region of interest (and moving window) may be preferred for PET imaging, but a smaller region of interest (and moving window) may be preferred for CT imaging with highest resolutions. In addition, larger moving windows may be preferred for highly deformable tissues, tissues with motion artifacts, etc., such as liver. By using combinations of different shapes and sizes of moving windows, these competing interests may be accommodated, thereby reducing errors across time-points. In addition, different size and shaped moving windows (e.g., the moving window 330) also allow for size matching to data (e.g., biomarkers) within a precision database, e.g., where biopsy sizes may be different. Thus, based upon the features that are desired to be enhanced, the size and shape of the moving window 330 may be defined.

Further, in some embodiments, the size (e.g., dimensions, volume, area, etc.) and the shape of the moving window 330 may be defined in accordance with a data sample match from the precision database. Such a data sample match may include a biopsy sample or other confirmed test data for a specific tissue sample that is stored in a database. For example, the shape and volume of the moving window 330 may be defined so as to match the shape and volume of a specific biopsy sample for which one or more measured parameter values are known and have been stored in the precision database. Similarly, the shape and volume of the moving window 330 may be defined so as to match a region of interest (ROI) of tumor imaging data for a known tumor that has been stored in the precision database. In additional embodiments, the shape and volume of the moving window 330 may be chosen based on a small sample training set to create more robust images for more general pathology detection. In still further embodiments, the shape and volume of the moving window 330 may be chosen based on whole tumor pathology data and combined with biopsy data or other data associated with a volume of a portion of the tissue associated with the whole tumor.

Returning back to FIG. 4, the moving window is applied at the operation 275 to the image datasets selected at the operation 210 of FIG. 2. Specifically, the defined moving window (e.g., the moving window 330) is applied to a computation region (e.g., the computation region 325) of each image (e.g., the image 335) within each of the selected image datasets such that an output value and variance (such as a standard deviation) is determined for each image at each step of the moving window in the computation region. Each output value is recorded and associated with a specific coordinate on the corresponding computation region of the image. In some embodiments, the coordinate is an x-y coordinate. In other embodiments, y-z, x-z, or a three dimensional coordinate may be used. By collecting the output values from the computation region (e.g., the computation region 325), a matrix of moving window output values is created and associated with respective coordinates of the analyzed image (e.g., the image 335).

In some cases, the moving window reading may obtain source data from the imaging equipment prior to reconstruction. For example, magnetic resonance fingerprinting source signal data is reconstructed from a magnetic resonance fingerprinting library to reconstruct standard images, such as T1 and T2 images. Source MR Fingerprinting, other magnetic resonance original signal data or data from other machines, may be obtained directly and compared to the SRBM volume-coded population database in order to similarly develop a MLCA to identify biomarkers from the original source signal data.

Specifically, in some embodiments, the operation 275 involves moving the moving window 330 across the computation region 325 of the image 335 at the defined step sizes and measuring the output value of the selected matching parameters at each step of the moving window. It is to be understood that same or similar parameters of the moving window are used for each image (e.g., the image 335) and each of the selected image datasets. Further, at each step, an area of the computation region 325 encompassed by the moving window 330 may overlap with at least a portion of an area of the computation region encompassed at another step. Further, where image slices are involved and the moving window 330 is moved across an image (e.g., the image 335) corresponding to an MRI slice, the moving window is moved within only a single slice plane until each region of the slice plane is measured. In this way, the moving window is moved within the single slice plane without jumping between different slice planes.

Figure 10B:
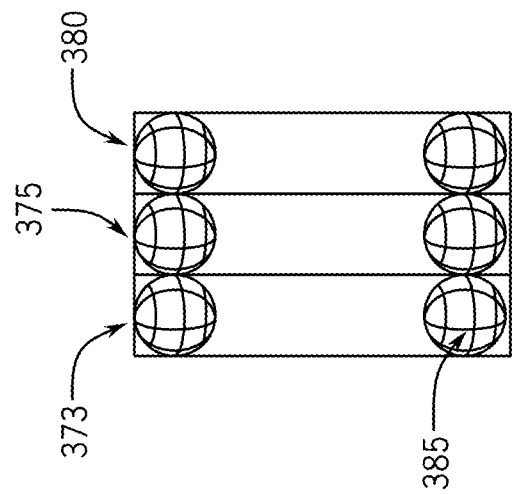
FIG. 10B depicts an end view of multiple slice planes and their corresponding moving windows, in accordance with an illustrative embodiment.
Figure 10A:
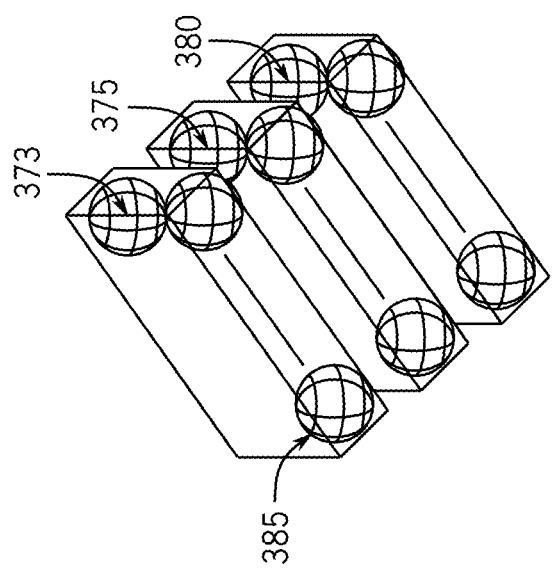
FIG. 10A depicts a perspective view of multiple slice planes and moving windows in those slice planes, in accordance with an illustrative embodiment.

The output values of the moving window 330 from the various steps are aggregated into a 3D matrix according to the x-y-z coordinates associated with each respective moving window output value. In some embodiments, the x-y coordinates associated with each output value of the moving window 330 correspond to the x-y coordinate on a 2D slice of the original image (e.g., the image 335), and various images and parameter map data is aggregated along the z-axis (e.g., as shown in FIG. 6). FIG. 10A depicts a perspective view of multiple 2D slice planes 373, 375, and 380 in accordance with an illustrative embodiment. A spherical moving window 385 is moved within each respective slice planes 373, 375, and 380. FIG. 10B depicts an end view of slice planes 373, 375, and 380. Again, the spherical moving window 385 is moved within the respective slice planes 373, 375, and 380 but without moving across the different slice planes. In this way, moving window values may be created and put into a matrix associated with a specific MRI slice and values between different MM slices do not become confused (e.g., the moving window moving within the slices for each corresponding image and parameter map in the dataset).

Figure 10C:
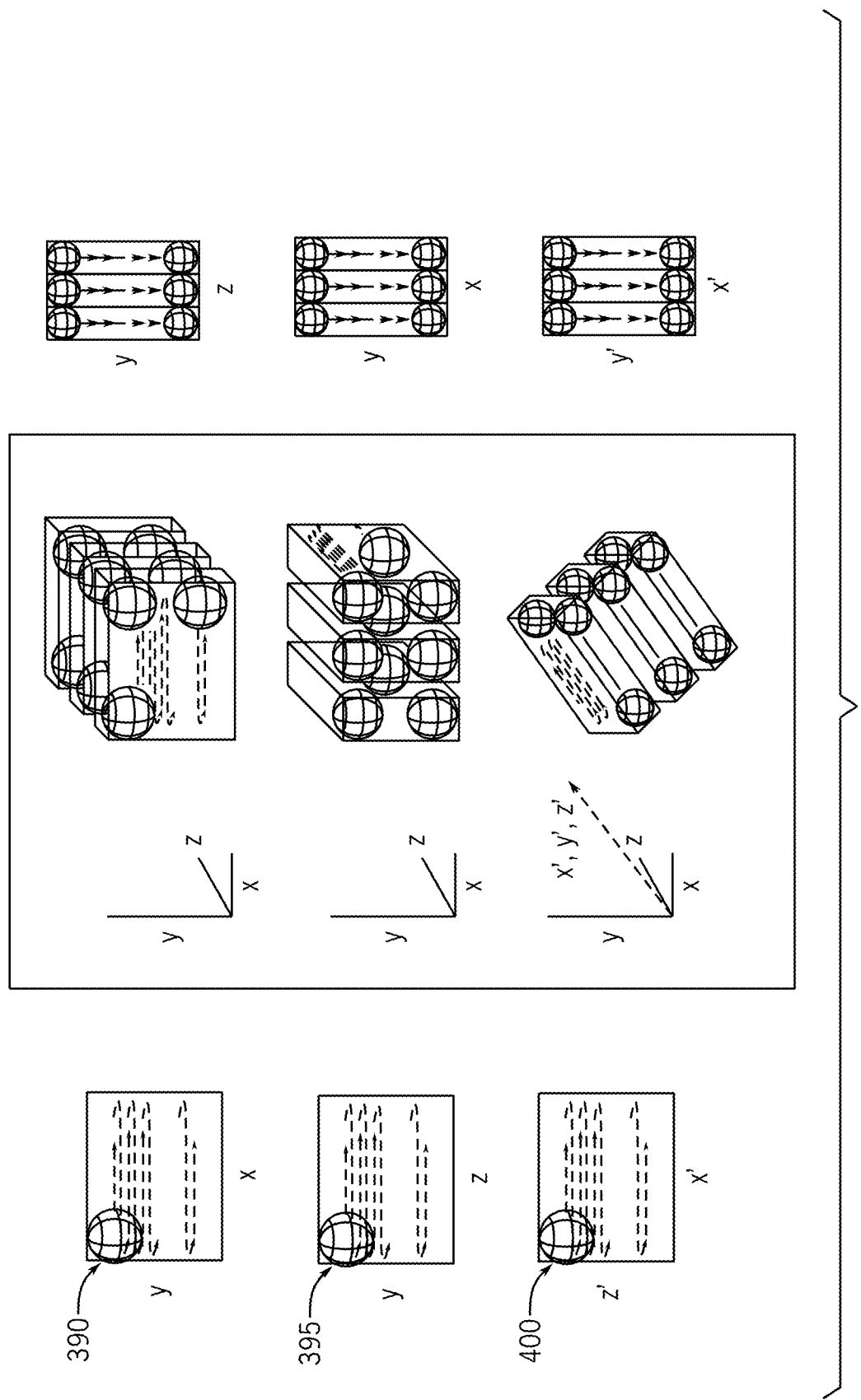
FIG. 10C depicts an example in which image slices for the sample are taken at multiple different angles, in accordance with an illustrative embodiment.

FIG. 10C depicts an embodiment in which MRI imaging slices for a given tissue sample are taken at multiple different angles. The different angled imaging slices may be analyzed using a moving window (e.g., the moving window 385) and corresponding matrices of the moving window output values combined to produce a super-resolution biomarker map as discussed herein. The use of multiple imaging slices having different angled slice planes allows for improved sub-voxel characterization, better resolution in the output image, reduced partial volume errors, and better edge detection. For example, slice 390 extends along the y-x plane and the moving window 385 moves within the slice plane along the y-x plane. Slice 395 extends along the y-z plane and the moving window 385 moves within the slice plane along the y-z plane. Slice 400 extends along the z'-x' plane and the moving window 385 moves within the slice plane along the z'-x' plane. Movement of the moving window 385 along all chosen slice planes preferably uses a common step size to facilitate comparison of the various moving window output values. When combined, the slices 390-400 provide image slices extending at three different angles.

FIG. 10D depicts an additional embodiment in which MRI imaging slices for a given tissue sample are taken at additional multiple different angles. In the embodiment of FIG. 10D, multiple imaging slices are taken at different angles radially about an axis in the z-plane. In other words, the image slice plane is rotated about an axis in the z-plane to obtain a large number of image slices. Each image slice has a different angle rotated slightly from an adjusted image slice angle.

Figure 11:
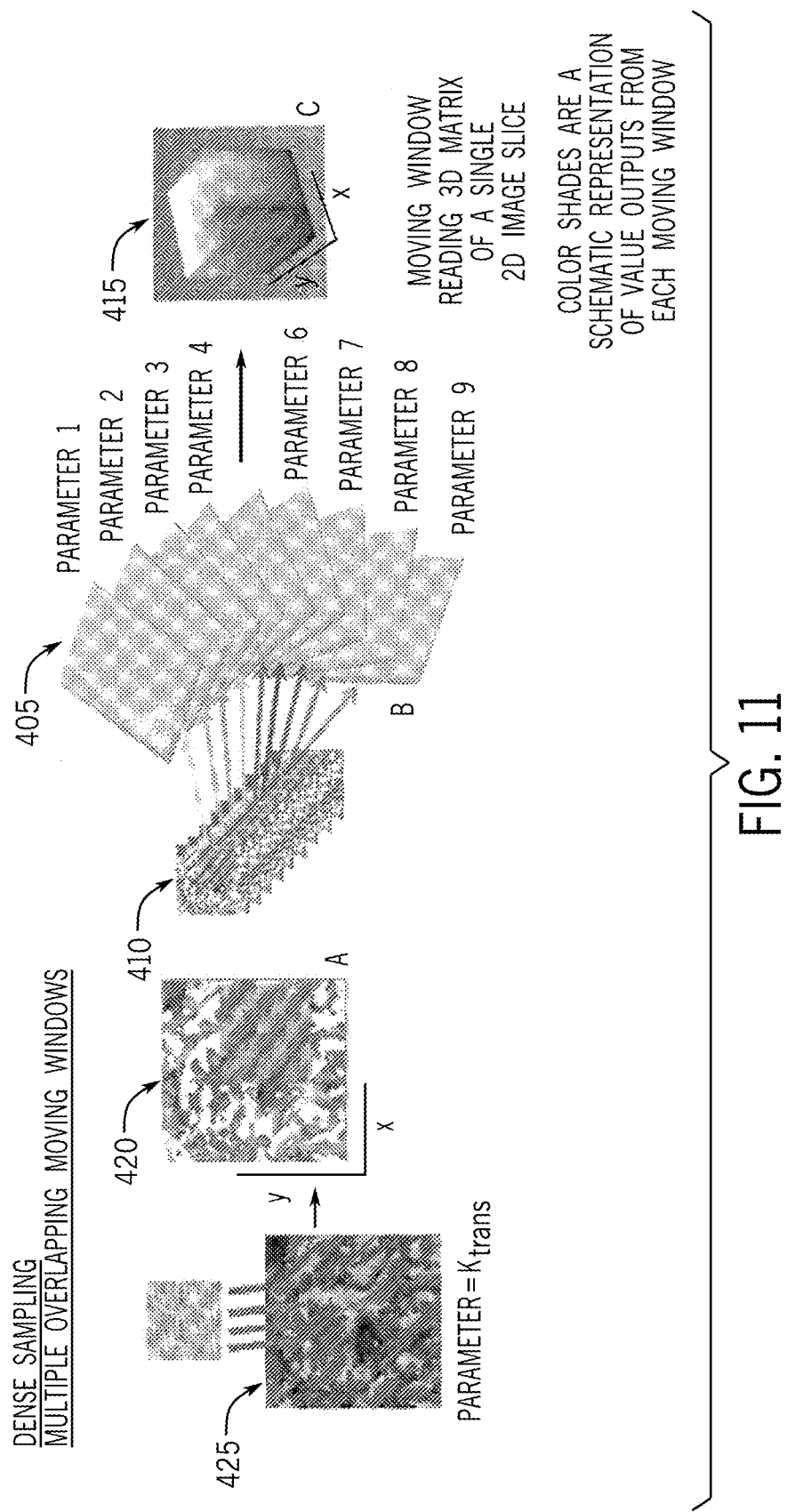
FIG. 11 depicts assembling multiple two-dimensional ("2D") image slices into a 3D matrix, in accordance with an illustrative embodiment.

Further, in some embodiments, moving window data for 2D slices is collated with all selected parameter maps and images registered to the 2D slice that are stacked to form the 3D matrix. FIG. 11 shows an example assembly of moving window output values 405 for a single 2D slice 410 being transformed into a 3D matrix 415 containing data across nine parameter maps, with parameter data aligned along the z-axis. Specifically, dense sampling using multiple overlapping moving windows may be used to create a 3D array of parameter measures (e.g., the moving window output values 405) from a 2D slice 425 of a human, animal, etc. Sampling is used to generate a two-dimensional (2D) matrix for each parameter map, represented by the moving window output values 405. The 2D matrices for each parameter map are assembled to form the multi-parameter 3D matrix 415, also referred to herein as a data array. In some embodiments, the 3D matrix 415 may be created for each individual slice of the 2D slice 425 by aggregating moving window output values for the individual slice for each of a plurality of parameters. According to such an embodiment, each layer of the 3D matrix 415 may correspond to a 2D matrix created for a specific parameter as applied to the specific individual slice.

The parameter set (e.g., the moving window output values 405) for each step of a moving window (e.g., the moving window 385) may include measures for some specific selected matching parameters (e.g., T1 mapping, T2 mapping, delta Ktrans, tau, Dt IVIM, fp IVIM, and R*), values of average Ktrans (obtained by averaging Ktrans from TM, Ktrans from ETM, and Ktrans from SSM), and average Ve (obtained by averaging Ve from TM and Ve from SSM). Datasets may also include source data, such as a series of T1 images during contrast injection, such as for Dynamic Contrast Enhanced MRI (DCE-MRI). In an embodiment, T2 raw signal, ADC (high b-values), high b-values, and nADC may be excluded from the parameter set because these parameters are not determined to be conditionally independent. In contrast, T1 mapping, T2 mapping, delta Ktrans, tau, Dt IVIM, fp IVIM, and R* parameters may be included in the parameter set because these parameters are determined to be conditionally independent.

Figure 12:
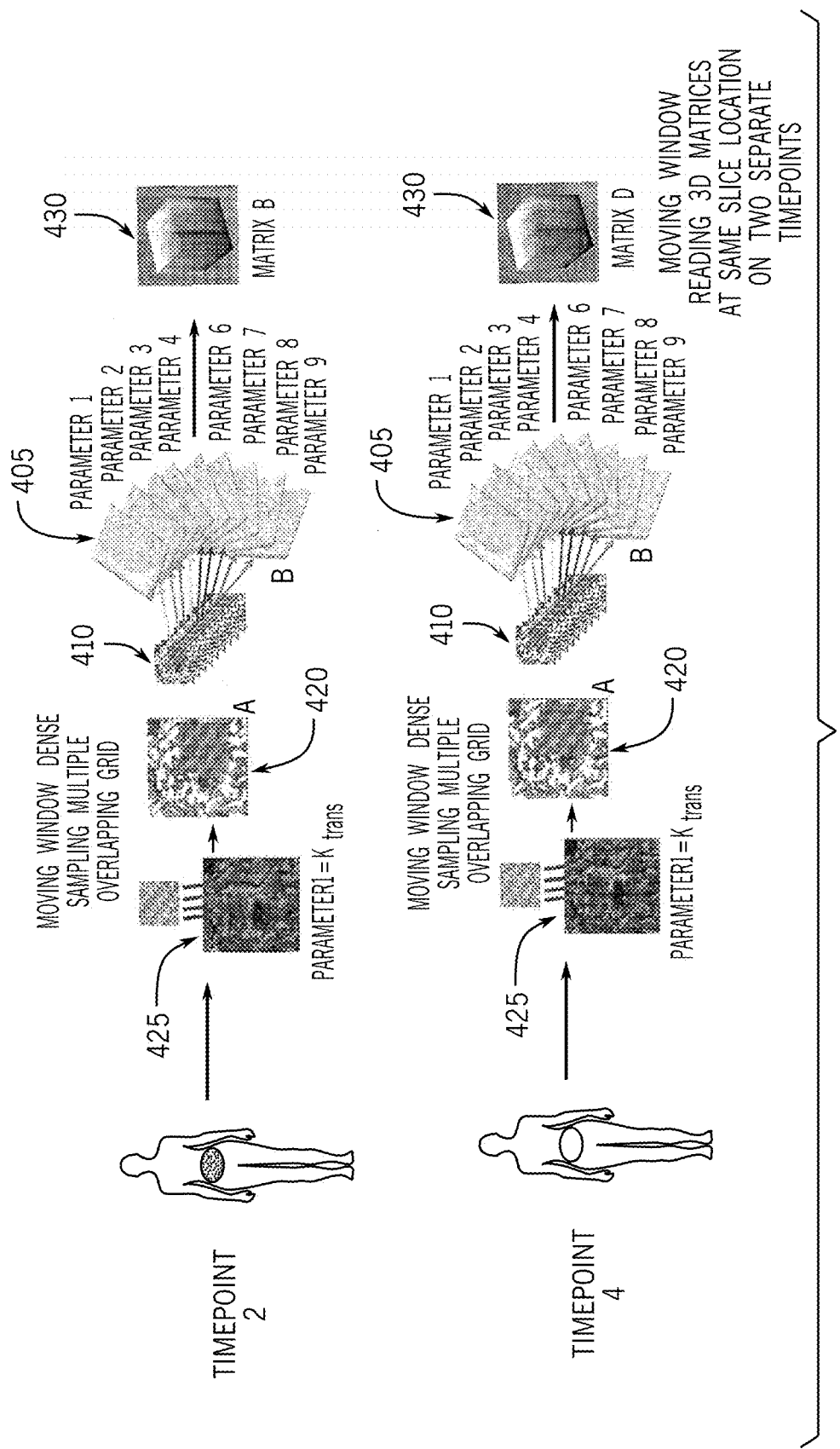
FIG. 12 depicts creating 3D matrices for each of the selected image datasets in FIG. 3, in accordance with an illustrative embodiment.

Further, a 3D matrix (e.g., the 3D matrix 415) is created for each image in each image dataset selected at the operation 210 of FIG. 2. FIG. 12 shows the 3D matrix creation for the image datasets associated with time points 2 and 4 that were selected at the operation 210. Specifically, as shown in FIG. 12, from the time point 2, a 3D matrix 430 is generated and from the time point 4, a 3D matrix 435 is generated. Thus, all of the images in each of the image datasets corresponding to the time point 2 and the time point 4 are transformed into the 3D matrix 430 and the 3D matrix 435.

Figure 13:
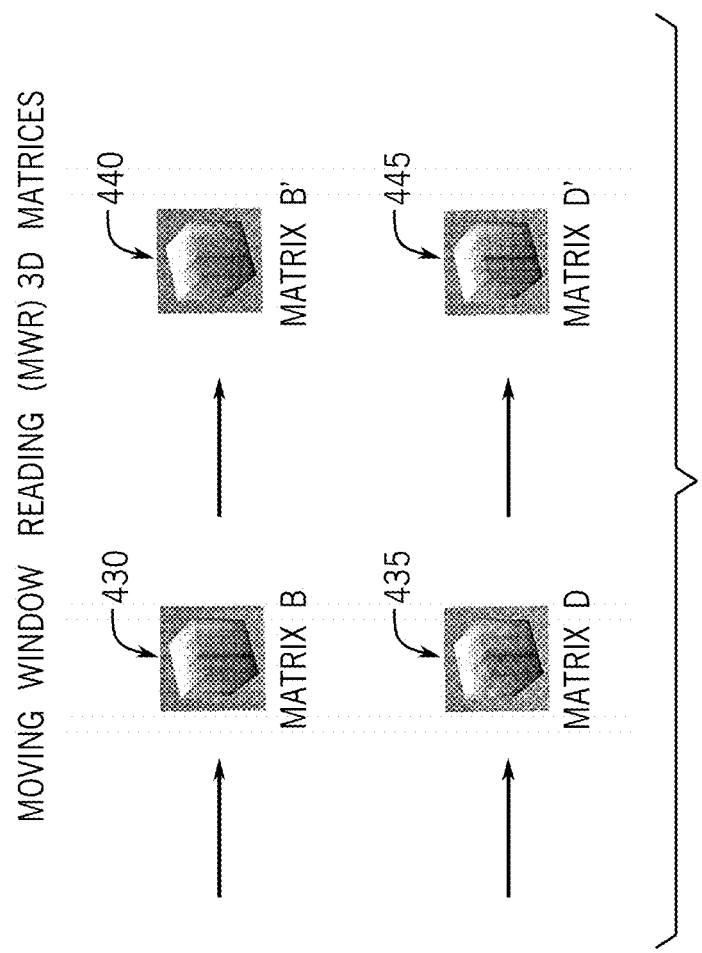
FIG. 13 depicts operations for refining 3D matrices, in accordance with an illustrative embodiment.

Returning back to FIG. 2, the 3D matrices (e.g., the 3D matrix 430 and the 3D matrix 435) created at the operation 215 are refined at an operation 220. Refining a 3D matrix may include dimensionality reduction, aggregation, and/or subset selection processes. Other types of refinement operations may also be applied to each of the 3D matrices (e.g., the 3D matrix 430 and the 3D matrix 435) obtained at the operation 215. Further, in some embodiments, the same refinement operation may be applied to each of the 3D matrices, although in other embodiments, different refinement operations may be applied to different 3D matrices as well. Refining the 3D matrices (e.g., the 3D matrix 430 and the 3D matrix 435) may reduce parameter noise, create new parameters, and assure conditional independence needed for future classifications. As an example, FIG. 13 shows the 3D matrices 430 and 435 being refined into matrices 440 and 445, respectively. The matrices 440 and 445, which are refined, are also 3D matrices.

Figure 14:
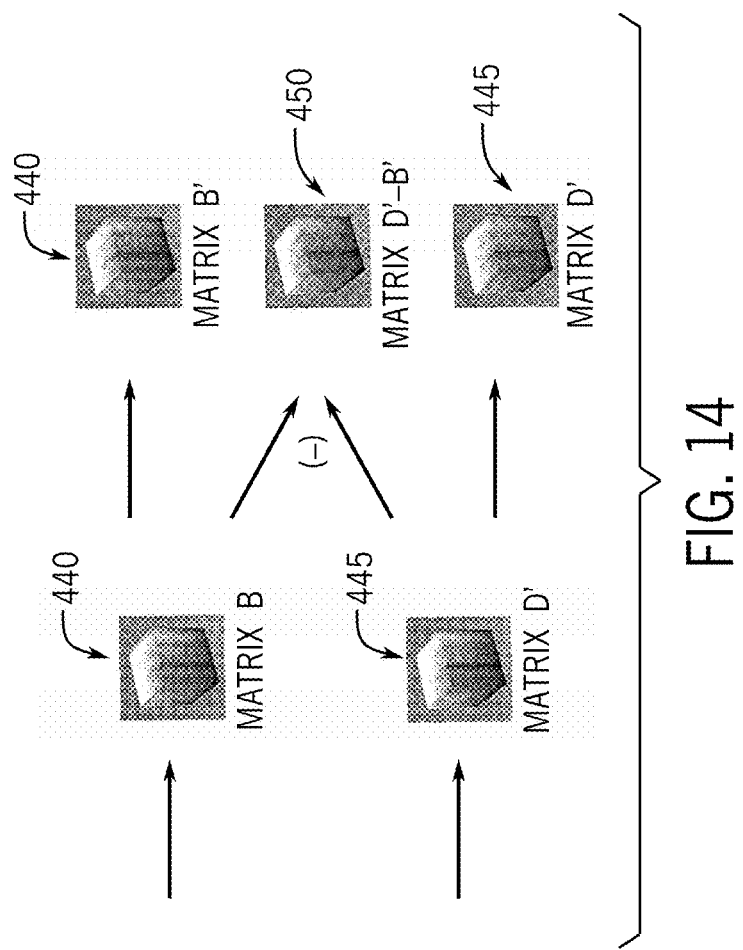
FIG. 14 depicts an example matrix operation applied to the 3D matrices, in accordance with an illustrative embodiment.

On the refined matrices (e.g., the matrices 440 and 445), one or more matrix operations are applied at operation 225 of FIG. 2. The matrix operations generate a population of matrices for use in analyzing the sample (e.g., the sample 165). FIG. 14 shows an example of a matrix operation being applied to the matrices 440 and 445, in accordance with some embodiments of the present disclosure. Specifically, a matrix subtraction operation is applied on the matrices 440 and 445 to obtain a matrix 450. By performing the matrix subtraction, a difference in parameter values across all parameter maps at each stop of the moving window (e.g., the moving window 385) from each of the matrices 440 and 445 may be obtained. In other embodiments, other matrix operations may be performed on the matrices 440 and 445 as well. For example, in some embodiments, matrix operations may include matrix addition, subtraction, multiplication, division, exponentiation, transposition, or any other suitable and useful matrix operation known to those of skill in the art. Various matrix operations may be selected as needed for later advanced big data analytics. Further, such matrix operations may be used in a specific Bayesian belief network to define a specific biomarker that may help answer a question regarding the tissue being analyzed, e.g., "Did the tumor respond to treatment?"

Figure 15:
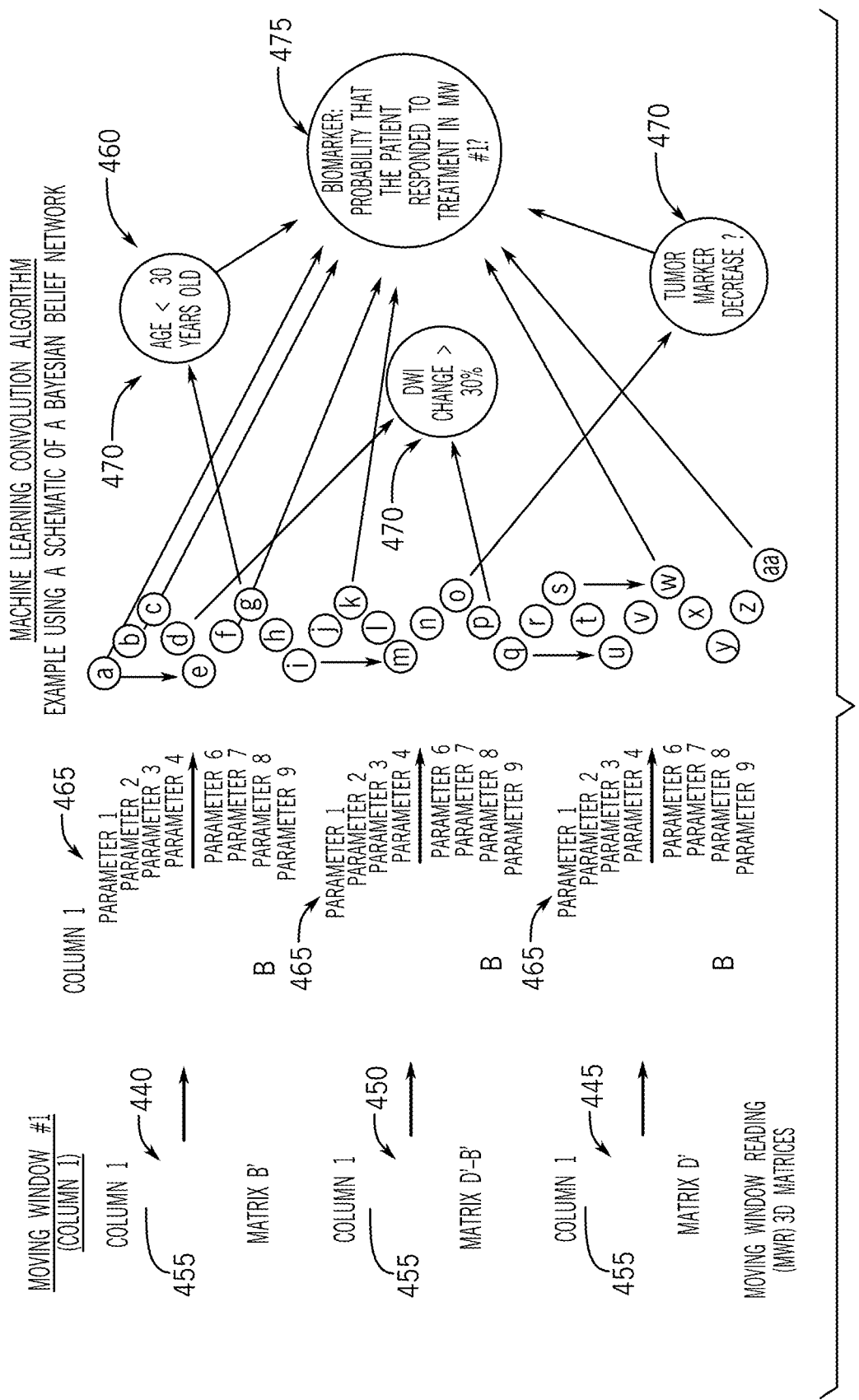
FIG. 15 depicts selecting corresponding matrix columns from various 3D matrices and applying a machine learning convolution algorithm ("MLCA") on the matrix columns, in accordance with an illustrative embodiment.

At operation 230, corresponding columns from each 3D matrix (e.g., the matrices 440, 445, and 450) are selected for comparison and analysis. In this way, subsets of the various matrices (e.g., the matrices 440, 445, and 450) that correspond to the same small areas of the tissue sample (e.g., the sample 165) may be compared and analyzed. FIG. 15 shows the selection of a corresponding matrix column 455 in the matrices 440-450. As shown, the matrix column 455 that is selected corresponds to the first column (e.g., Column 1) of each of the matrices 440-450. The matrix column 455 in each of the matrices 440-450 corresponds to the same small area of the sample (e.g., the sample 165). It is to be understood that the selection of Column 1 as the matrix column 455 is only an example. In other embodiments, depending upon the area of the sample (e.g., the sample 165) to be analyzed, other columns from each of the matrices 440-450 may be selected. Additionally, in some embodiments, multiple columns from each of the matrices 440-450 may be selected to analyze and compare multiple areas of the sample. When multiple column selections are used, in some embodiments, all of the desired columns may be selected simultaneously and analyzed together as a group. In other embodiments, when multiple column selections are made, columns may be selected one at a time such that each selected column (e.g., the matrix column 455) is analyzed before selecting the next column.

The matrix columns selected at the operation 230 of FIG. 2 are subject to a machine learning convolution algorithm ("MLCA") 460 and a 2D Matrix (also referred to herein as a convoluted graph) is output from the MLCA. In some embodiments and as shown in FIG. 15, the MLCA 460 may be a Bayesian belief network that is applied to the selected columns (e.g., the matrix column 455) of the matrices 440-450. The Bayesian belief network is a probabilistic model that represents probabilistic relationships between the selected columns of the matrices 440-450 having various parameter measures or maps 465. The Bayesian belief network also takes into account several other pieces of information, such as clinical data 470. The clinical data 470 may be obtained from patient's medical records and matching data in the precision database and/or the volume-coded precision database are used as training datasets. Further, depending upon the embodiment, the clinical data 470 may correspond to the patient whose sample (e.g., the sample 170) is being analyzed, the clinical data of other similar patients, or a combination of both. Also, the clinical data 470 that is used may be selected based upon a variety of factors that may be deemed relevant. The Bayesian belief network combines the information from the parameter measures or maps 465 with the clinical data 470 in a variety of probabilistic relationships to provide a biomarker probability 475. Thus, the biomarker probability 475 is determined from the MLCA which inputs the parameter value data (e.g., the parameter measures or maps 465) and other desired imaging data in the dataset within each selected column (e.g., the matrix column 455) of the matrices 440-1220, the weighting determined by the Bayesian belief network, and determines the output probability based on the analysis of training datasets (e.g., matching imaging and the clinical data 470) stored in the precision database.

Figure 16:
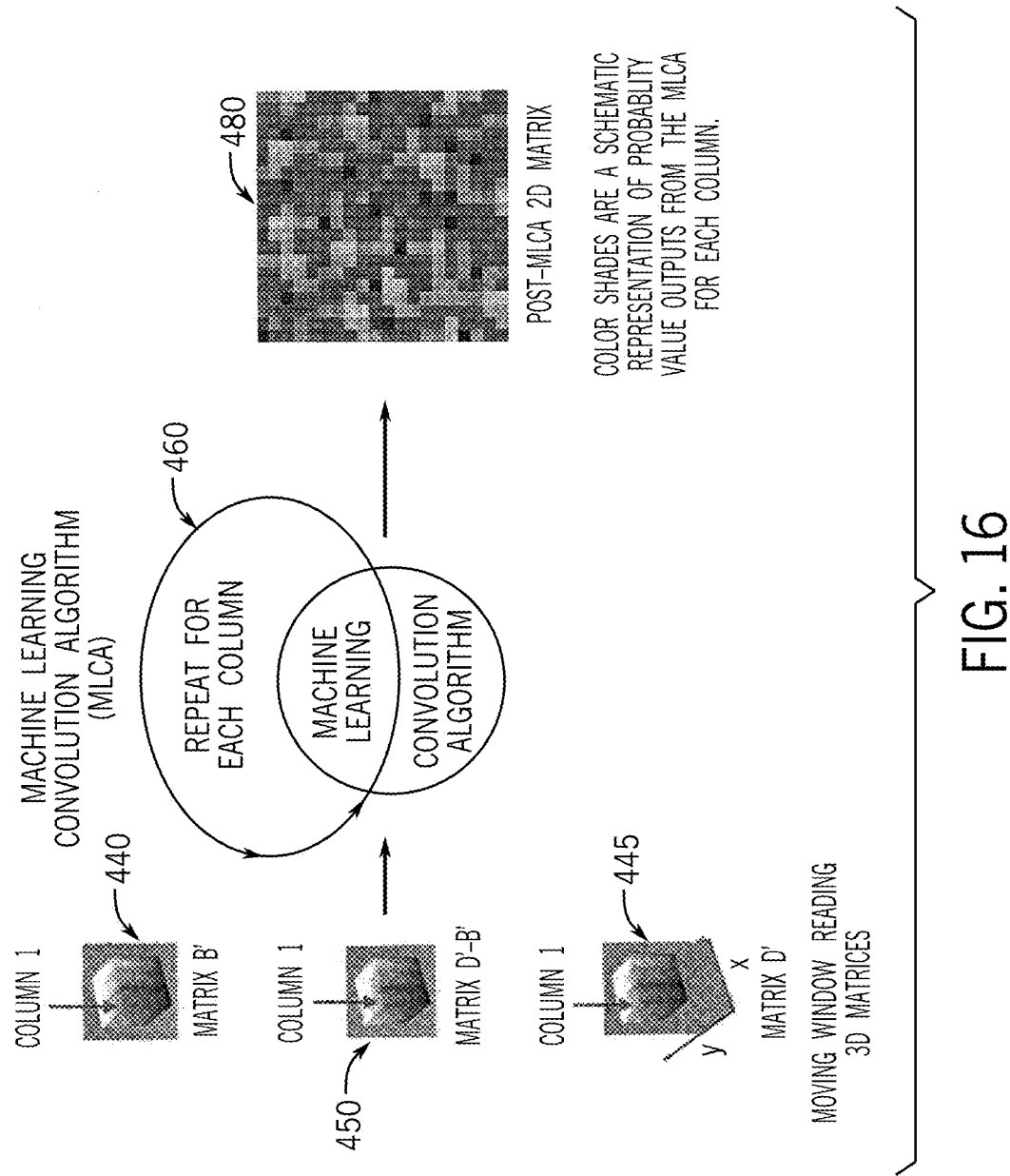
FIG. 16 depicts a 2D matrix obtained by applying the MLCA, in accordance with an illustrative embodiment.

Thus, by varying the selection of the columns (e.g., the matrix column 455) providing varying imaging measures and using a biomarker specific MLCA (with the same corresponding clinical data 470), the biomarker probability 475 varies across moving window reads. The biomarker probability 475 may provide an answer to a clinical question. A biomarker probability (e.g., the biomarker probability 475) is determined for each (or some) column(s) of the matrices 440-450, which are then combined to produce a 2D matrix. As an example, FIG. 16 shows a 2D matrix 480 produced by applying the MLCA 460 to the matrices 440-450. Similar to the biomarker probability 475, the 2D Matrix 480 corresponds to a biomarker probability and answers a specific clinical question regarding the sample 165. For example, the 2D matrix 480 may answer clinical questions such as "Is cancer present?," "Do tissue changes after treatment correlate to expression of a given biomarker?," "Did the tumor respond to treatment?," or any other desired questions. The 2D matrix 480, thus, corresponds to a probability density function for a particular biomarker. Therefore, biomarker probabilities (e.g., the biomarker probability 475) determined from the matrices 440-450 are combined to produce the 2D matrix 480, represented by a probability density function.

Although Bayesian belief network has been used as the MLCA 460 in the present embodiment, in other embodiments, other types of MLCA such as a convolutional neural network or other classifiers or machine learning algorithms may be used instead or in addition to the Bayesian belief network. In addition to answering certain clinical questions, the 2D matrix 480 may be viewed directly or converted to a 3D graph for viewing by an interpreting physician to gain an overview of the biomarker probability data. For example, the 2D matrix 480 may be reviewed by a radiologist, oncologist, computer program, or other qualified reviewer to identify unhelpful data prior to completion of full image reconstruction, as detailed below. If the 2D matrix 480 provides no or vague indication of large enough probabilities to support a meaningful image reconstruction or biomarker determination, the image data analysis (e.g., the 2D matrix 480) may be discarded.

Figure 17:
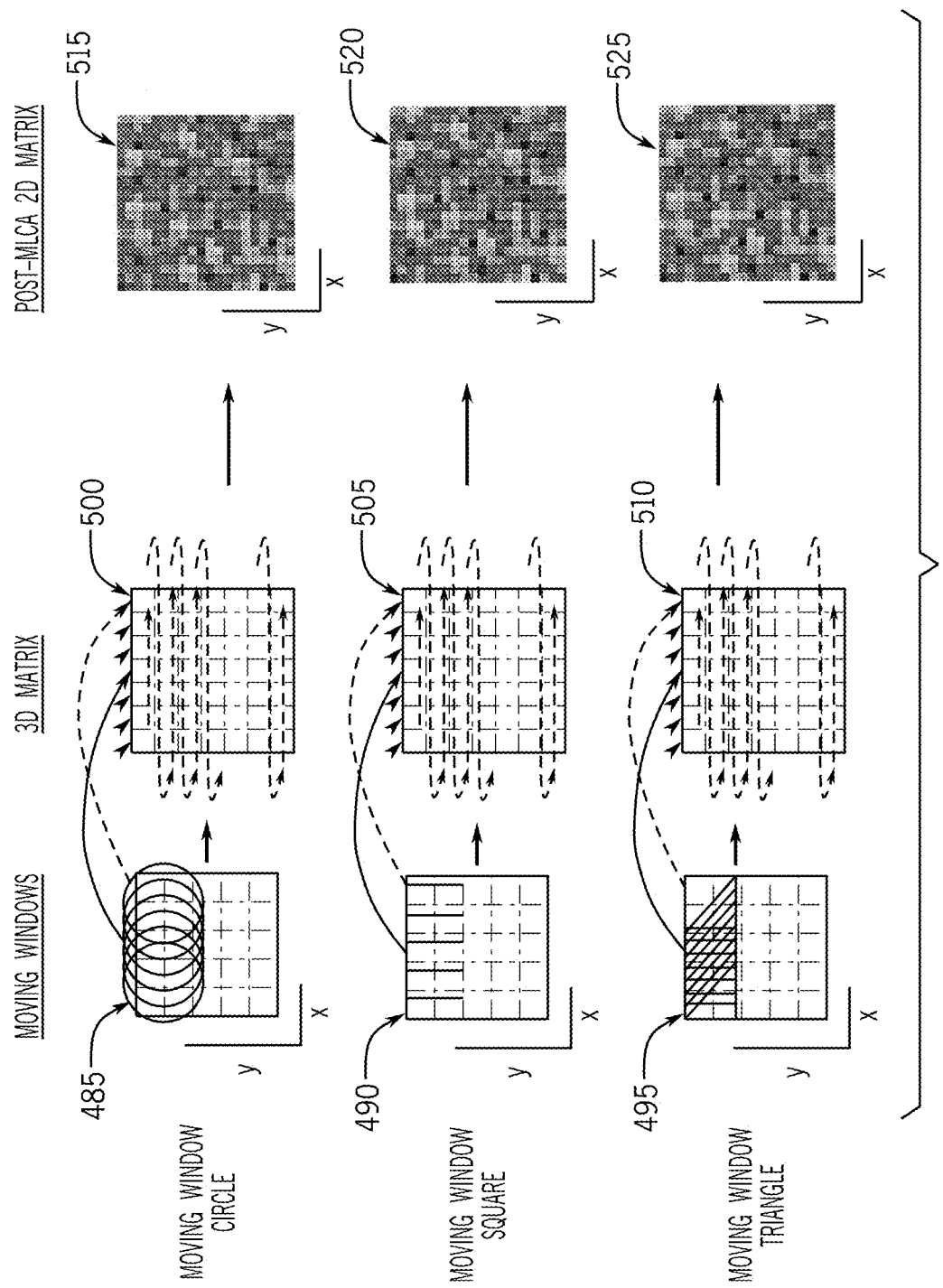
FIG. 17 depicts multiple 2D matrices obtained for a particular region of interest from various moving windows, in accordance with an illustrative embodiment.

Alternatively or additionally, modifications may be made to the image data analysis parameters (e.g., modifications in the selected columns of the matrices 440-1220, the clinical data 470, etc.) and the MLCA 460 may be reapplied and another 2D matrix obtained. In some embodiments, the moving window size, shape, and/or other parameter may be modified and operations 215-235 re-applied. By redefining the moving window, different 2D matrices (e.g., the 2D matrix 480) may be obtained. An example collection of data from moving windows of different shapes and sizes is shown in FIG. 17. Specifically, FIG. 17 shows a collection of data using a circular moving window 485, a square moving window 490, and a triangular moving window 495. From each of the moving windows 485-495, a corresponding 3D matrix 500-510 is obtained. On each of the 3D matrix 500-510, MLCA is applied to obtain a respective 2D matrix 515-525. Thus, by refining the moving window, multiple 2D matrices (e.g., the 2D matrices 515-525) may be created for a particular region of interest. Although FIG. 17 shows variation in the shape of the moving window, in other embodiments, other aspects, such as size, step size, and direction may additionally or alternatively be varied to obtain each of the 2D matrix 515-525. Likewise, in some embodiments, different angled slice planes may be used to produce the different instances of the 2D matrix 515-525. The data collected from each moving window in the 2D matrix 515-525 is entered into first and second matrices and is combined into a combined matrix using a matrix addition operation, as discussed below.

Additionally, in some embodiments, different convolution algorithms may be used to produce super-resolution parameter maps and/or super-resolution parameter change maps. For example, a 2D matrix map may be created from a 3D matrix input using such a convolution algorithm. Examples of such convolution algorithms may include pharmacokinetic equations for Ktrans maps or signal decay slope analysis used to calculated various diffusion-weighted imaging calculations, such as ADC. Such algorithms may be particularly useful in creating final images with parameter values instead of probability values. The color theory reconstruction algorithm can be applied in a matching way, but MAP values give parameter values and not probabilities.

Referring still to FIG. 2, at operation 240, a reconstruction algorithm is applied to the 2D matrix (e.g., the 2D matrix

Figure 18B:
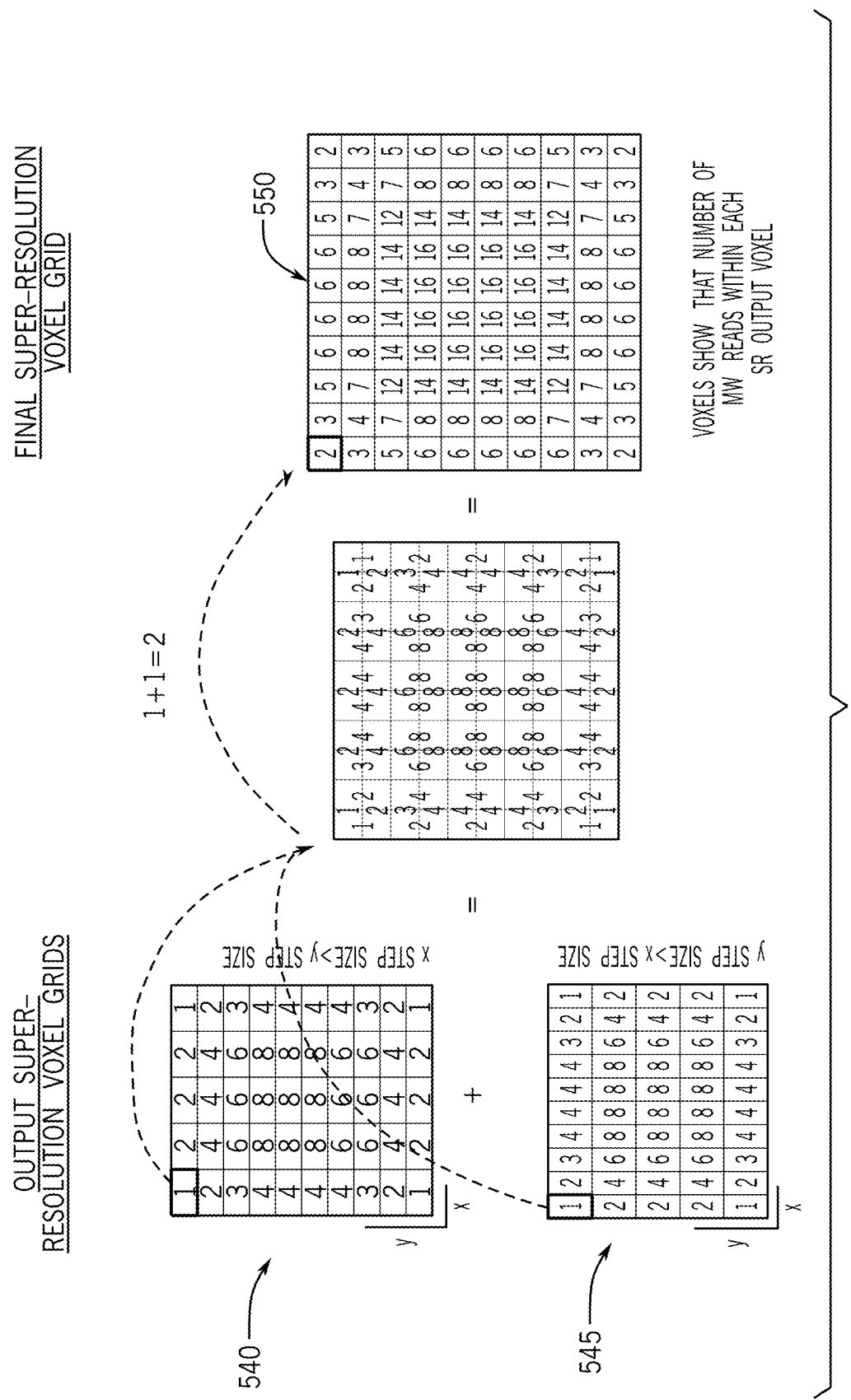
FIG. 18B depicts a mapping of moving window reads in a post-MLCA to the output super-resolution output grid, in accordance with an illustrative embodiment.
Figure 19A:
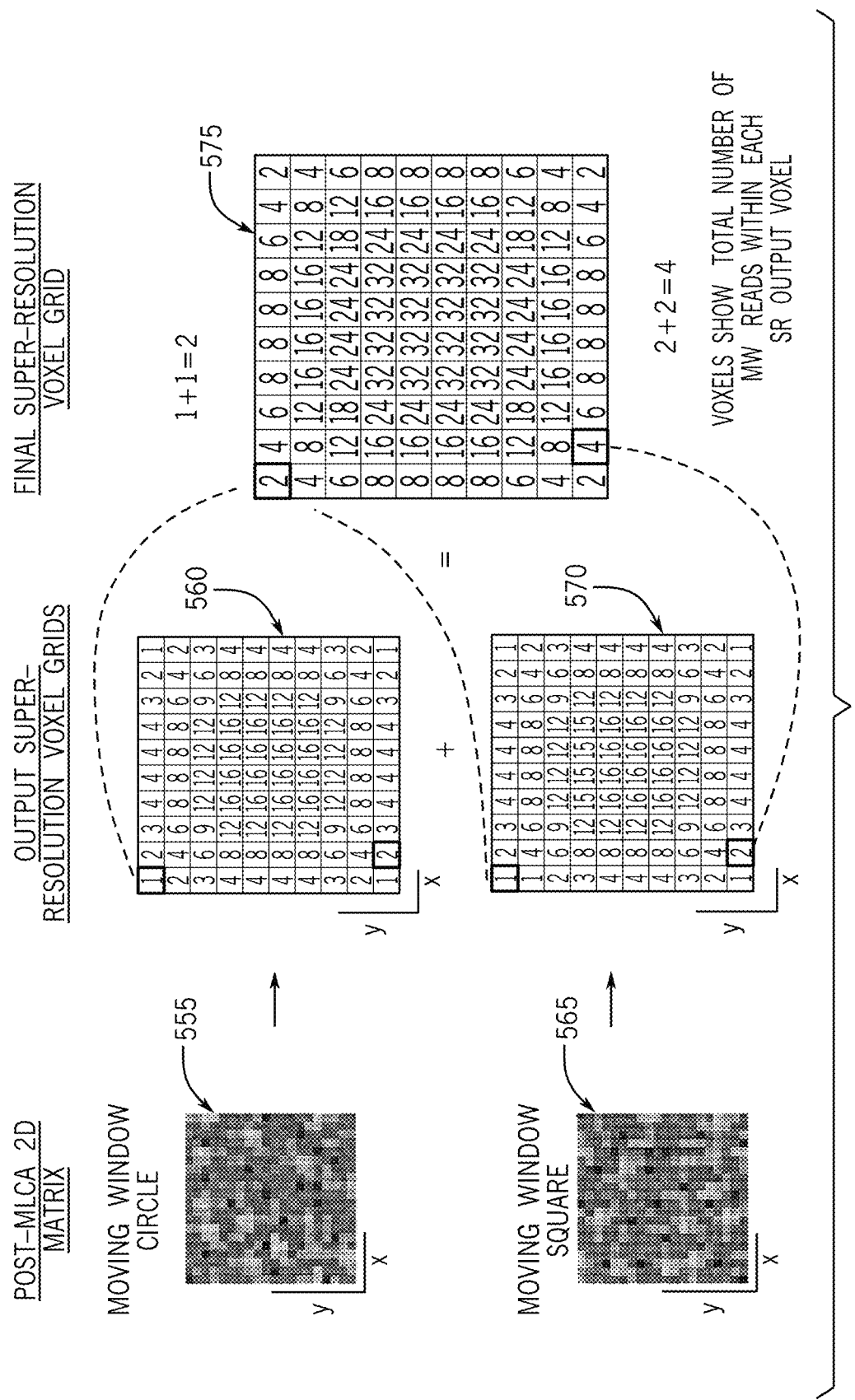
FIG. 19A depicts a reconstruction example in which a 2D final super-resolution voxel grid is produced from various 2D matrices obtained from different moving window step sizes, in accordance with an illustrative embodiment.

480 and/or the 2D matrices 515-525) to produce an SRBM image at a defined resolution for each biomarker. Specifically, the reconstruction algorithm produces a final super-resolution voxel grid (or matrix) from a combination of the 2D matrices 515-525, as depicted in FIGS. 18A-19. More specifically, the reconstruction algorithm converts each 2D matrix 515-525 into an output super-resolution voxel grid or matrix, as shown in FIGS. 18A and 18B, which are then combined to form a final super-resolution voxel grid, as shown in FIG. 19. From the final super-resolution voxel grid, an SRBM image is created.

Turning to FIG. 18A, a read count kernel 530 may be used to determine the number of moving window reads within each voxel of the defined output super-resolution voxel grid. A defined threshold is set to determine which voxels receive a reading as a voxel fully enclosed within the moving window, or at a set threshold, such as 98% enclosed. Each of these voxels within the read count kernel 530 has a value of 1 within the read count kernel. The read count kernel 530 moves across the output grid at step size matching the size of the super resolution voxels and otherwise match the shape, size, and movement of the corresponding specified moving window defined during creation the 3D matrices. Moving window readings are mapped to voxels that are fully contained within the moving window, such as the four voxels labeled with reference numeral 535. Alternatively, moving window read voxel may be defined as those having a certain percentage enclosed in the moving window, such as 98%.

Further, values from moving window reads (e.g., A+/−sd, B+/−sd, C+/−sd) are mapping to the location on the super-resolution output grid and the corresponding values is assigned to each full voxel contained within the moving window (or partially contained at a desired threshold, such as 98% contained). For example, the post-MLCA 2D matrix contains the moving window reads for each moving window, corresponding to the values in the first three columns of the first row. Each of the 9 full output SR voxels within the first moving window (MW 1) receives a value of A+/−sd, each of the 9 full output SR voxels within the second moving window (MW 2) receives a value of B+/−sd, and each of the 9 full output SR voxels within the third moving window (MW 3) receives a value of C+/−sd.

Figure 20A:
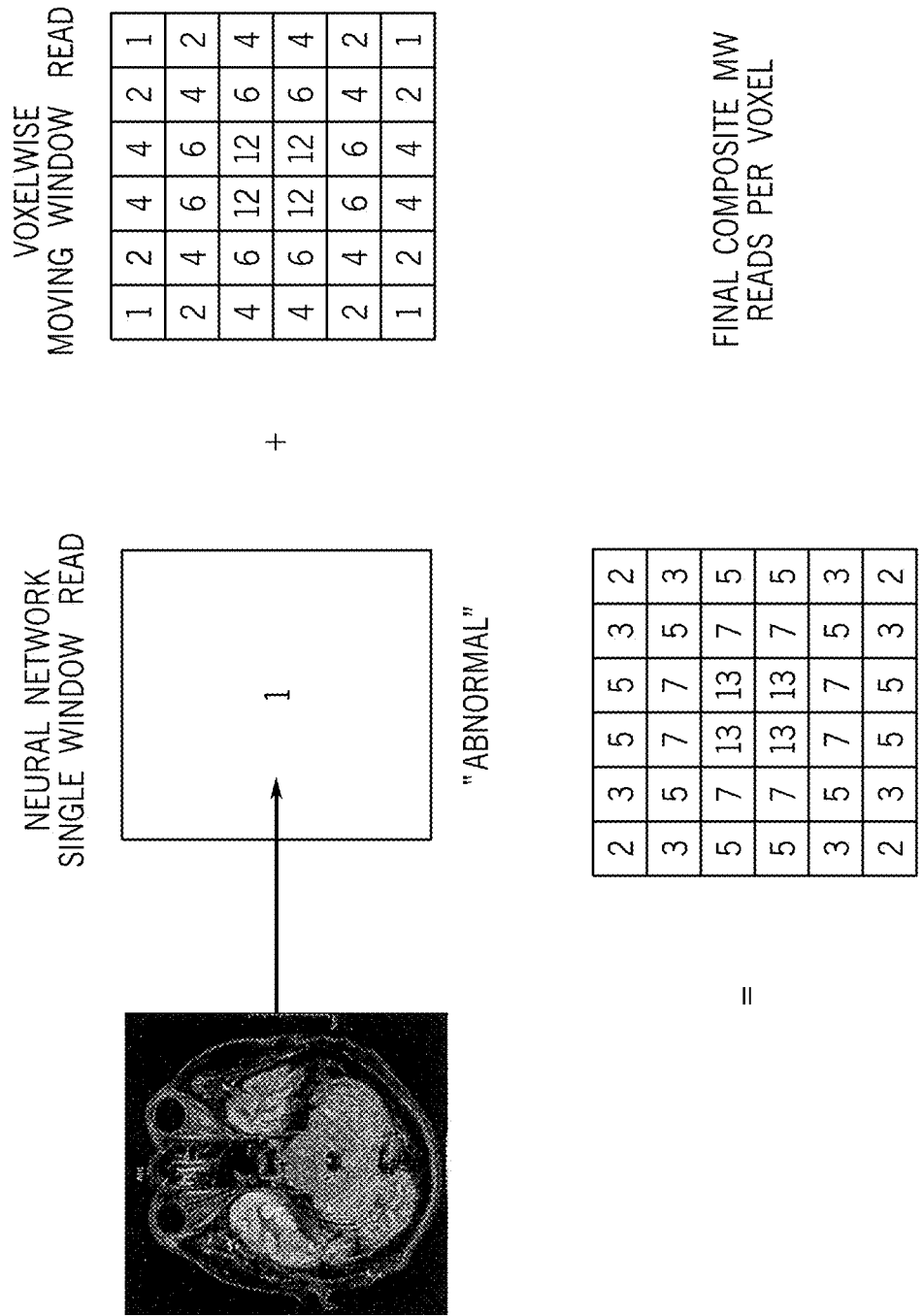
FIGS. 20A and 20B depict an example neural network matrix providing a probability value, in accordance with an illustrative embodiment.
Figure 20B:
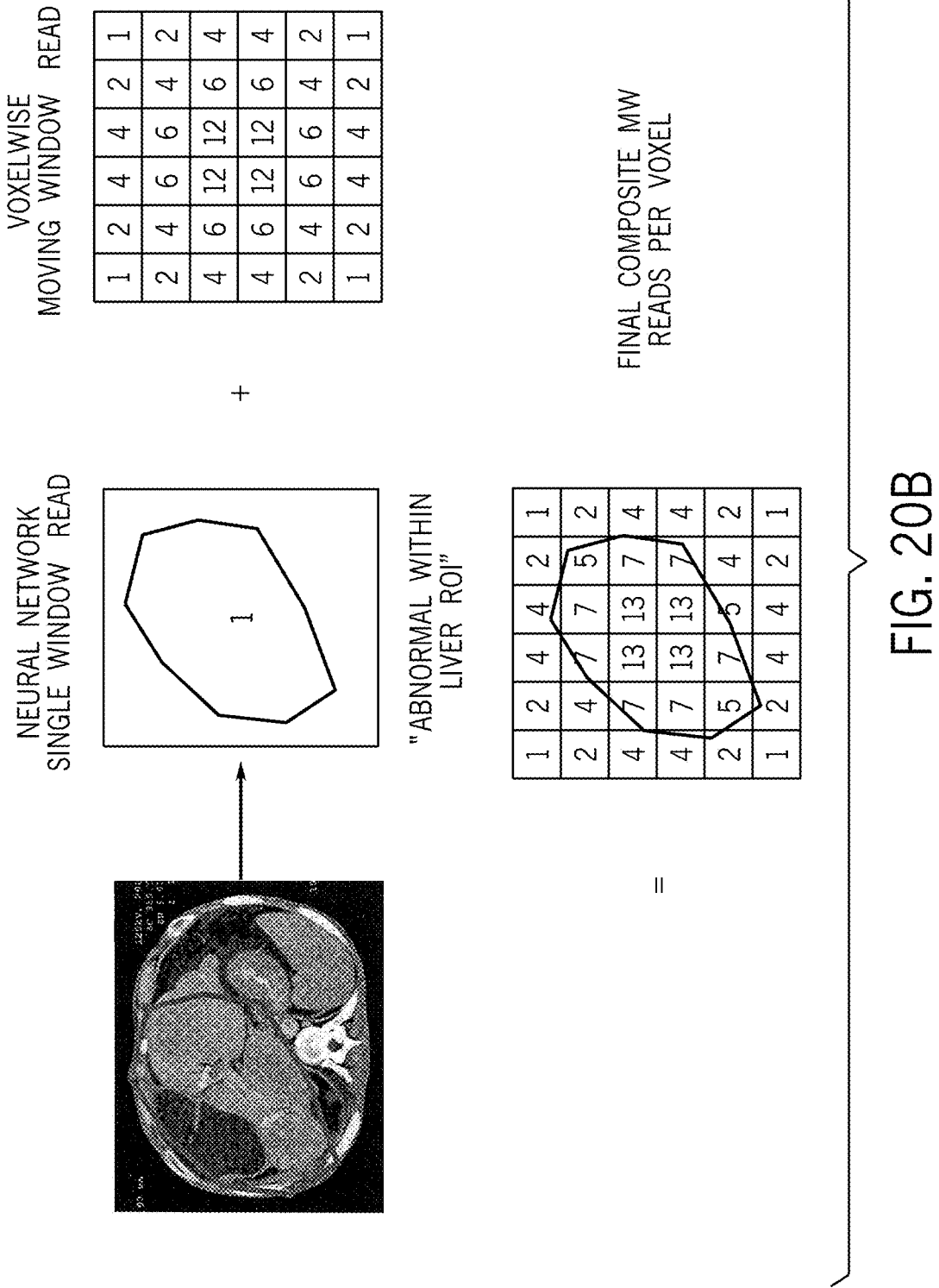

FIGS. 20A and 20B depict another embodiment of obtaining an output super-resolution voxel grid. Specifically, neural network methods may be employed such that full image or full organ neural network read may return a single moving window read per entire image or organ region of interest. Such a read may represent a probability that a tissue is normal or abnormal. Moving window reads may be added as for other reads, discussed above, and only voxels contained with organ ROI may be added.

Further, as indicated above, different moving window shapes, size, and step sizes and different angled slice planes may be used to produce the 2D matrices. FIG. 18B shows a reconstruction example in which a 2D final super-resolution voxel grid is produced from individual 2D matrices resulting from different moving window step sizes. Output super-resolution voxel grid 540 is based on a 2D matrix produced by a moving window have a step size in the x direction that is larger than a step size in the y direction. As such, the output super-resolution voxel grid 540 has five columns and ten rows. Output super-resolution voxel grid 545 is based on a 2D matrix produced by a moving window have a step size in the y direction that is larger than a step size in the x direction. As such, the output super-resolution voxel grid 545 has ten columns and five rows. A matrix addition operation is performed to combine the output super-resolution voxel grids 540 and 545 to produce a final super-resolution voxel grid 550 having ten rows and ten columns, which is a much higher resolution grid than that produced by the individual output super-resolution voxel grids 540 and 545.

Thus, as shown in FIG. 19, a first 2D matrix 555 is converted into a first output super-resolution voxel grid 560 and a second 2D matrix 565 is converted into a second output super-resolution voxel grid 570. The output super-resolution voxel grid 560 and the output super-resolution voxel grid 570 are then combined according to a reconstruction algorithm (e.g., addition algorithm) to obtain a final super-resolution voxel grid 575. FIGS. 18A-19 provide examples where the output super-resolution voxel grids and the final super-resolution voxel grid are both represented as 2D matrices. In some embodiments, the final super-resolution voxel grid may be a represented as a 3D matrix.

Figure 19B:
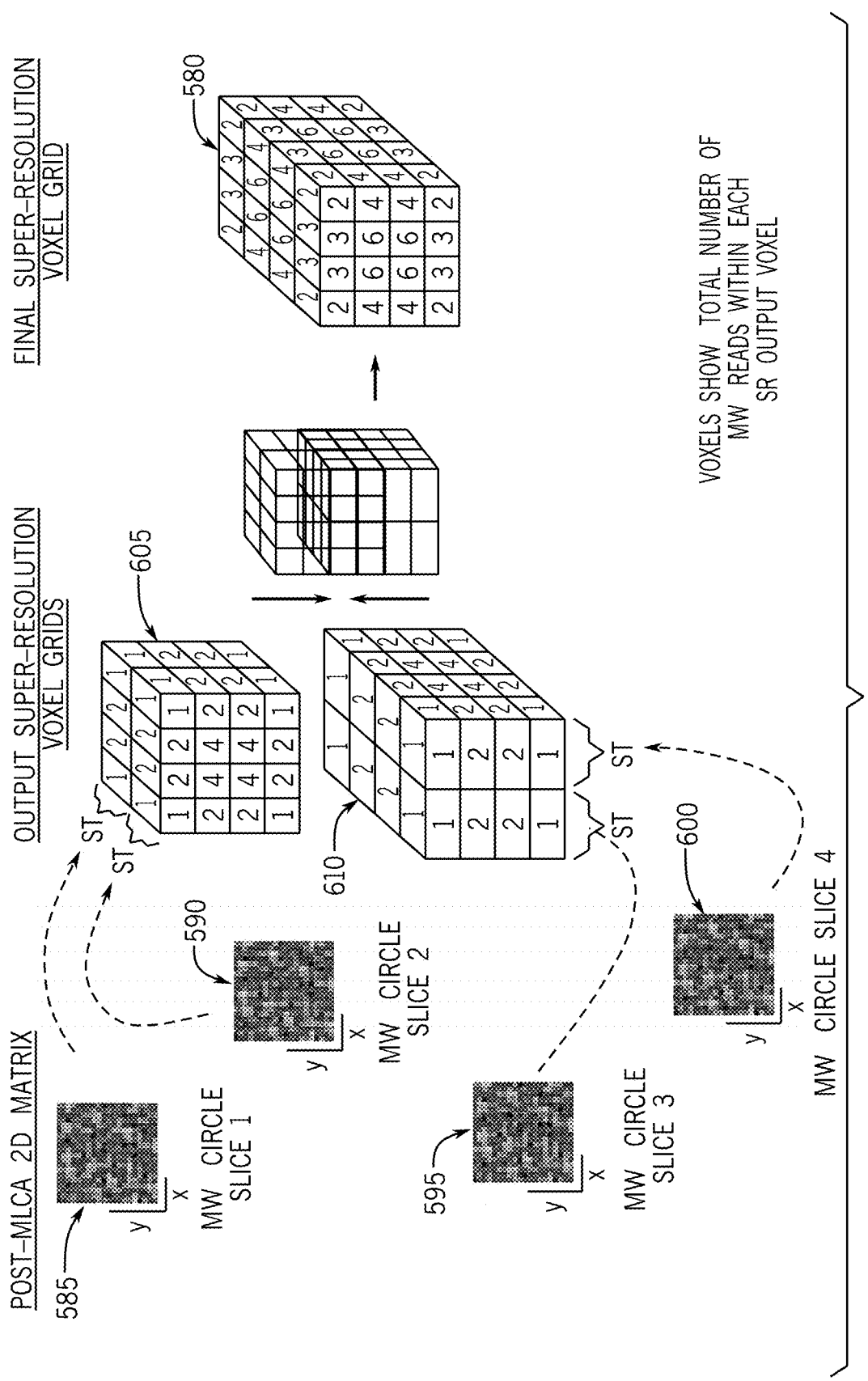
FIG. 19B depicts a reconstruction example in which a 3D final super-resolution voxel grid is produced from the 2D matrices that are obtained from multiple imaging slices, in accordance with an illustrative embodiment.

FIG. 19B depicts a reconstruction example in which a 3D final super-resolution voxel grid 580 is produced from 2D matrices 585, 590, 595, and 600, which result from multiple imaging slices. A 3D output super-resolution voxel grid 605 is produced from slices represented by the 2D matrices 585 and 590, while a 3D output super-resolution voxel grid 610 is produced from slices represented by the 2D matrices 595 and 600. The 2D matrices 585 and 590 have a slice thickness in a first direction that limits the number of total voxels in a first direction, while the 2D matrices 595 and 600 have a slice thickness in a second direction that limits the number of total voxels in the second direction. A 3D matrix addition operation may be performed to combine the 3D output super-resolution voxel grids 605 and 610 to generate the final 3D super-resolution voxel grid 580 having a much higher resolution grid than that produced by the individual 3D output super-resolution voxel grids 605 and 610.

In addition to obtaining the final 3D super-resolution voxel grid, the reconstruction algorithm may include a color theory component that converts the final super-resolution voxel grid to a color SRBM image as further discussed in detail below with reference to FIGS. 21-26. The SRBM image includes multiple computation voxels (or pixels) with the same size or volume. By applying the reconstruction algorithm and particularly a color theory component to the final 3D super-resolution voxel grid, a super resolution biomarker image may be created having only a single size of output voxel and may include only output voxel values, instead of probabilities as discussed in more detail below.

Returning back to FIG. 2, upon generating an SRBM image at the operation 240, it is determined at operation 245 whether any additional biomarkers remain to be analyzed within the sample 165. If there are additional biomarkers or features or areas of interest to be analyzed in the sample 165, the method 200 returns to operation 220 and the operations 220-240 are repeated for each additional biomarker. In the case of each newly selected biomarker, a new MLCA is selected based on the specific training population database data for the new biomarker. In embodiments where multiple biomarkers are identified in a single voxel, the separate biomarkers may be assigned separate color scales or be combined into a mixed color scale. If there are no additional biomarkers to be analyzed at the operation 245, the method 200 ends at operation 250.

Figure 21:
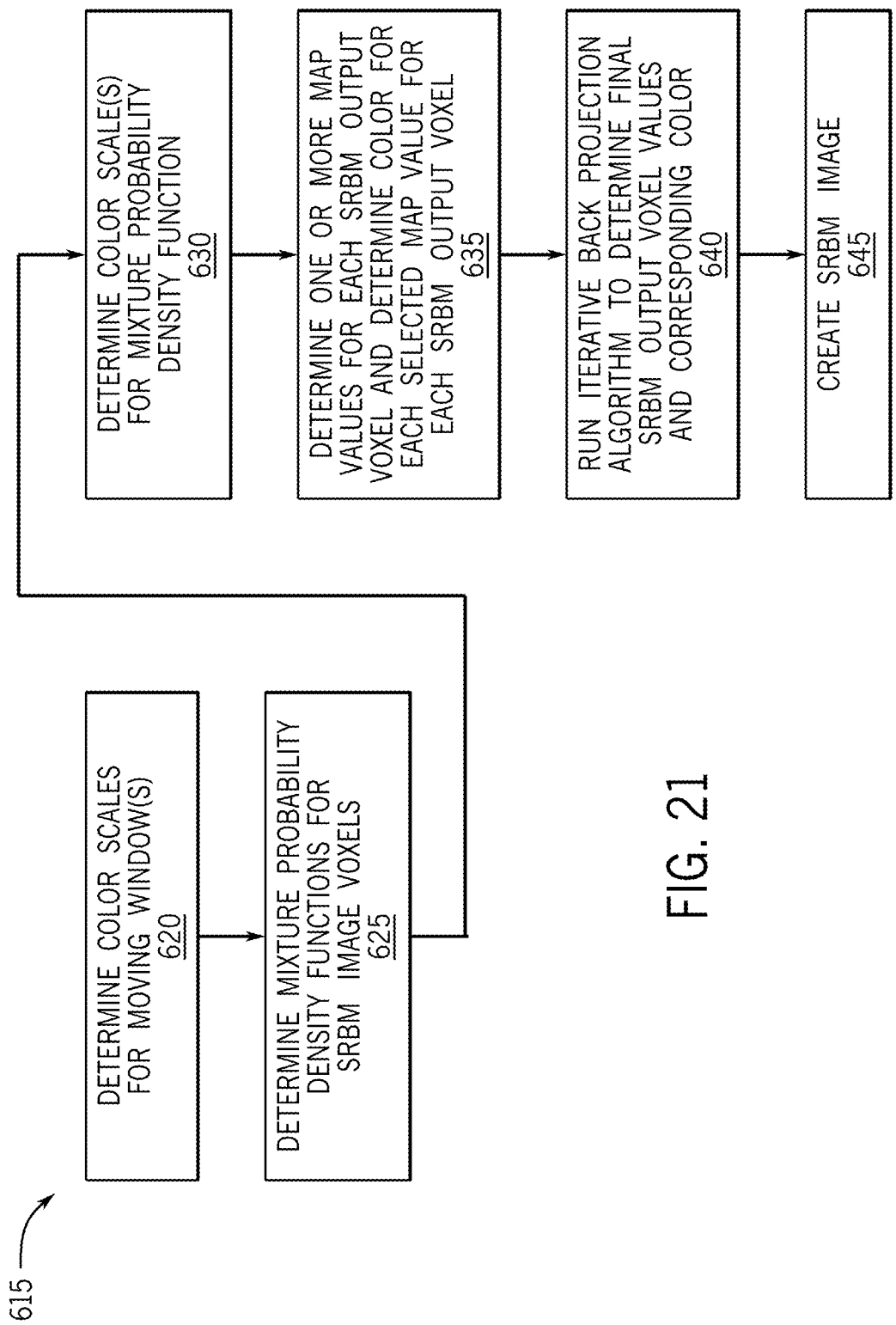
FIG. 21 depicts an example flow diagram outlining an image reconstruction method using a color theory (e.g., complementary color) reconstruction algorithm to obtain the SRBM image, in accordance with an illustrative embodiment.

Turning now to FIG. 21, an example flow chart outlining a process 615 for performing a color theory reconstruction on the final 3D super-resolution voxel grid for obtaining an SRBM image is shown, in accordance with some embodiments of the present disclosure. In particular, the reconstruction algorithm of the process 615 adopts a maximum a posteriori ("MAP") super-resolution algorithm that uses color theory and iterative adjustment.

At operation 620, a color scale is determined for each moving window type, in this example; various moving window shapes are selected. The color scale may be a thresholded color scale (e.g., having a probability threshold required before color is applied) or a non-thresholded color scale (i.e., no required threshold). In some embodiments, a color scale may also be determined for each slice direction. FIG. 22 depicts determining color scales for various moving window types (e.g., different shapes in this example), in accordance with some embodiments. The first moving window shape is a circle; the second is a square; and the third is a triangle. In some embodiments, color scales are selected for moving window shapes from the real color combinations used in artwork. Here the artwork of the impressionist Mary Cassatt is taken as an example. Impressionism is useful for this technique given the use of multiple complementary color schemes in the paintings which result in aesthetic and visually understandable images. The circle moving window is given a red-green color scale from painting "Baby Reaching For An Apple." The square moving window is given a violet-orange color scale based on painting "After The Bath." The triangle moving window is given a yellow-blue color scale based on painting "The Boating Party." Exact color matching is used to select colors, as shown on paintings within the white circles. It is to be understood that the approach of selecting color scales from artwork is for illustration and is not limiting; other approaches can be used to determine appropriate color scales. The use of complementary colors creates a desaturation effect of the color and creates the effect of pushing that space into the background by the human eye, making the resultant images more intuitively understandable for the human user. High probability regions of the image have more pure hue coloring (which has the effect of highlighting these regions by pushing these regions outward from the image), while low probability regions have desaturated colors (which has the effect of blending these regions into the background). The resultant images are thus be more intuitively understandable, as well as aesthetic.

In an embodiment, numeric values are determined across the color scales for each moving window type. In some embodiments, HSB/HSV/HLS numeric combinations are first determined to match colors across the color scales, then the HSB/HSV/HLS colors are converted to numeric combinations in RGB color. HSB/HSV/HLS is a way to define color based on how humans describe it (e.g., "dark reddish-brown"). In an embodiment, hexadecimal codes may be used to convey the numeric combinations. For example, a hex triplet (i.e., a six-digit, three-byte hexadecimal number) can be used to represent colors. HSB/HSV/HLS describes color more intuitively than the RGB color. A color wheel can be used in the HSB/HSV/HLS color model. HSB refers to the color model combining hue, saturation, and brightness, HSV refers to the color model combining hue, saturation, and value, HLS refers to the color model combining hue, lightness, and saturation. Hue is a numeric value that describes the "basic color," which is an angular value on the color wheel. Saturation is a value that describes the "purity" of the color, also known as "chromaticity." For example, a yellow that cannot get any yellower is fully saturated (i.e., 100%). Grey can be added to desaturate a color, or color can be subtracted to leave grey behind to desaturate. Brightness is a value indicating how much black is mixed with the color. Colors are not all perceived as being the same brightness, even when they are at full saturation, so the term can be misleading. A fully saturated yellow at full brightness (S 100%, B 100%) is brighter to the eye than a blue at the same S and B settings. The RGB color model is an additive color model in which red, green, and blue light are added together in various ways to reproduce a broad array of colors. A color in RGB can be represented by a vector (R, G, B). The HSB/HSV/HLS color can be converted to numeric combination (e.g., vector) in the RGB color through techniques well known to people in the art. In this way, color scales are made to correspond to numeric values.

Figure 23:
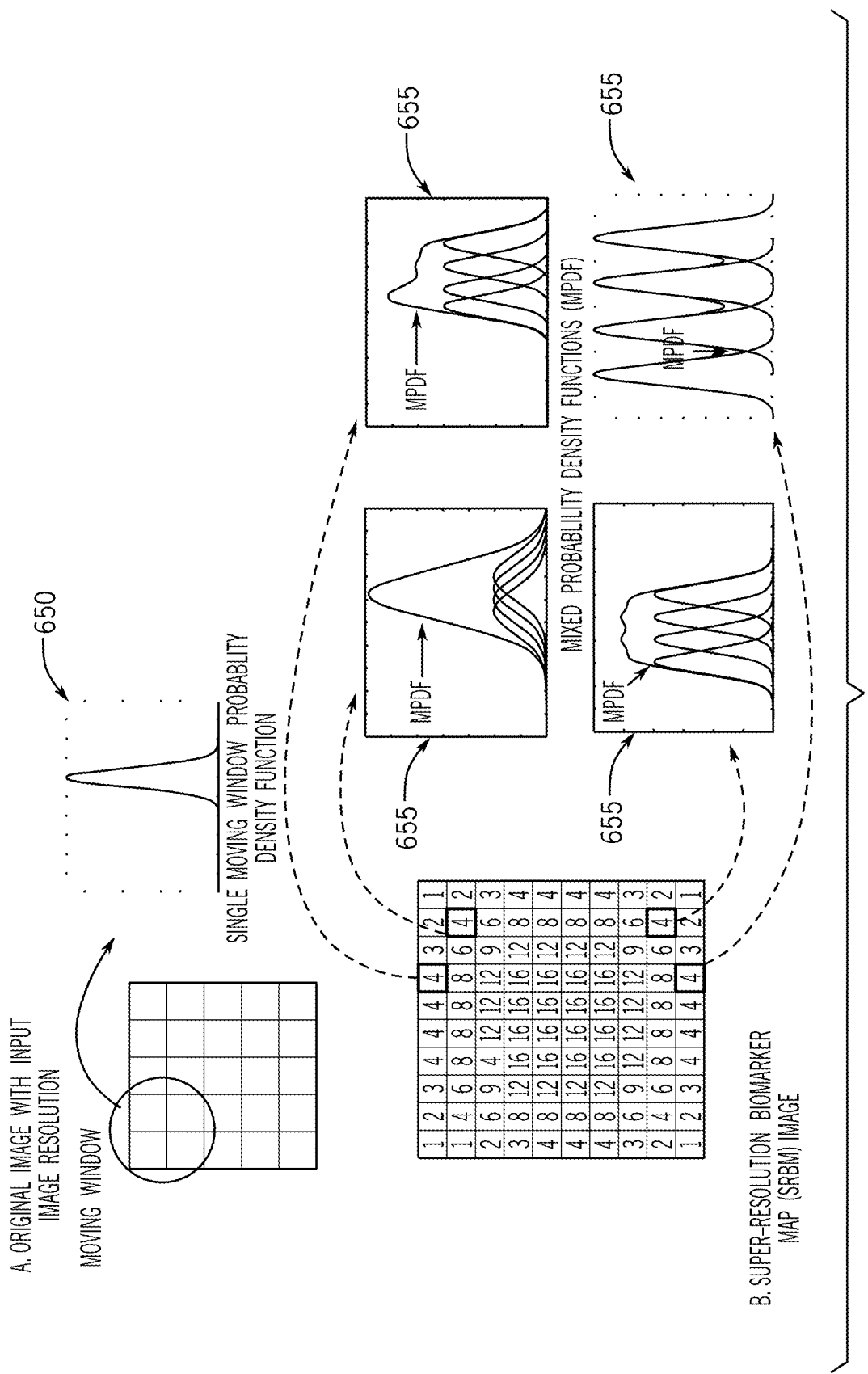
FIG. 23 depicts an example of determining a mixed probability density function for each voxel in the final super-resolution voxel grid, in accordance with an illustrative embodiment.

Upon identifying the color scales, at operation 620, a mixture probability density function is determined for each voxel present within the final SRBM image ("output SRBM image voxel") that is created at operation 625. FIG. 23 shows an example of determining the mixture probability density function for each output SRBM image voxel. At A, a probability density function 650 for each moving window reading of the original 2D (or 3D) matrix is defined. In some embodiments, the probability density function is defined as a normal Gaussian function. The standard deviation of the Gaussian function may be assigned based on expected measurement error, for example, 10%. At B, a mixed probability density function 655 is defined for each voxel of the output SRBM image. In some embodiments, the mixed probability density function is defined as a combination of the individual probability density functions of each individual moving window reading that covers the voxel. For example, as shown in FIG. 23 with the input image resolution of the original image, the moving window has a circular shape that encompasses four complete voxels. Accordingly, each voxel is covered by four moving window readings. The mixed probability density function for each voxel is the combination of the four moving window readings that cover the voxel. In some embodiments, a Gaussian mixture model can be applied to the various moving window readings in order to determine the mixed probability density function.

It is to be understood that Gaussian model is simply one example of obtaining the probability density functions. In other embodiments, other suitable models and methods may be used for obtaining the probability density functions described above.

Figure 24A:
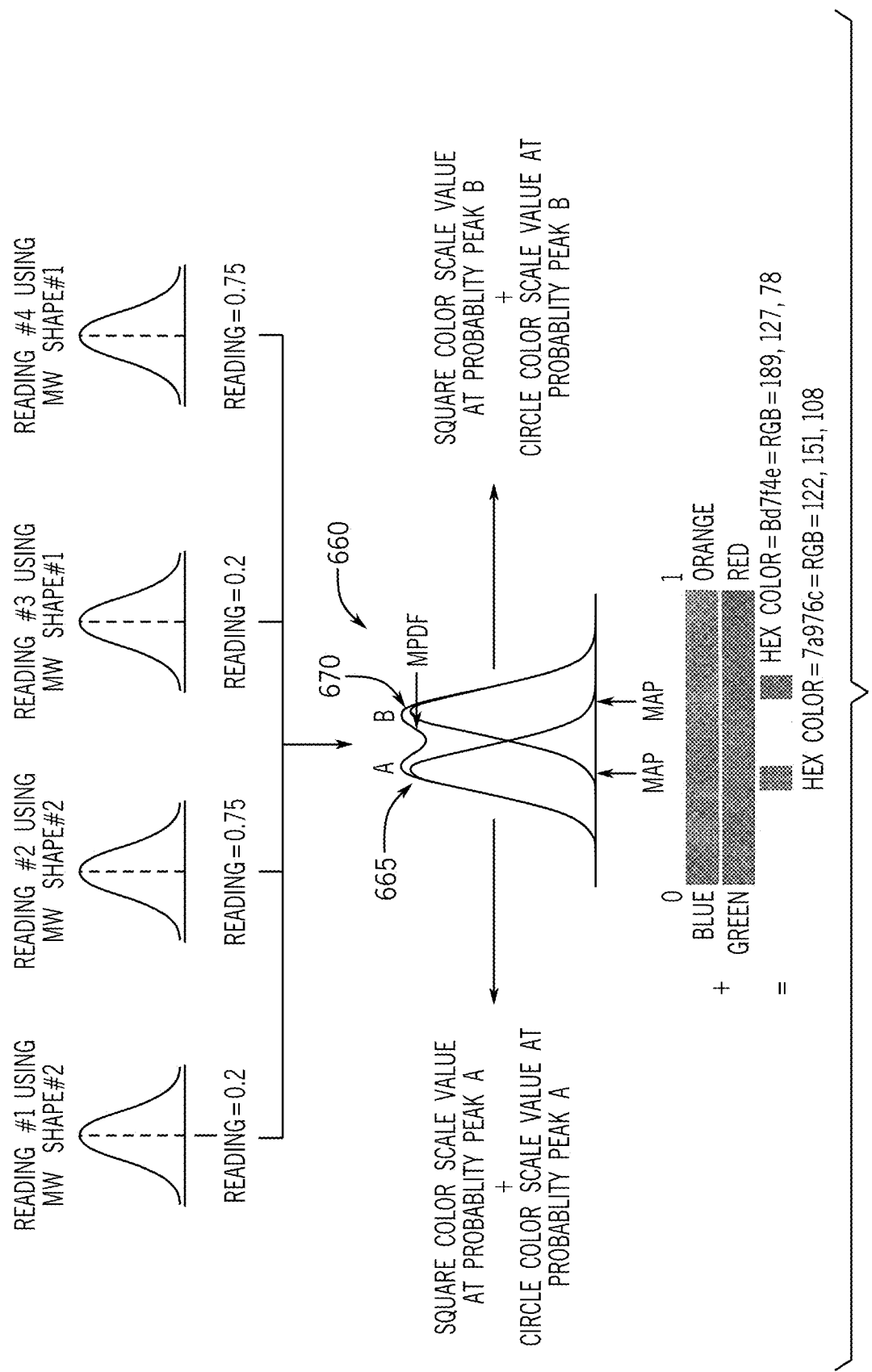
FIG. 24A depicts an example of determining a mixed color scale using moving window readings of different moving window types, in accordance with an illustrative embodiment.
Figure 24B:
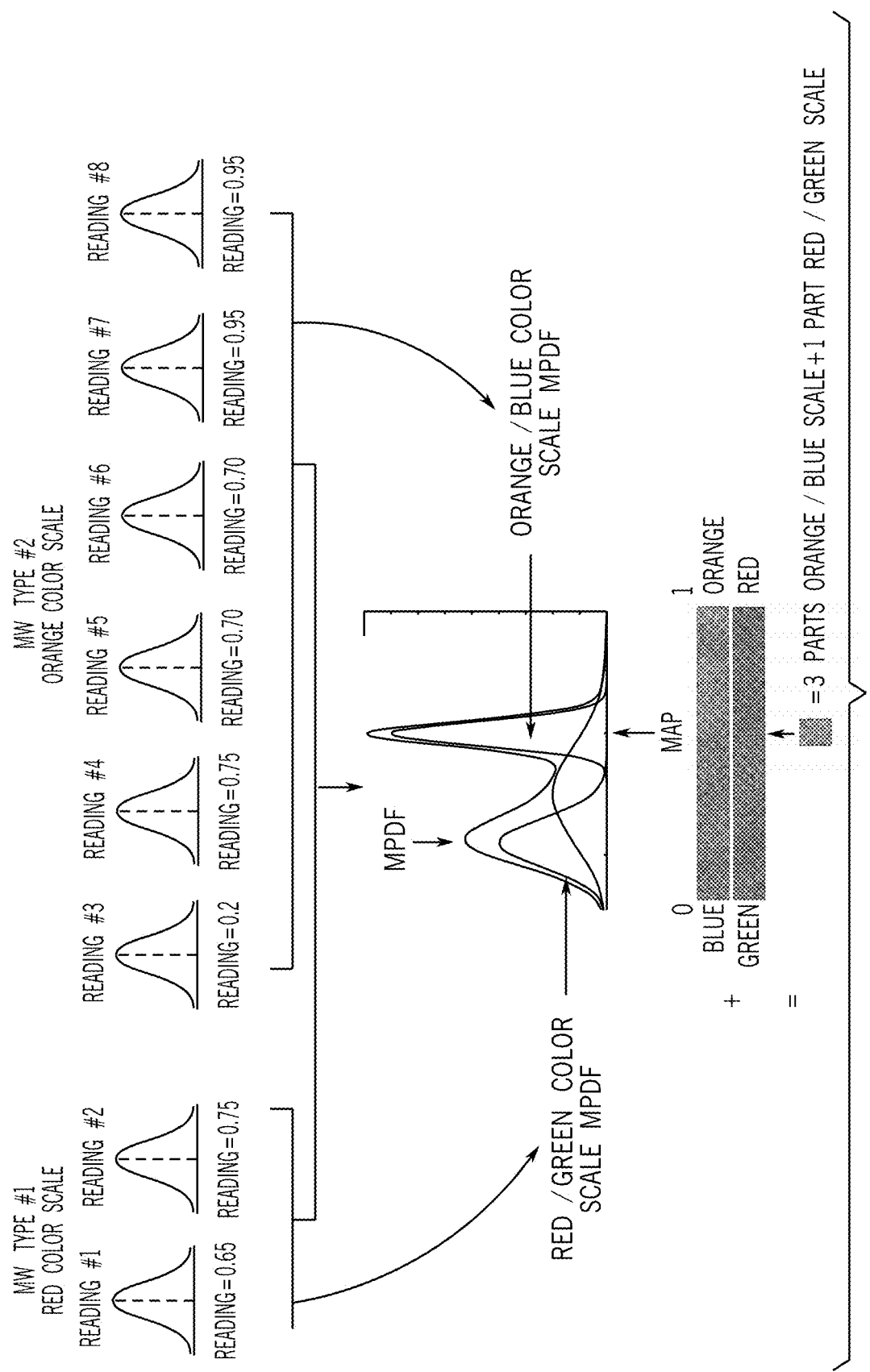
FIG. 24B depicts an example of determining a mixed color scale using weighted moving window readings for two moving window types, in accordance with an illustrative embodiment.
Figure 25:
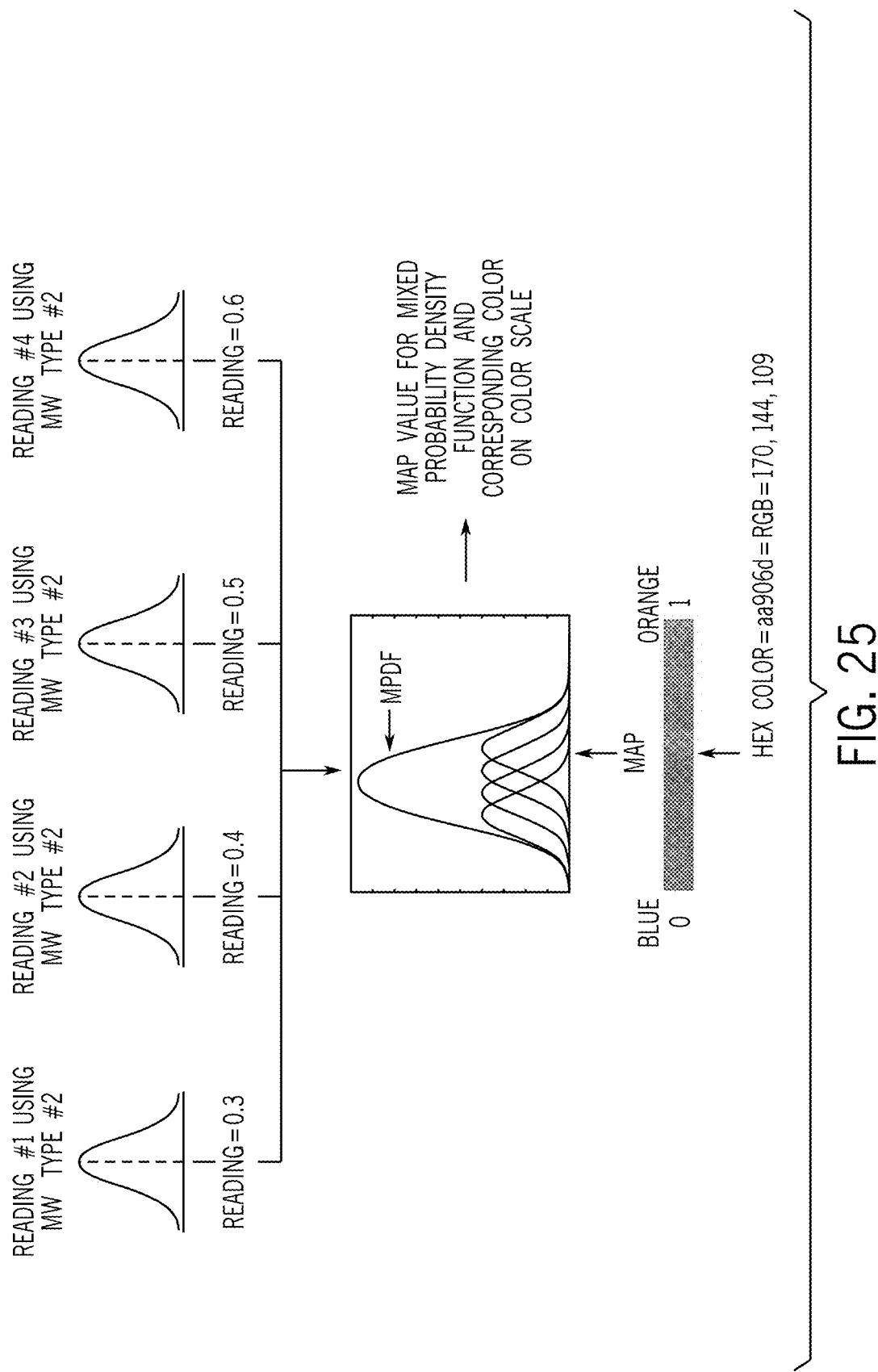
FIG. 25 depicts an example of determining a single color scale using moving window readings of the same moving window type, in accordance with an illustrative embodiment.

At operation 630, a complementary (also referred to herein as "mixed") color scale is determined for the mixed probability density function of each voxel in the SRBM image. In some embodiments, the mixed probability density function is the combination of moving window readings of the same moving window shape. FIGS. 24A-C illustrate determining a complementary color scale using moving window readings of the same moving window shape, for example, a square shape. In still other embodiments, a complementary color scale may not be required or used. FIG. 25 illustrates an example of a non-complementary color scale. As discussed above with reference to FIG. 23, a voxel of the SRBM image may be covered by multiple moving window readings, depending upon the input image resolution of the original matrix. In FIGS. 24A and 25, the four moving window readings that cover the voxel have the readings: 0.2, 0.75, 0.2, 0.75, and 0.3, 0.4, 0.5, and 0.6, respectively. Color scales may be made to correspond to numeric values in the operation 630. Thus, the moving window readings and the probability density functions (e.g., the normal Gaussian function) may be represented along the color scale. Accordingly, the mixed probability density function, which is the combination of the moving window readings that cover the voxel, may also be represented along the color scale. The y-axis of the mixture probability density graph represents the probability that a given moving window reading is a true measure. The x-axis of the mixture probability density graph represents the moving window readings which are probabilities in the case output moving window readings using a MLCA. Alternately, the output moving window values may be parameter map values when the convolution algorithm is instead a parameter map operation. The output may be binary with a value and standard deviation designated for each binary outcome, such as "yes" or "no" outputs; for example, in this case, "yes" and "no" outputs may be assigned a certain separate values, such as 0.2 and 0.8 with standard deviations, and assigned color along the chosen color scale.

In some embodiments, the mixed probability density function is the combination of moving window readings of different moving window shapes, including for example, different sizes, directions, 2D versus 3D, and step size created from the same or different set of initial imaging data, etc. FIG. 24A illustrates an example determining mixed color scale using moving window readings of two moving window shapes, e.g., a square and a triangle. There are two moving window readings for the square moving window: 0.2 and 0.75, and two moving window readings for the triangle moving window: 0.2 and 0.75. As discussed in the operation 620, different moving window shapes may correspond to different color scales. Thus, the moving window readings and the probability density functions (e.g., the normal Gaussian function) in FIG. 24A are represented along two color scales. Each of the two peaks in the mixed probability density function, 0.2 and 0.75, correspond to two different colors in the different color scales. The combined colors can be determined by multiplying the RGB codes for each component color from the different color scales. In particular, for the peak 0.2, the combined color is the RGB value for the color at peak 0.2 in the color scale corresponding to the square moving window by the RGB value for the color at peak 0.2 in the color scale corresponding to the triangle moving window. For the peak 0.75, the combined color is the RGB value for the color at peak 0.75 in the color scale corresponding to the square moving window by the RGB value for the color at peak 0.75 in the color scale corresponding to the triangle moving window.

In an embodiment, a weighting function may be applied to compensate for different relative strengths of the moving window reading values for the first moving window compared to moving window reading values for the second moving window. In an example, a first Gaussian mixture model is created from the combination of moving window readings for the first moving window and a second Gaussian mixture model is created from the combination of moving window readings for the second moving window. Respective color scales are selected for the first and second Gaussian mixture models, respectively. At a desired MAP value, the overall output color would be determined based on a combination of the respective color scales after appropriately weighting the respective color scales based on their relative strength. FIG. 24B illustrates determination of a mixed color scale using weighted moving window readings for two moving window shapes in accordance with an illustrative embodiment. FIG. 24B shows two moving window readings (e.g., reading #1 and #2) for moving window shape #1 and six moving window readings (e.g., readings #3-#8) for moving window shape #2. A red-green color scale is assigned to the moving window #1 readings and an orange-blue color scale is assigned to the moving window #2 readings. Respective Gaussian mixture models are created from the moving window readings and are shown with peaks about a MAP value. Six moving window type #2 readings are recorded and two moving window reading are recorded for moving window #1, thus moving window type #2 is weighted three times higher than moving window type #1. As such, when creating the combined (or mixed) color scale between the orange-blue and red-green color scales, the orange color scale has a three times greater weight than the red-green color scale. In other words, for every three parts of the orange-blue color scale applied to the combined color scale one part of the red-green color scale is used.

At operation 635, the MAP value is determined for each output voxel based on the determined mixed probability density functions for the respective output voxel. As used herein, the MAP value refers to the most probable values or values corresponding to peaks of mixed probability density functions. For example, for mixed probability density function 660 in FIG. 24A, a first MAP value 665 corresponds to point A of the mixed probability density function. MAP solutions may have non-unique solutions. For example, FIG. 24A depicts two MAP values, the first MAP value 665 and a second MAP value 670, which corresponds to point B of the mixed probability density function 660. MAP values may similarly be obtained for the mixed probability density functions of FIGS. 24B and 25.

Figure 26:
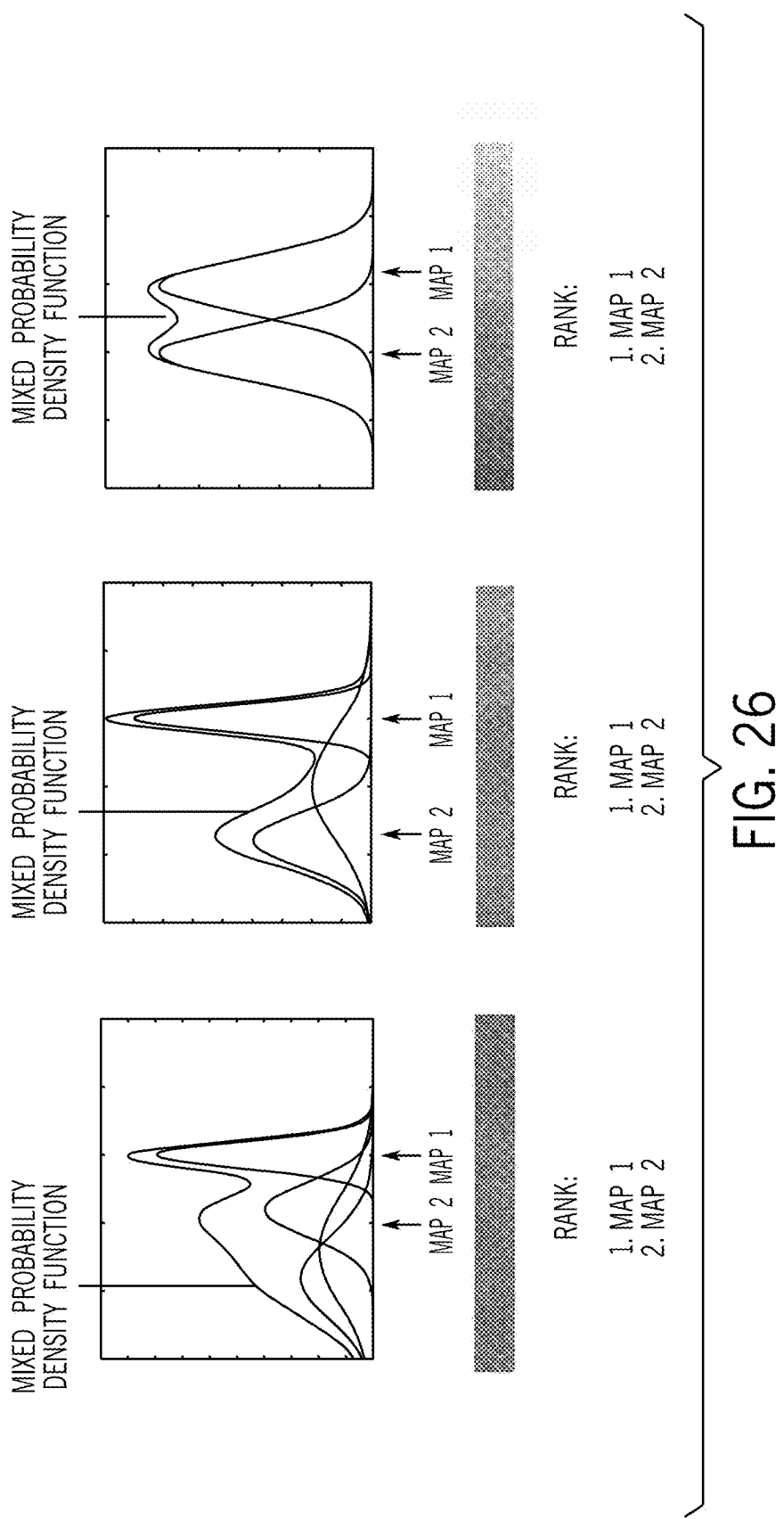
FIG. 26 depicts examples of various mixture probability density functions in which the MAP values have been determined and ranked, in accordance with an illustrative embodiment.

At operation 640, final SRBM output voxel values are determined based on the MAP values for each respective output voxel. In some embodiments, an iterative back projection method may be used such that the MAP values for each output voxel may be ranked and the highest ranked MAP value may be selected for the final SRBM output voxel values. For example, for each voxel of the SRBM image, a vector may be determined which includes a ranking of the top MAP values. FIG. 26 shows first, second, and third mixed probability density functions in which MAP values have been determined (e.g., values corresponding to the peaks) and ranked. In situations where the highest ranked MAP value of a particular mixed probability density function does not satisfy an optional probability threshold or is not unique for a given voxel, a best combination of MAP peak values that minimizes errors between the MAP values and the "true" moving window readings may be used for the final SRBM output voxel value. An example of ranking MAP values and applying the iterative back projection is described further below.

At operation 645, the output SRBM image is created based on a final selected MAP value of each voxel. In particular, the RGB color vector (e.g., a color) corresponding to the MAP value is applied to each voxel in the SRBM image. In an embodiment, a thresholded color scale is used such that a color is assigned to a voxel only if a MAP value exceeds a given threshold, e.g., over 50%. RGB codes may be displayed on high resolution displays such that each R, G, and B value is included in separate image display voxels using standard technique for high definition displays (e.g., high definition televisions).

Figure 27:
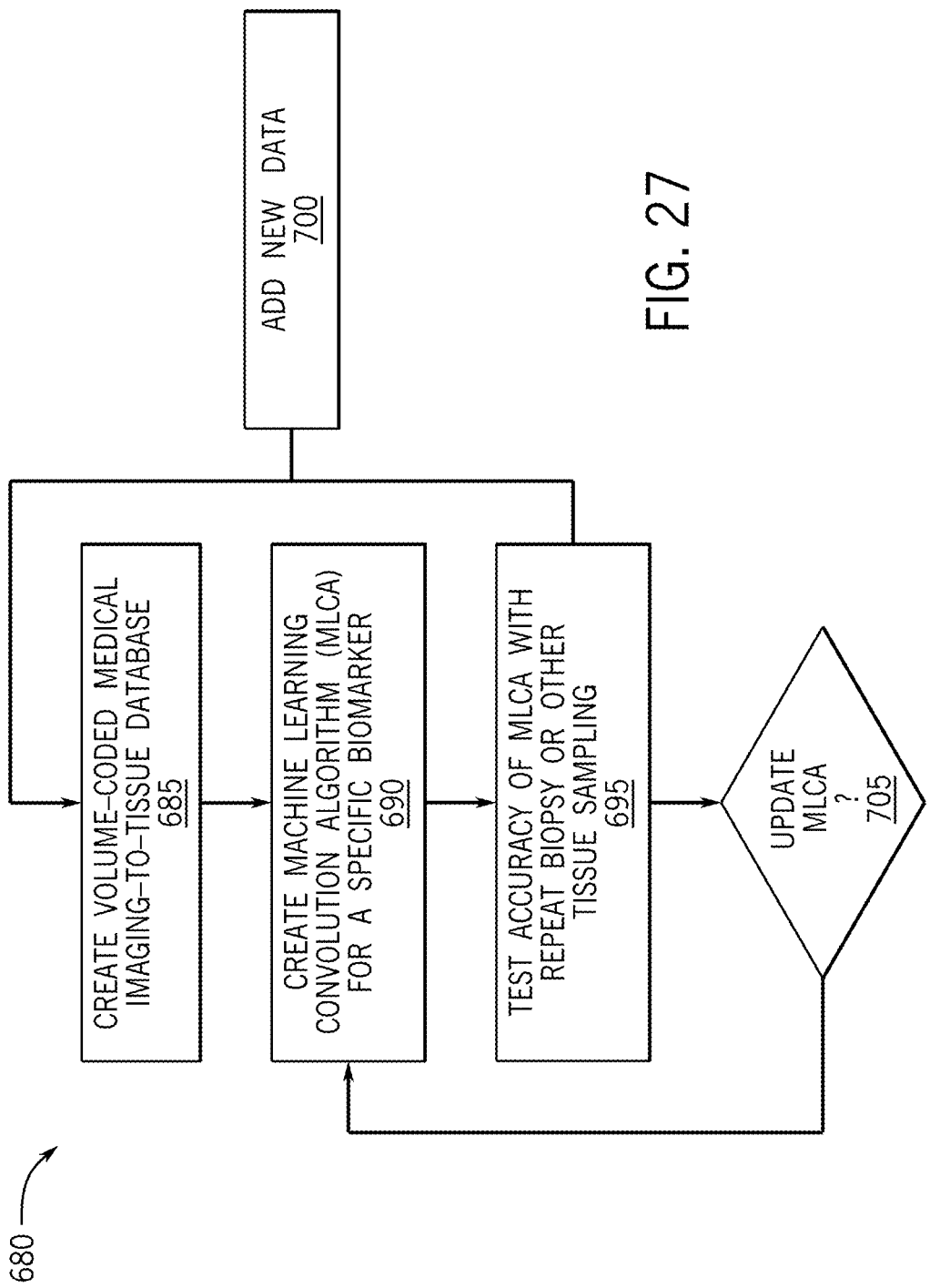
FIG. 27 depicts an example flow diagram outlining operations for creating and updating a volume-coded medical imaging-to-tissue database, in accordance with an illustrative embodiment.

Turning now to FIG. 27, an example flow chart outlining a process 680 for creating and updating a volume-coded precision database is shown, in accordance with some embodiments. The volume-coded precision database is a medical imaging-to-tissue database. At operation 685, an initial volume-coded medical imaging-to-tissue database is created. The database includes volume-coded imaging-to-tissue data, which may be used to develop big data datasets for characterizing tumor biomarker heterogeneity. The data stored in the database may include both imaging data as well as clinical data (e.g., age, gender, blood test results, other tumor blood markers, or any other clinical trial results). The volume-coded imaging-to-tissue data includes imaging information (and other data) for tissue that corresponds to a specific volume of the tissue with which the imaging information is associated. By including the specific volume of the tissue in the database, the optimal moving window size and shape may be more easily determined and thus facilitate improved image analysis.

At operation 690, a machine learning convolution algorithm (MLCA) is created for use in producing a 2D Matrix, as discussed above, and the MLCA is specific for each selected biomarker of interest. In an embodiment, the MLCA uses a precision database to output probability values for the existence of a biomarker within various voxels corresponding to a medical image within a defined moving window. 2D matrices may be produced for various tissue images using the MLCA. At operation 695, the accuracy of the MLCA for a specific biomarker may be tested by comparing the 2D matrices to images of biopsies or other sampled tissue for which a biomarker is known. Based on these comparisons, additional data may be added to the volume-coded medical imaging-to-tissue database at operation 700. In addition, based on these comparisons, the MLCA may be updated or revised as necessary at operation 705.

Figure 28:
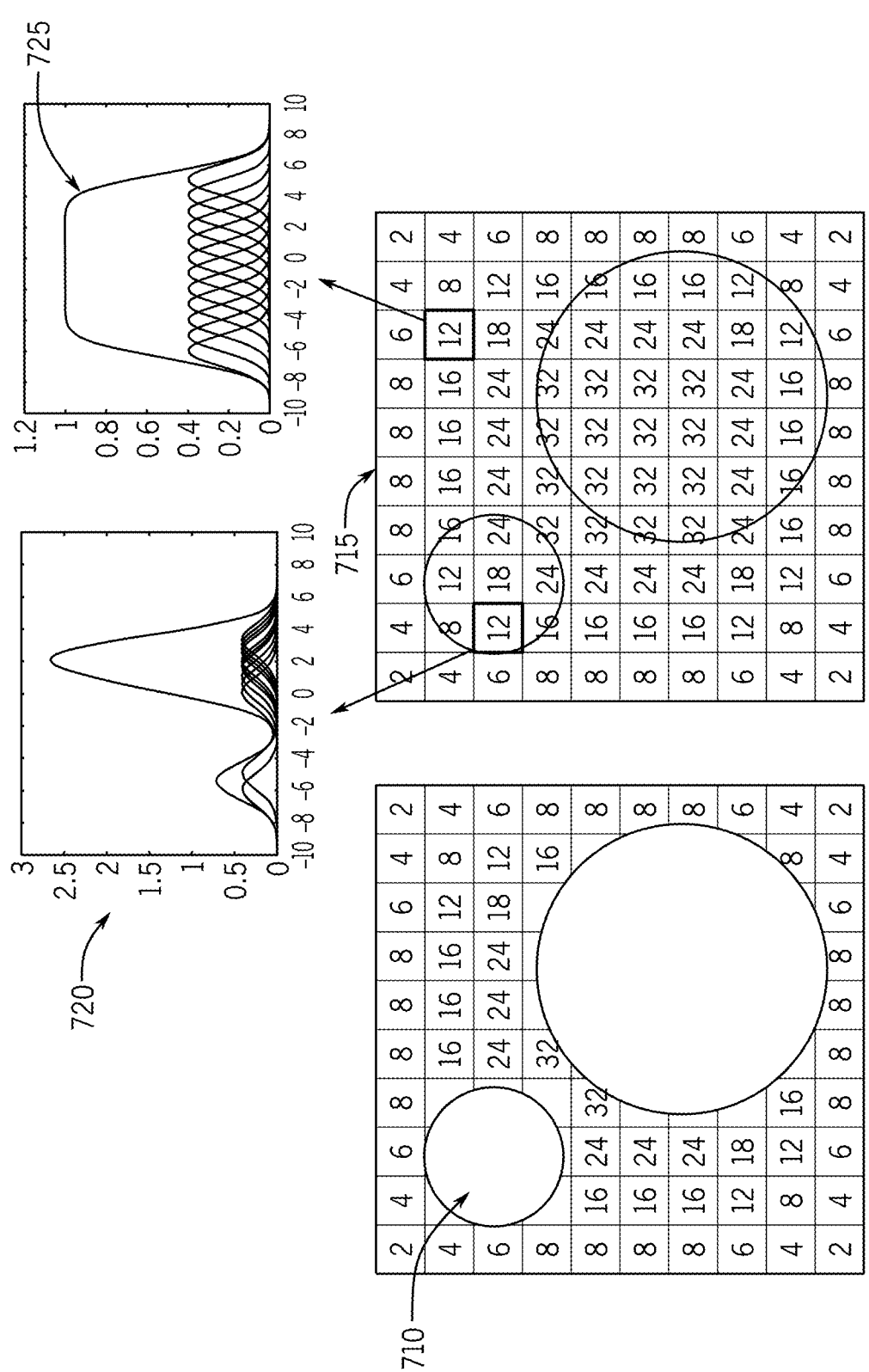
FIG. 28 depicts example mixture probability density functions that represent biomarkers indicating an edge of a lesion, in accordance with an illustrative embodiment.

The method and images discussed herein also provide improved edge detection that minimizes the impact of partial volume errors. FIG. 28 shows example probability density functions that represent biomarkers indicating an edge of a lesion in accordance with an illustrative embodiment. A lesion 710 is shown in FIG. 28 having an output voxel highlighted with a value of "12" in grid 715. An example probability density function 720 is shown for the highlighted output voxel for the lesion 710. As indicated in FIG. 28, separation between the lesion and non-lesion (for example, noise) areas of the image are clearly delineated. The distinction is even clearer when compared to an example probability density function 725 for a sample non-lesion (e.g., noise area of the image).

Figure 30:
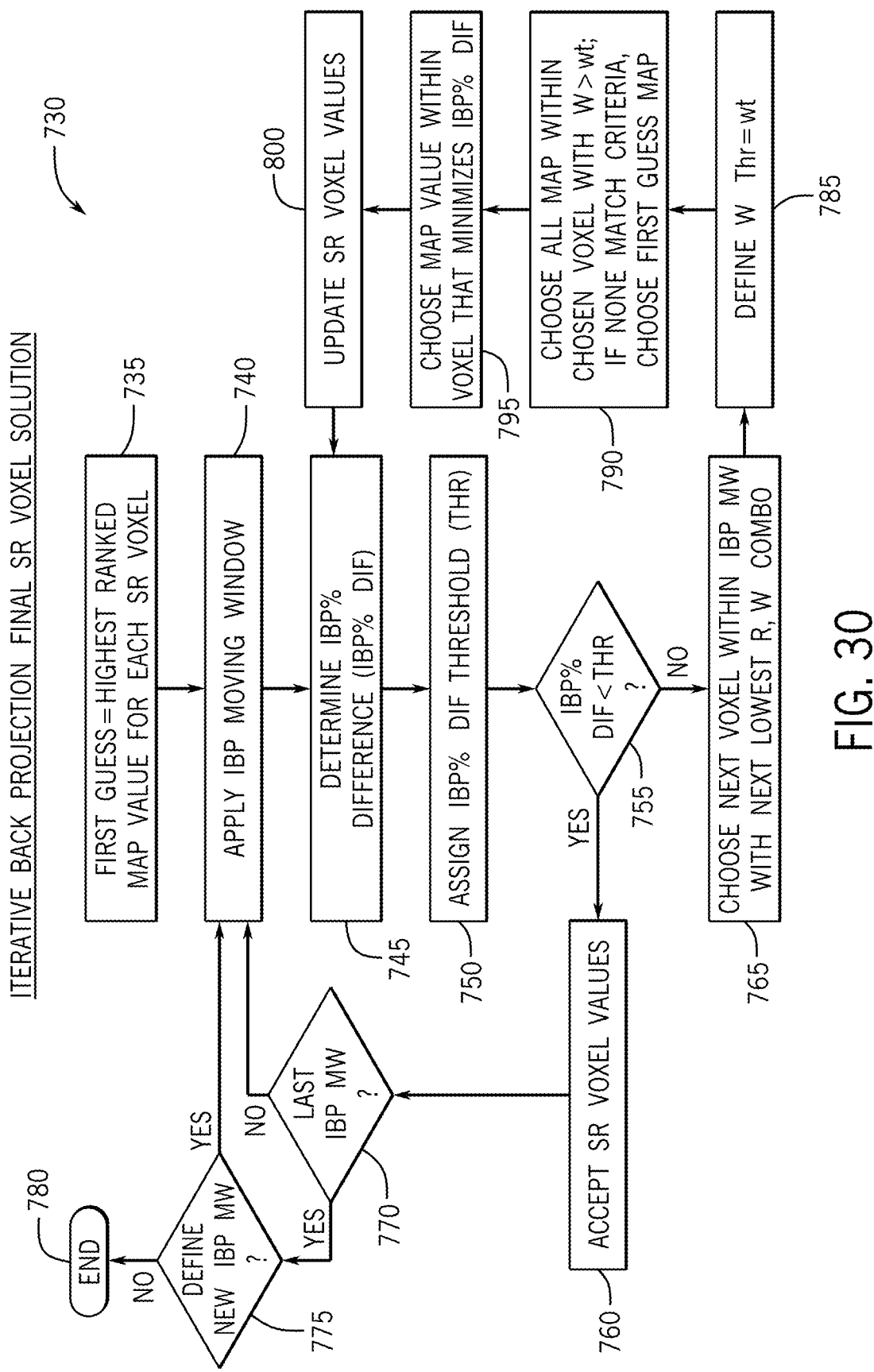
FIG. 30 is an example flowchart outlining an iterative back projection method on the final super-resolution voxel grid, in accordance with an illustrative embodiment.
Figure 31:
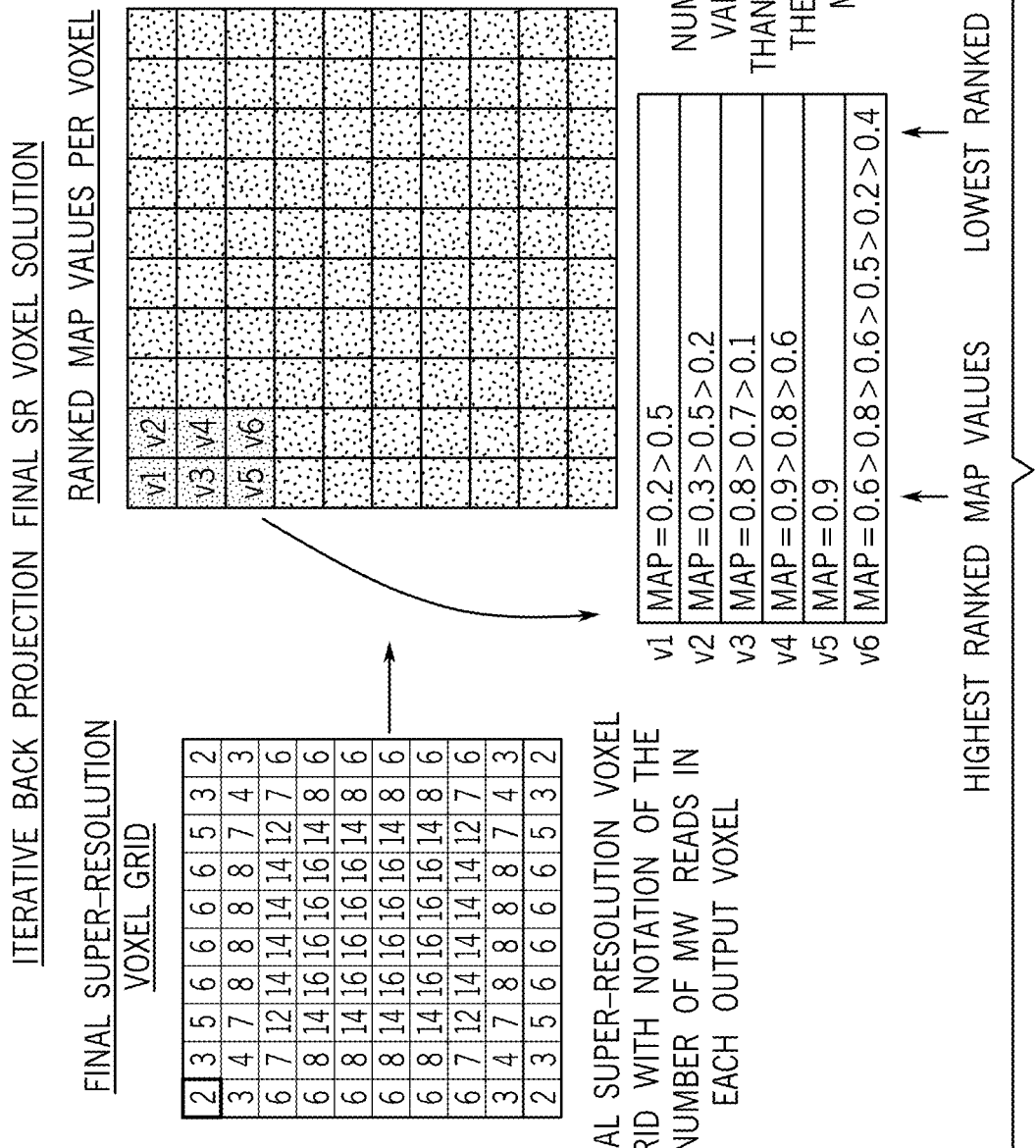
FIG. 31 depicts an example of ranking MAP values using the iterative back projection, in accordance with an illustrative embodiment.
Figure 34:
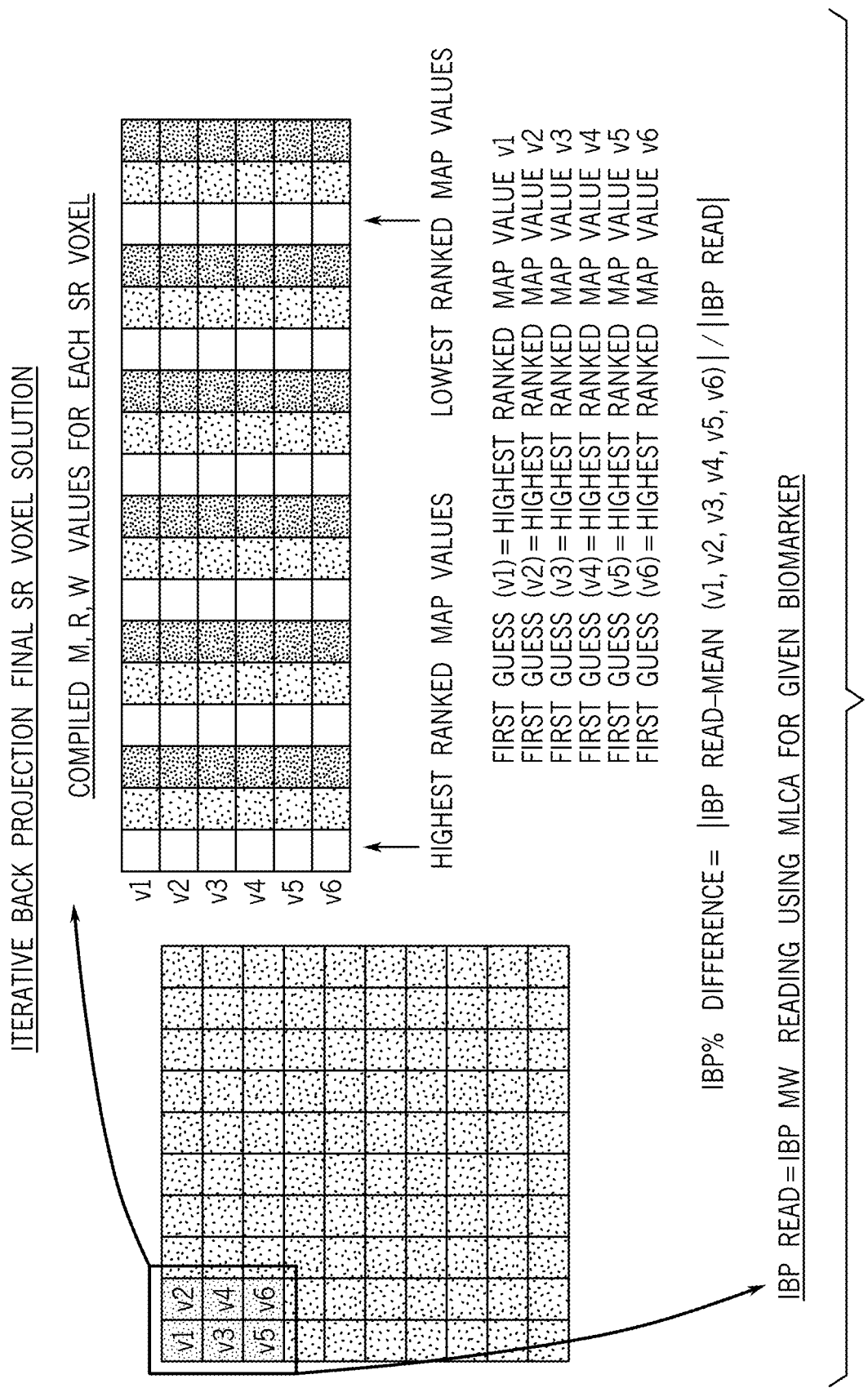
FIG. 34 depicts an example of computing an iterative back projection difference, in accordance with an illustrative embodiment.

Referring now to FIGS. 30-34, an example of an iterative back projection ("IBP") method is described. Specifically, FIG. 30 is an example flowchart that outlines a process 730 for iterative back projection, while FIGS. 31-34 provide details regarding specific operations within the process 730, as discussed below. Referring specifically to FIG. 30, at operation 735, a first guess of MAP values is made. The first guess, as shown in FIG. 34, assigns voxel values as highest MAP values to all super resolution voxels in an output super-resolution grid. At operation 740, a first IBP moving window is applied, as shown in FIG. 31. At operation 745, an IBP percent difference is determined, as shown in FIG. 34. The IBO percent difference is determined by subtracting the read output value of the moving window and a mean of all readings from that step of the moving window, and dividing the difference with the read output value.

Figure 32:
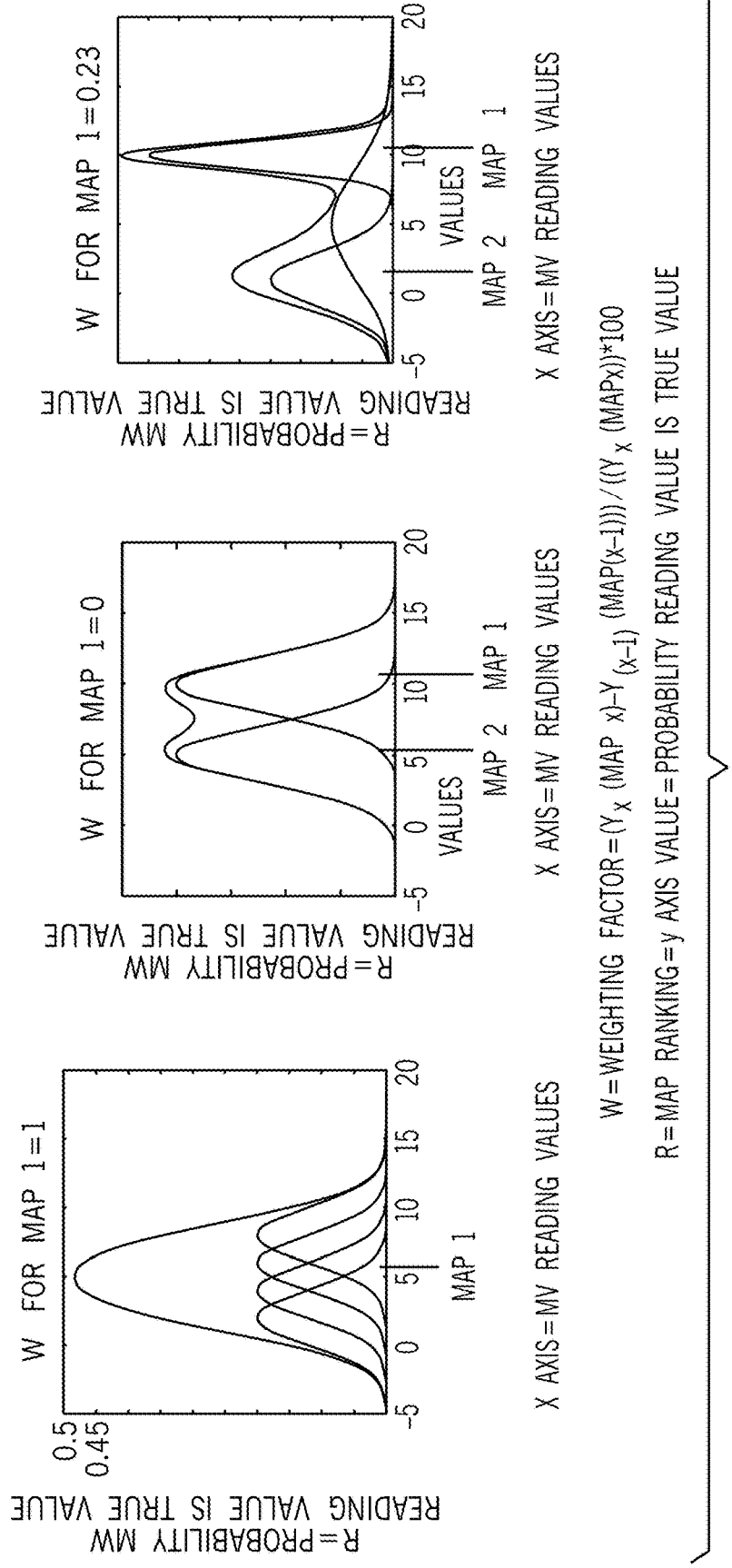
FIG. 32 depicts example for determining a weighting factor for use with the iterative back projection, in accordance with an illustrative embodiment.

At operations 750 and 755, the IBP percent difference is compared with a user defined threshold. If the IBP percent difference is less than the user defined threshold, at operation 760, the first guess values from the operation 735 are accepted. In some embodiments, the user defined threshold is ten percent. In other embodiments, other values of the user defined threshold may be used. If the IBP percent difference is greater than the user defined threshold, at operation 765, among all first guess voxel values (v1-v6), the MAP value (M) with a lowest map ranking value, R, is chosen. For example, as shown in FIGS. 31-34, v1 is chosen with a MAP=0.2 and a rank R=0.3. A weighting factor, as shown in FIG. 32 is also assigned. In the case where more than one voxel has a given lowest ranking value, the voxel with a lowest weighting factor is chosen.

From the operation 760, the moving window is moved to the next step, and the process 730 is repeated. Specifically, at operation 770, if all of the moving window output values have been read and analyzed, the process 730 moves to operation 775, where a decision is made whether a new moving window (e.g., with parameters different from the moving window of the operation 740) is needed. If yes, the process 730 returns to the operation 740 and the new moving window is defined. If no, the process 730 ends at operation 780.

On the other hand, if the process 730 is at the operation 765, the weighting factor is computed and the voxel having the lowest ranking value and the lowest weighting factor is selected. At operations 785 and 790, all MAP values within the given voxel with W>a chosen threshold=a weight factor, wt, are chosen. If none of the voxels meet the criteria, then the first guess values from the operation 735 are selected.

At operations 795 and 800, the next highest ranked MAP value for v1 (e.g., v1 is switched to MAP=0.5) and the IBP percent difference is computed again, as outlined above at the operation 745. The process 730 repeats through all MAP values in a given voxel to determine MAP value that minimizes IBP percent difference. When the IBP percent difference is less than the user defined threshold at the operation 755, the process switches and super resolution voxel values are accepted. The whole cycle of moving window defined movement is repeated until all voxels are chosen Thus, by using IBP, all MW reads for a given biomarker question are collated within each super resolution moving window reads for a given biomarker question, ranked MAP values are determined for each super resolution voxel in the grid, a rank value for each MAP is determined as the y axis probability (e.g., between 0 and 1) that the moving window reading value is the true value, a weighting factor is assigned to each MAP as the relative R value compared to the next highest ranked MAP, an IBP moving window is defined as a square or rectangle that encompasses a defined number of super resolution voxels and moves in a defined fashion and does not need to overlap, IBP moving window is determined for a first position, and a user defined threshold (thr) is defined as a percent, where a low threshold means the voxel estimate value is close to the "true" IBP MW read, and IBP percent difference of zero means the values match.

Figure 35:
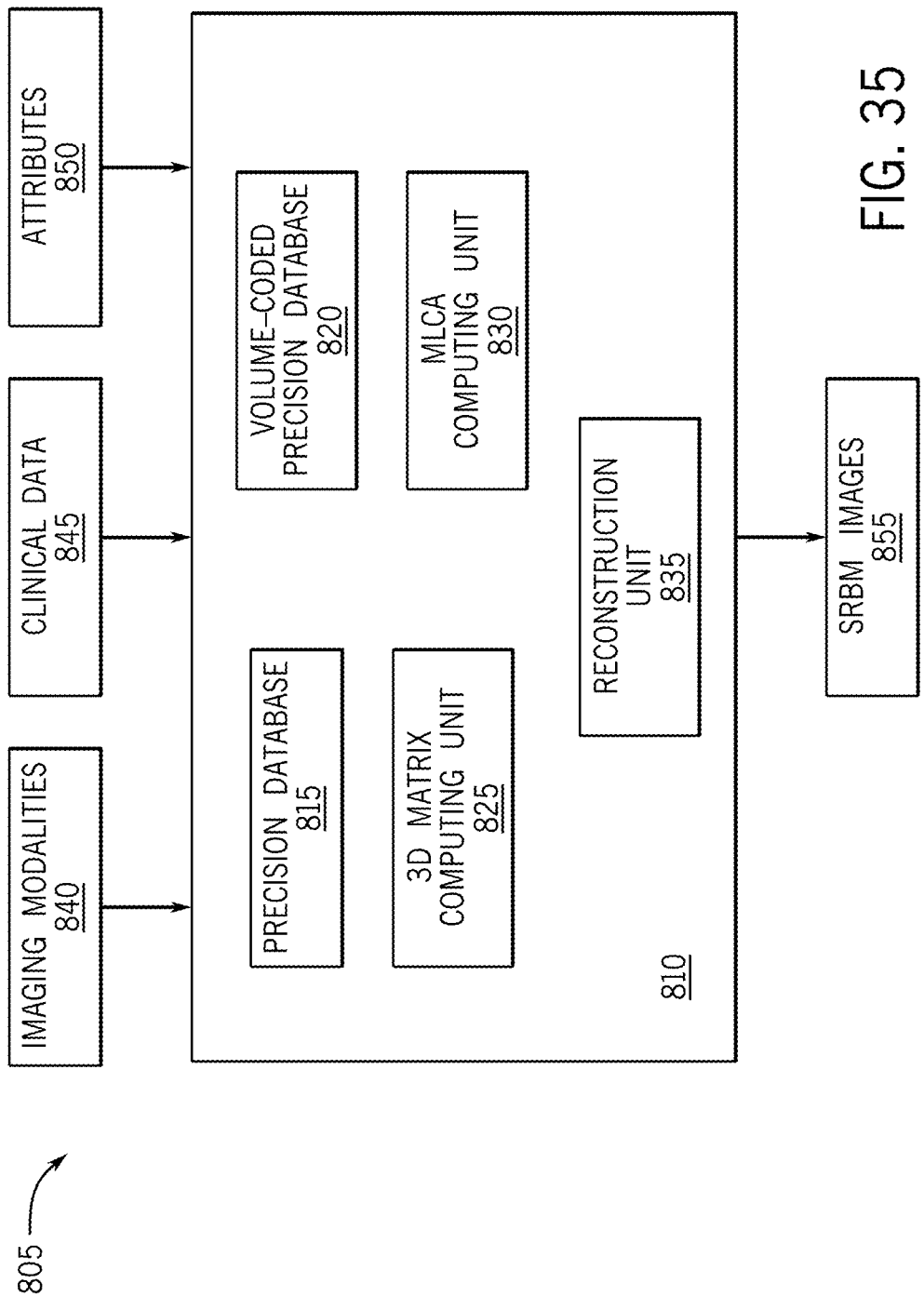
FIG. 35 depicts a block diagram of an image computing system, in accordance with an illustrative embodiment.

Turning now to FIG. 35, a block diagram of an image computing system 805 is shown, in accordance with at least some embodiments of the present disclosure. The image computing system 805 may be used for generating the SRBM images, as discussed above. The image computing system 805 includes an image computing unit 810 having a precision database 815, a volume-coded precision database 820, a 3D matrix computing unit 825, an MLCA computing unit 830, and a reconstruction unit 835. In alternative embodiments, the specific sub-units and databases of image computing unit 810 may be separate devices or components that are communicatively coupled. The precision database 815 and the volume-coded precision database 820 are configured to store image data, as discussed above. To that end, the image computing unit 810 may be connected to one more imaging modalities 840 to receive image data corresponding to those modalities. The imaging modalities 840 may also provide image data for the sample that is to be analyzed and for which the SRBM image is to be generated. In some embodiments, instead of receiving image data directly from the imaging modalities 840, the image computing unit 810 may be connected to another computing unit, which receives the image data from the imaging modalities, and provides that data to the image computing unit.

As also discussed above, the precision database 815 and the volume-coded precision database 820 stores clinical data 845 as well. The clinical data 845 may be input into the image computing unit 810 by a user. In addition, various attributes 850 (e.g., parameters and parameter maps of interest, moving window parameters, various thresholds, and any other user defined settings) are also input into the image computing unit 810. The image computing unit 810 may also include the 3D matrix computing unit 825 that is configured to compute 3D matrices, the MLCA computing unit 830, which transforms the 3D matrices into 2D matrices, and a reconstruction unit 835 to convert the 2D matrices into SRBM images, as discussed above. The image computing unit 810 may output SRBM images 855.

The image computing unit 810 and the units therein may include one or more processing units configured to execute instructions. The instructions may be carried out by a special purpose computer, logic circuits, or hardware circuits. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The image computing unit 810 and the units therein, thus, execute an instruction, meaning that they perform the operations called for by that instruction.

The processing units may be operably coupled to the precision database 815 and the volume-coded precision database 820 to receive, send, and process information for generating the SRBM images 855. The image computing unit 810 and the units therein may retrieve a set of instructions from a memory unit and may include a permanent memory device like a read only memory (ROM) device. The image computing unit 810 and the units therein copy the instructions in an executable form to a temporary memory device that is generally some form of random access memory (RAM). Further, the image computing unit 810 and the units therein may include a single stand-alone processing unit, or a plurality of processing units that use the same or different processing technology.

With respect to the precision database 815 and the volume-coded precision database 820, those databases may be configured as one or more storage units having a variety of types of memory devices. For example, in some embodiments, one or both of the precision database 815 and the volume-coded precision database 820 may include, but not limited to, any type of RAM, ROM, flash memory, magnetic storage devices (e.g., hard disk, floppy disk, magnetic strips, etc.), optical disks (e.g., compact disk (CD), digital versatile disk (DVD), etc.), smart cards, solid state devices, etc. The SRBM images 855 may be provided on an output unit, which may be any of a variety of output interfaces, such as printer, color display, a cathode-ray tube (CRT), a liquid crystal display (LCD), a plasma display, an organic light-emitting diode (OLED) display, etc. Likewise, information may be entered into the image computing unit 810 using any of a variety of unit mechanisms including, for example, keyboard, joystick, mouse, voice, etc.

Furthermore, only certain aspects and components of the image computing system 805 are shown herein. In other embodiments, additional, fewer, or different components may be provided within the image computing system 805.

Thus, the present disclosure provides a system and method that includes identifying aggregates of features using classifiers to identify biomarkers within tissues, including cancer tissues, using a precision database having volume-coded imaging-to-tissue data. The method involves the application of a super-resolution algorithm specially adapted for use in medical images, and specifically magnetic resonance imaging (MM), which minimizes the impact of partial volume errors. The method determines probability values for each relevant super-resolution voxel for each desired biomarker, as well as each desired parameter measure or original signal. In this way, innumerable points of output metadata (up to 10, 1000, 10000 data points) can be collated for each individual voxel within the SRBM.

In an embodiment, a super-resolution biomarker map (SRBM) image is formed for facilitating the analysis of imaging data for imaged tissue of a patient. The SRBM image may be used as a clinical decision support tool to characterize volumes of tissue and provide probabilistic values to determine a likelihood that a biomarker is present in the imaged tissue. Accordingly, the SRBM image may help answer various clinical questions regarding the imaged tissue of the patient. For example, the SRBM image may facilitate the identification of cancer cells, the tracking of tumor response to treatment, the tracking of tumor progression, etc. In an embodiment, the SRBM image is created from a convolution of processed imaging data and data from a precision database or precision big data population database. The imaging data is processed using two and three dimensional matrices. The imaging data may be derived from any imaging technique known to those of skill in the art including, but not limited to, MRI, CT, PET, ultrasound, etc.

It is to be understood that although the present disclosure has been discussed with respect to cancer imaging, the present disclosure may be applied for obtaining imaging for other diseases as well. Likewise, the present disclosure may be applicable to non-medical applications, particularly where detailed super-resolution imagery is needed or desired to be obtained.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
    receiving, by an image computing unit, image data from a sample, wherein the image data corresponds to two or more image datasets, and wherein each of the image datasets comprises a plurality of images;
    receiving selection, by the image computing unit, of at least two image datasets from the two or more image datasets;
    creating, by the image computing unit, three-dimensional (3D) matrices from each of the at least two image datasets that are selected, wherein a first 3D matrix is created from one or more images from a first of the at least two image datasets and a second 3D matrix is created from one or more images from a second of the at least two image datasets;
    refining, by the image computing unit, the 3D matrices;
    applying, by the image computing unit, one or more matrix operations to the refined 3D matrices to create a differential 3D matrix;
    receiving, by the image computing unit, selection of selected matrix columns of the refined 3D matrices and the 3D differential matrix, wherein the selected matrix columns of the refined 3D matrices and the 3D differential matrix correspond to a same portion of the sample;
    applying, by the image computing unit, a convolution algorithm to the selected matrix columns of the refined 3D matrices and the 3D differential matrix for creating a two-dimensional (2D) matrix; and
    applying, by the image computing unit, a reconstruction algorithm to the 2D matrix to create a super-resolution biomarker map (SRBM) image.

2. The method of claim 1, wherein each of the at least two image datasets that are selected correspond to image data obtained at different points in time.

3. The method of claim 1, wherein creating 3D matrices comprises:
    receiving, by the image computing unit, selection of parameters for use in analyzing each of the at least two image datasets;
    registering, by the image computing unit, corresponding images of the plurality of images of the at least two image datasets to ensure that the corresponding images are aligned with matching anatomical locations;
    receiving, by the image computing unit, attributes for defining a moving window;
    applying, by the image computing unit, the moving window with the attributes to each of the registered images of the at least two image datasets; and
    aggregating, by the image computing unit, output values from various stops of the moving window on each of the registered images and selected parameters to create the plurality of 3D matrices, wherein each of the plurality of 3D matrices is created from one or more of the registered images.

4. The method of claim 3, wherein defining a moving window comprises defining the attributes including at least one of a size, a shape, a type of output value, a step size, and a direction of movement for the moving window.

5. The method of claim 3, wherein an output value at a stop is an average of full voxels within the moving window at the stop.

6. The method of claim 3, wherein an output value at a stop is a weighted average of all voxels within the moving window at the stop.

7. The method of claim 1, wherein refining the 3D matrices comprises at least one of dimensionality reduction, aggregation, and subset selection processes.

8. The method of claim 1, wherein the one or more matrix operations includes at least one of matrix addition, matrix subtraction, matrix multiplication, matrix division, matrix exponentiation, and matrix transposition.

9. The method of claim 1, wherein the convolution algorithm includes a Bayesian belief network algorithm.

10. The method of claim 1, wherein the 2D matrix corresponds to probability density functions to a clinical question.

11. An image computing system, comprising:
    a database configured to store image data; and
    an image computing unit configured to:
        retrieve the image data from the database, wherein the image data corresponds to two or more image datasets, and wherein each of the image datasets comprises a plurality of images;
        receive selection of at least two image datasets from the two or more image datasets;
        create three-dimensional (3D) matrices from each of the at least two image datasets that are selected, wherein a first 3D matrix is created from one or more images from a first of the at least two image datasets and a second 3D matrix is created from one or more images from a second of the at least two image datasets;

refine the 3D matrices;

apply one or more matrix operations to the refined 3D matrices to create a differential 3D matrix;

receive selection of selected matrix columns of the refined 3D matrices and the 3D differential matrix, wherein the selected matrix columns of the refined 3D matrices and the 3D differential matrix correspond to a same portion of the sample;

apply a convolution algorithm to the selected matrix columns of the refined 3D matrices and differential matrix for creating a two-dimensional (2D) matrix; and apply a reconstruction algorithm to the 2D matrix to create a super-resolution biomarker map (SRBM) image.

12. The image computing system of claim 11, wherein the database comprises a volume-coded precision database configured to store the image data from a sample, and a precision database configured to store image data from multiple subjects and multiple samples.

13. The image computing system of claim 11, wherein the image data corresponds to data from a plurality of imaging modalities.

* * * * *